Sept. 1, 1936.  A. F. STURM  2,052,905
ACCOUNTING MACHINE
Filed July 29, 1932  39 Sheets-Sheet 2
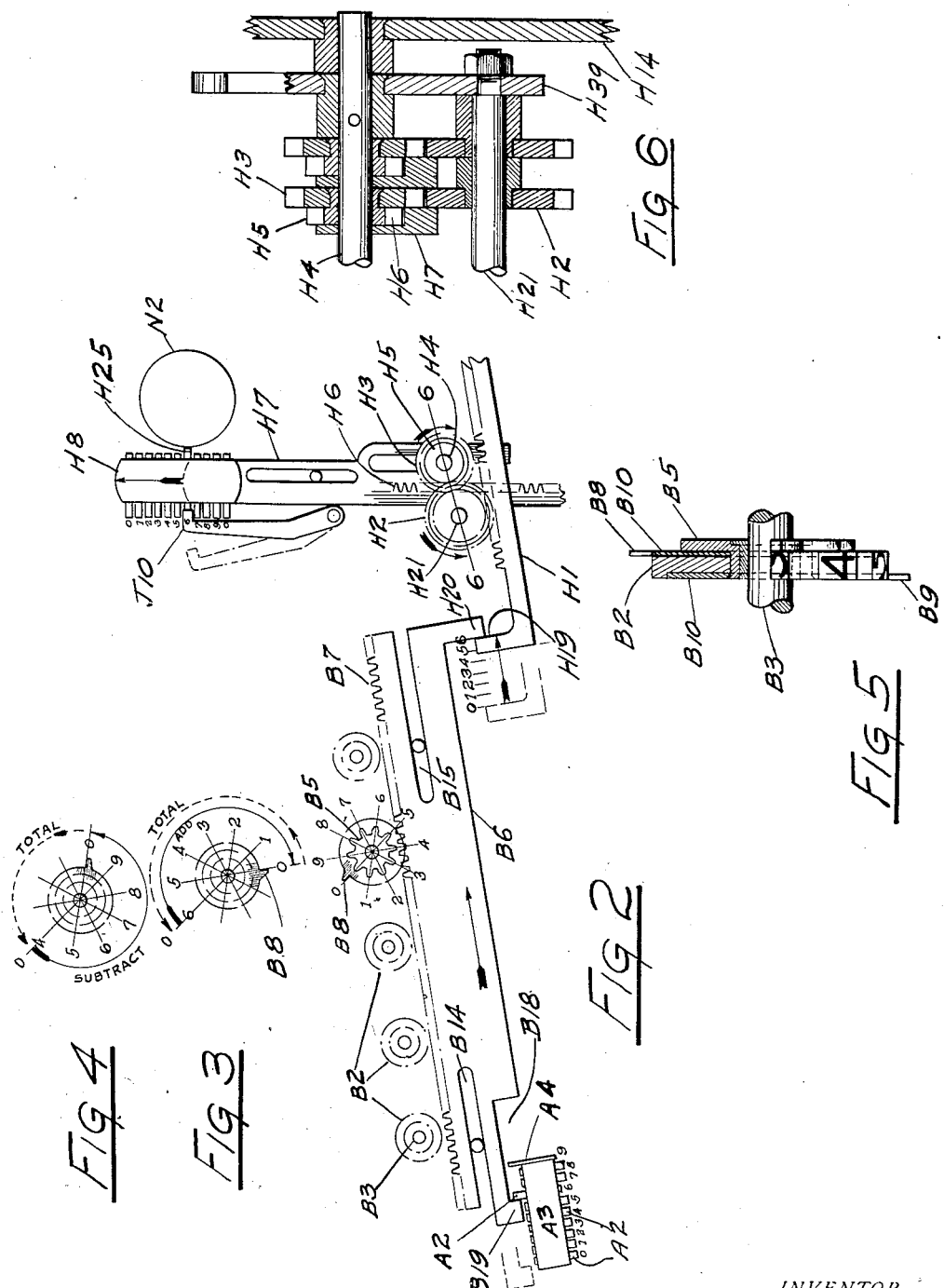

Sept. 1, 1936.   A. F. STURM   2,052,905
ACCOUNTING MACHINE
Filed July 29, 1932   39 Sheets-Sheet 3
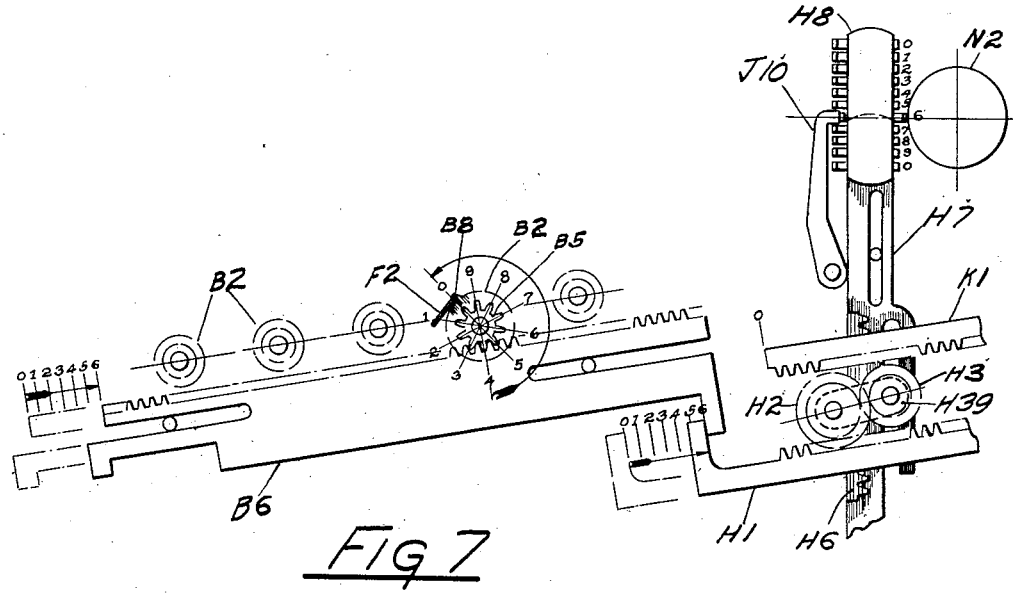
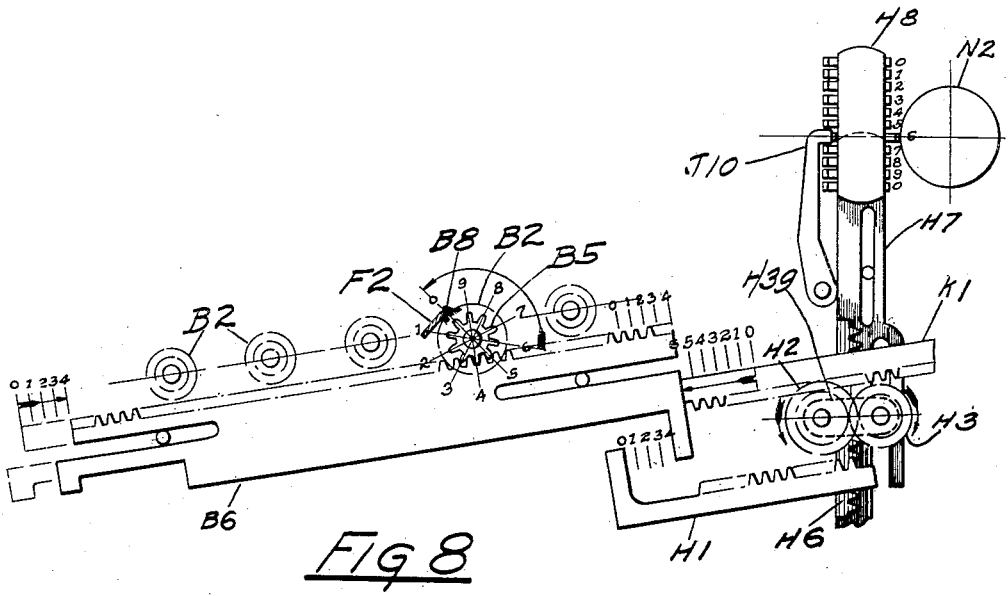
INVENTOR
BY
Morrison, Kennedy & Campbell
ATTORNEYS Sept. 1, 1936.  A. F. STURM  2,052,905
ACCOUNTING MACHINE
Filed July 29, 1932  39 Sheets-Sheet 4

INVENTOR
A. F. Sturm
BY Morrison, Kennedy & Campbell
ATTORNEYS

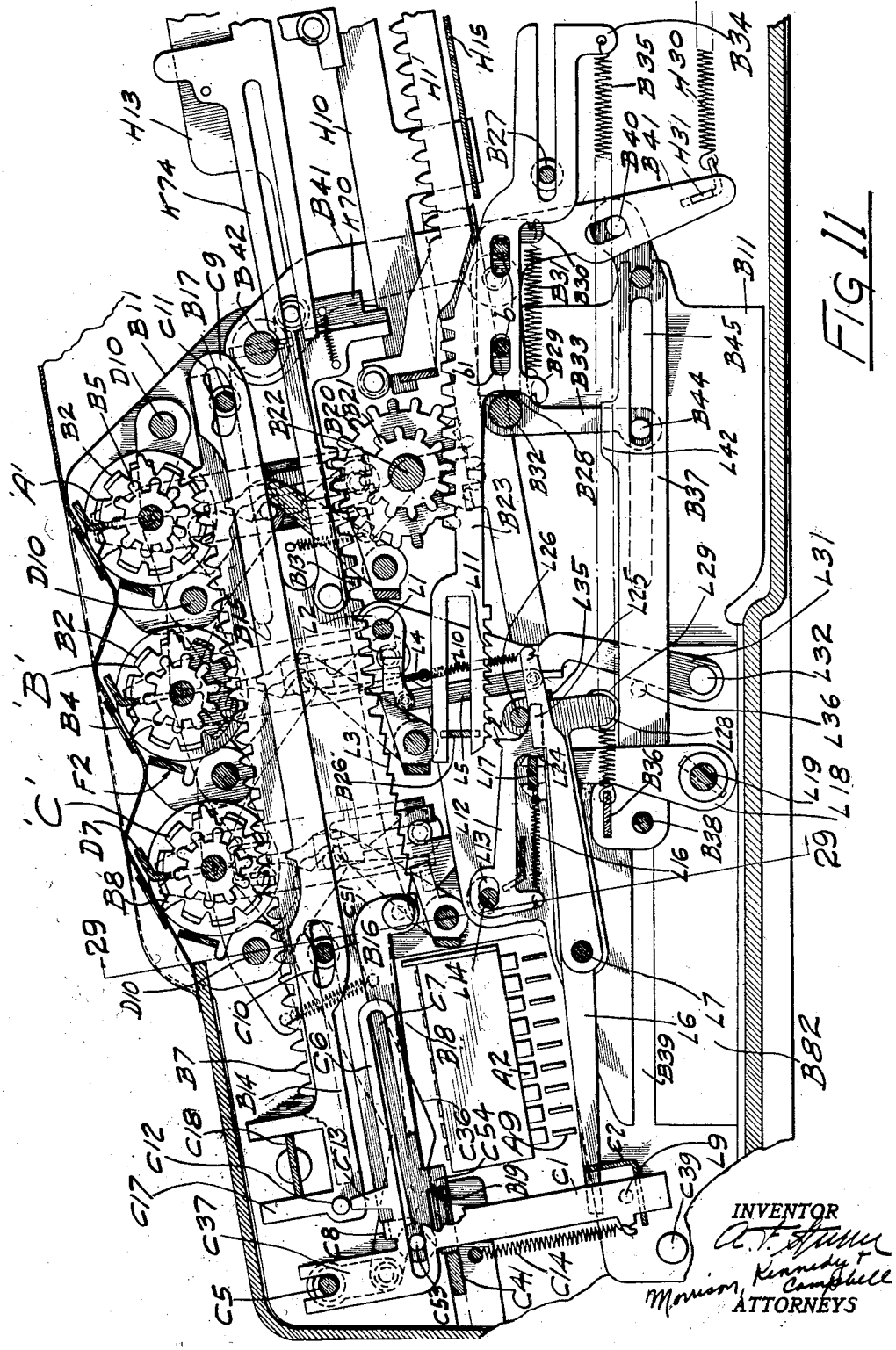

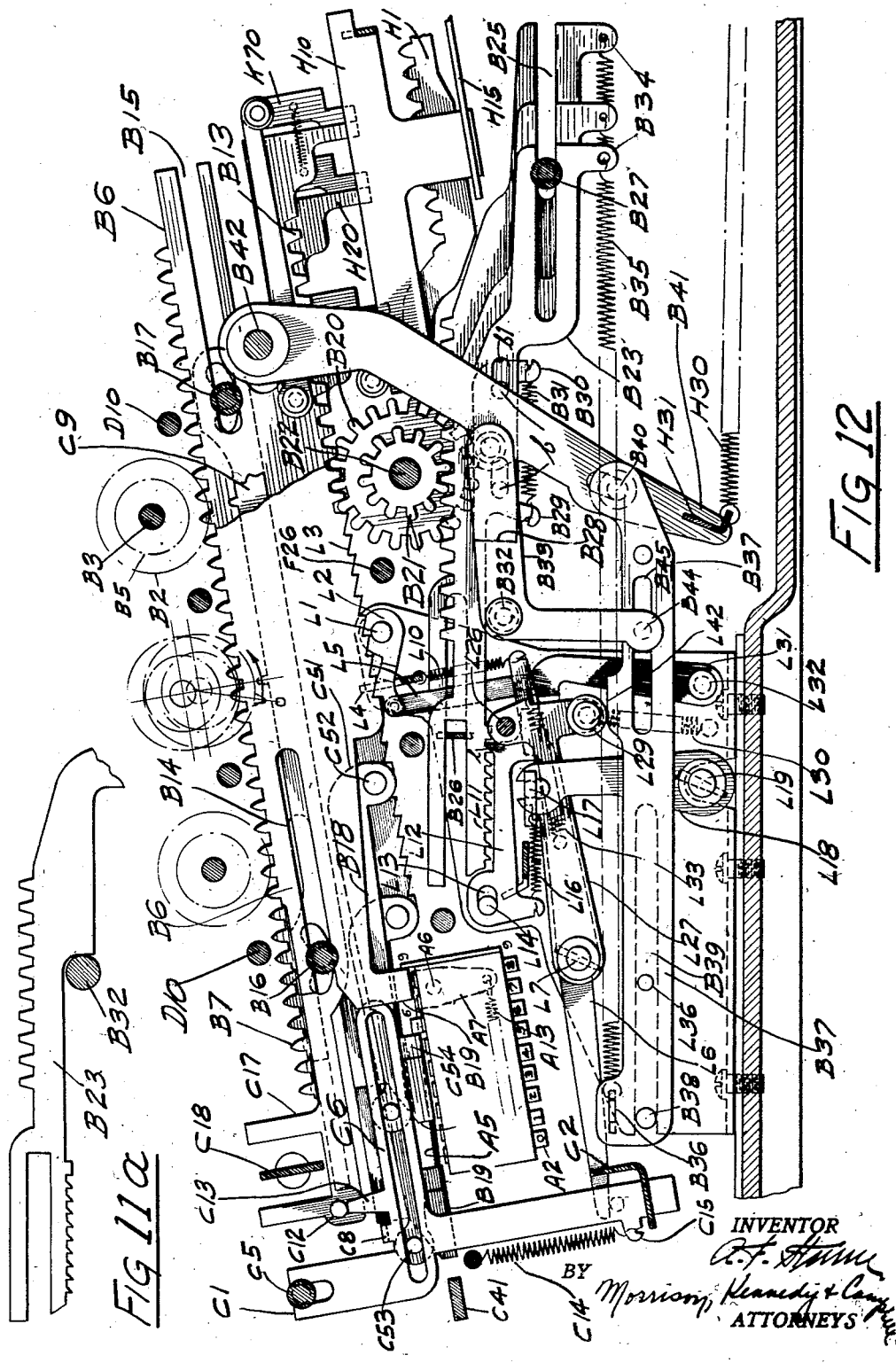

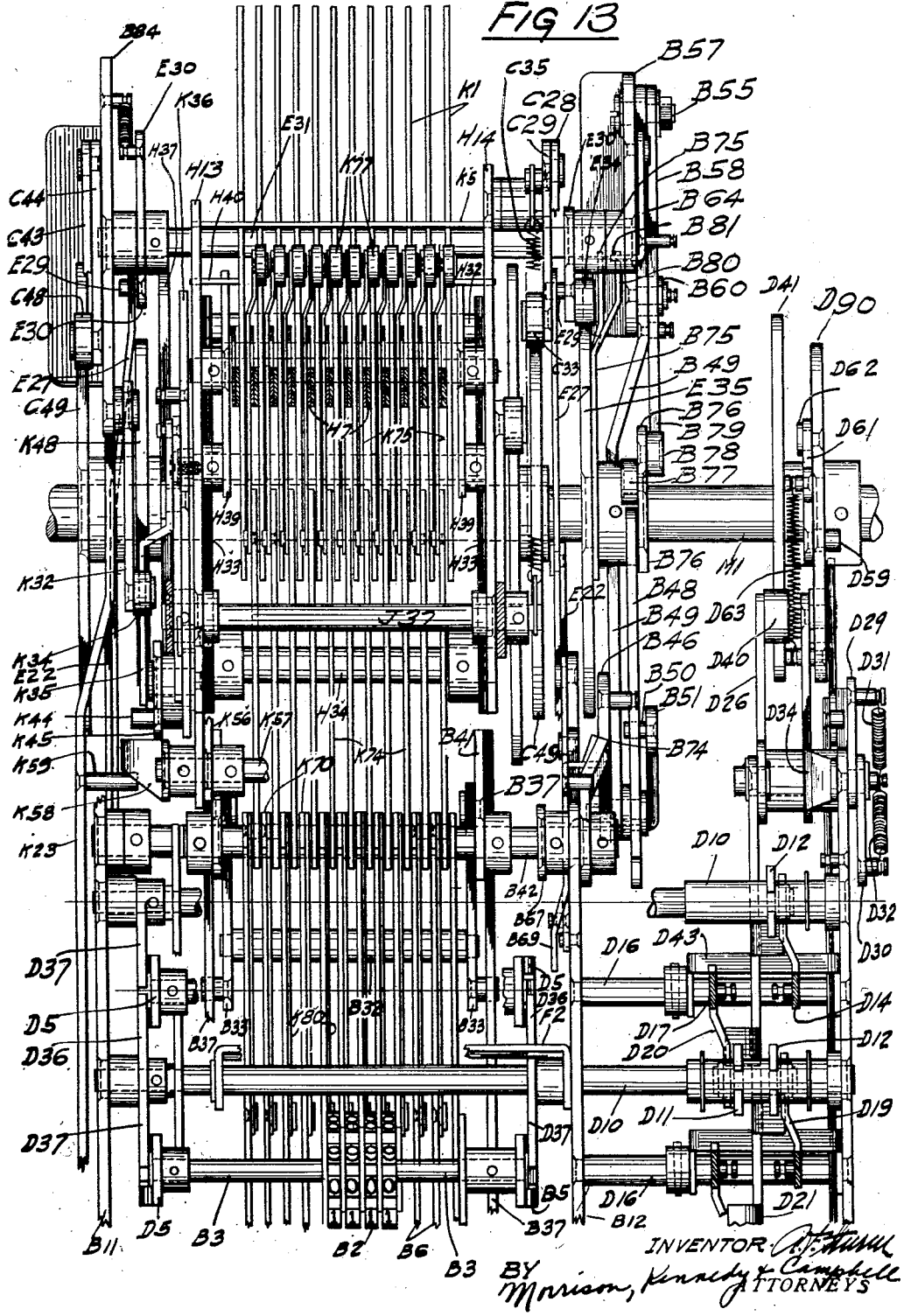

Sept. 1, 1936.   A. F. STURM   2,052,905
ACCOUNTING MACHINE
Filed July 29, 1932   39 Sheets-Sheet 8
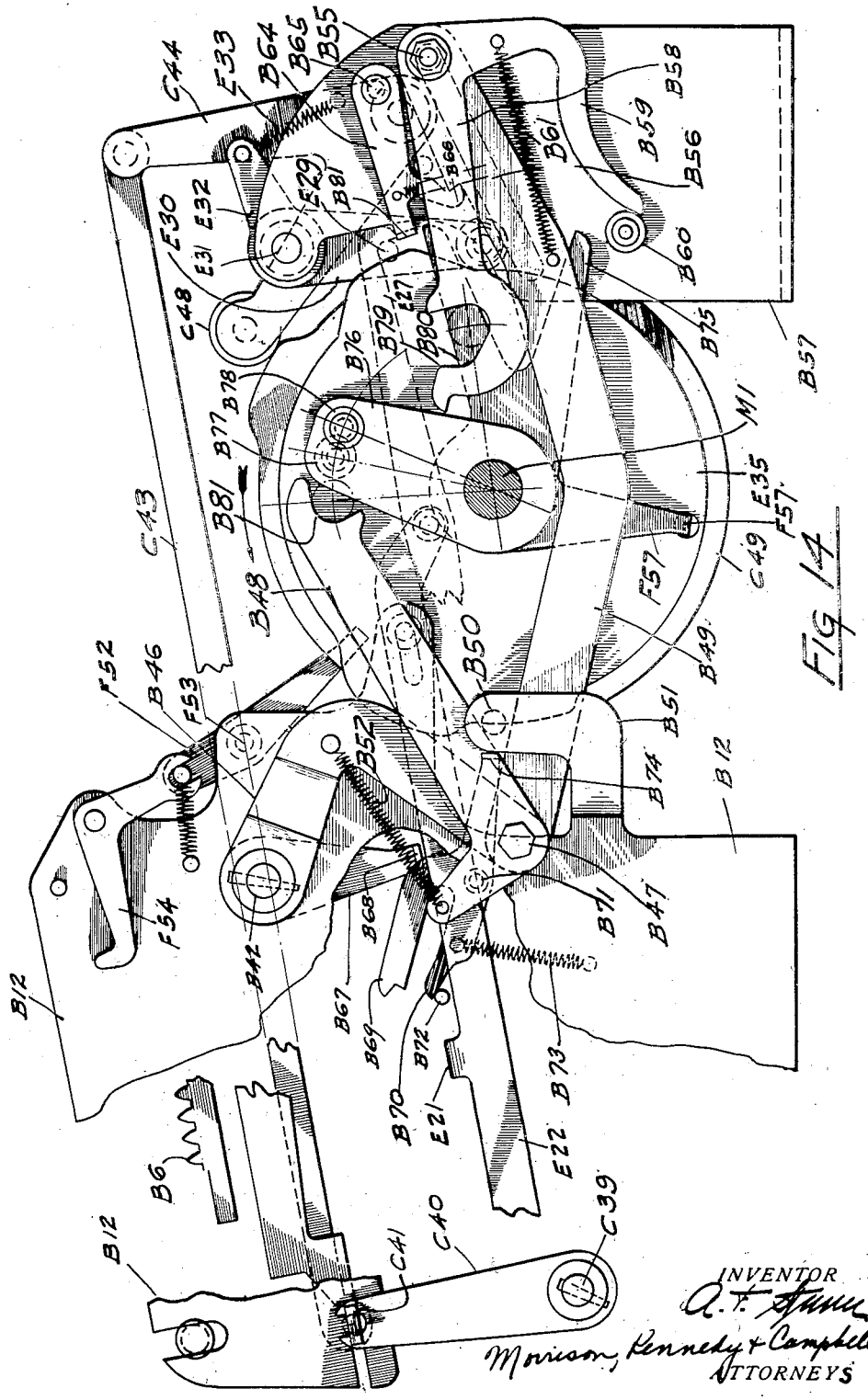
INVENTOR
A. F. Sturm
Morrison, Kennedy & Campbell
ATTORNEYS

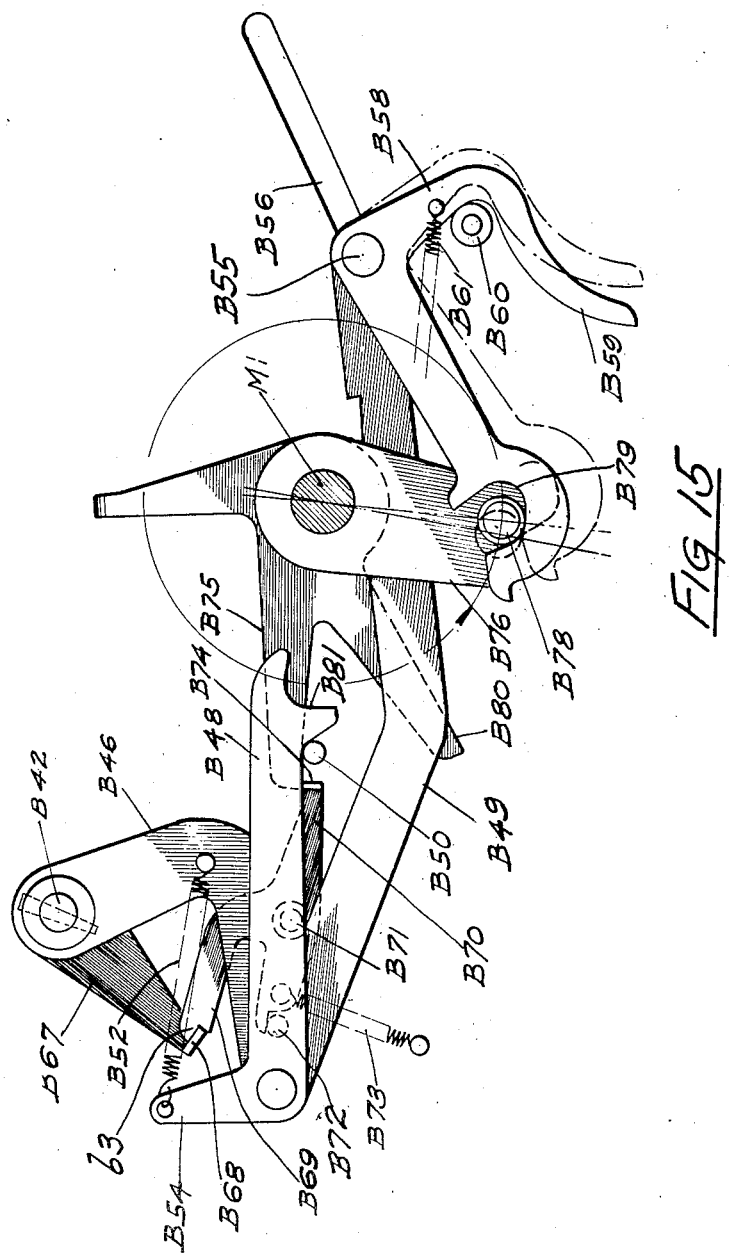

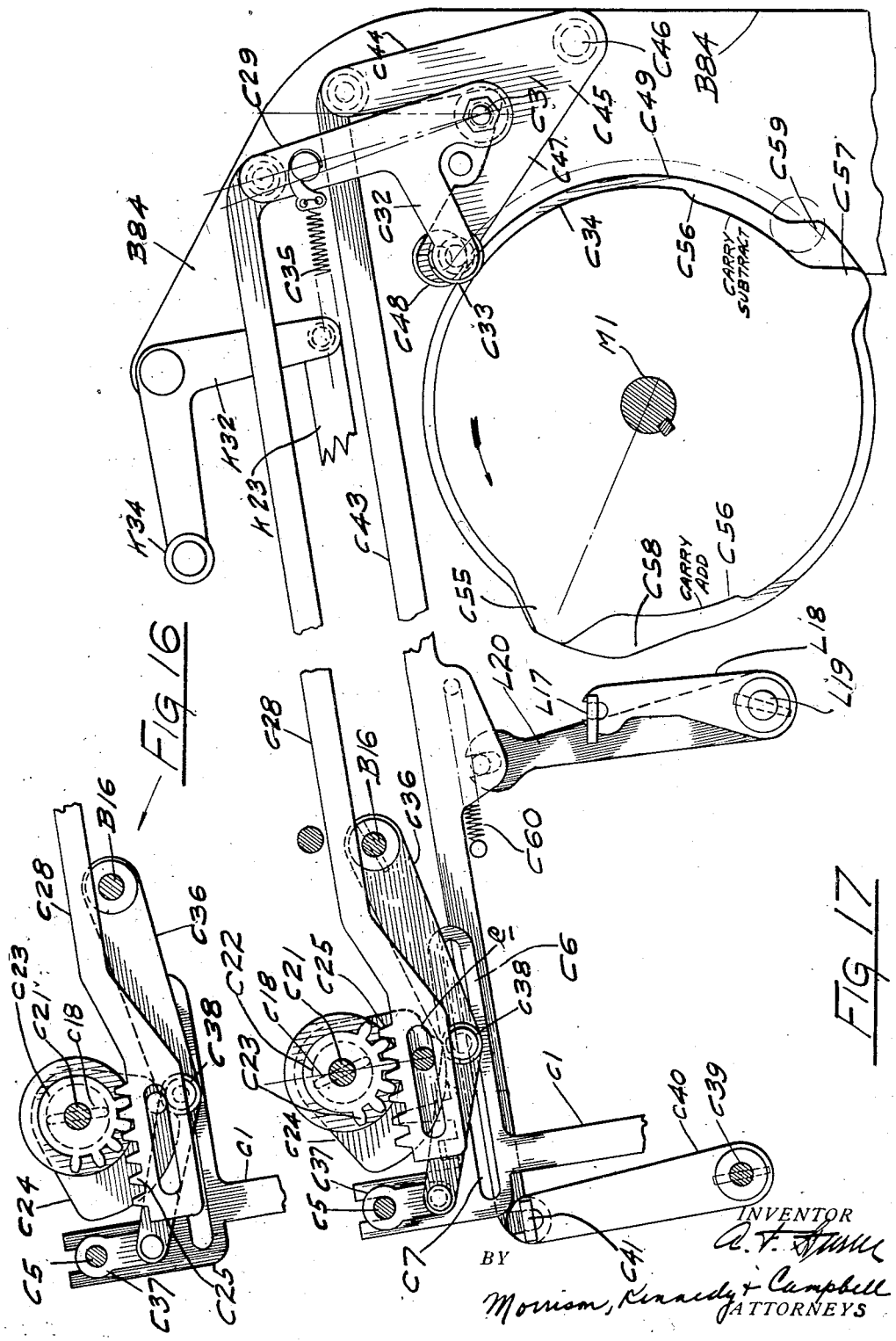

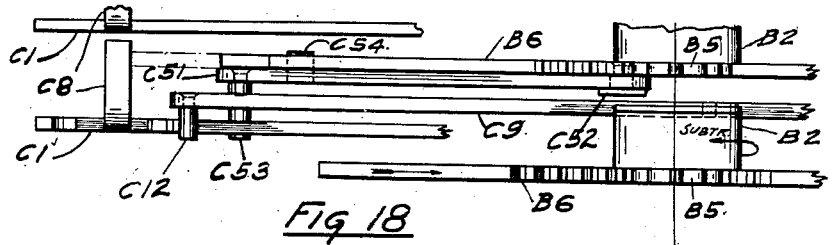
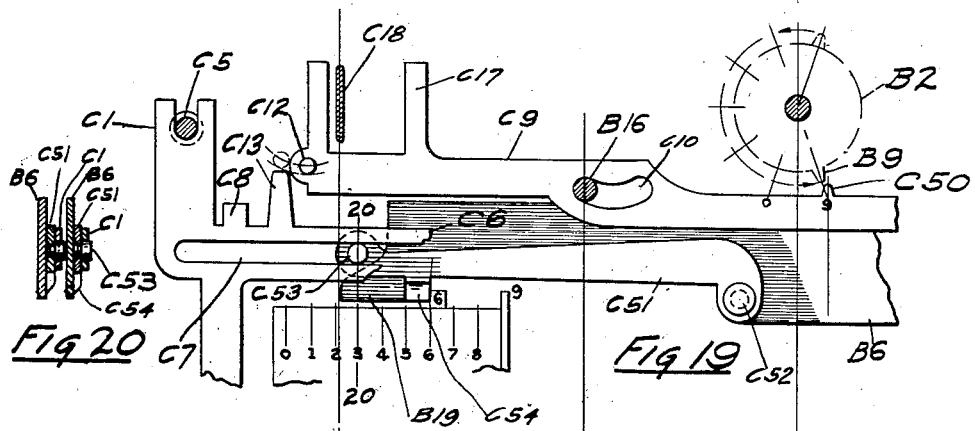
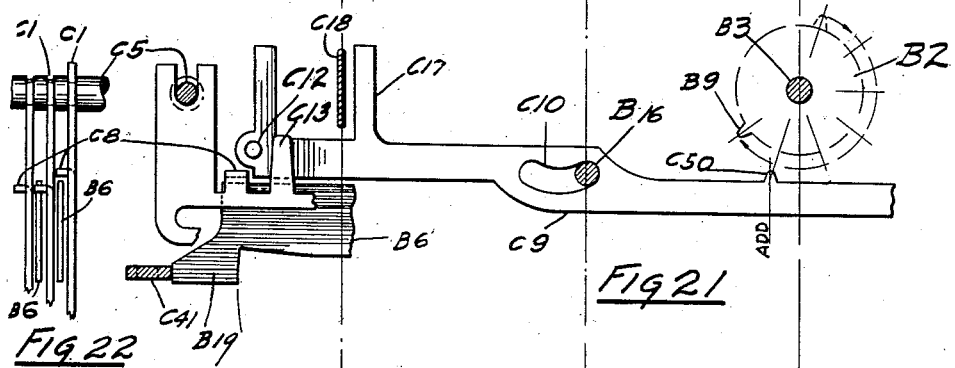
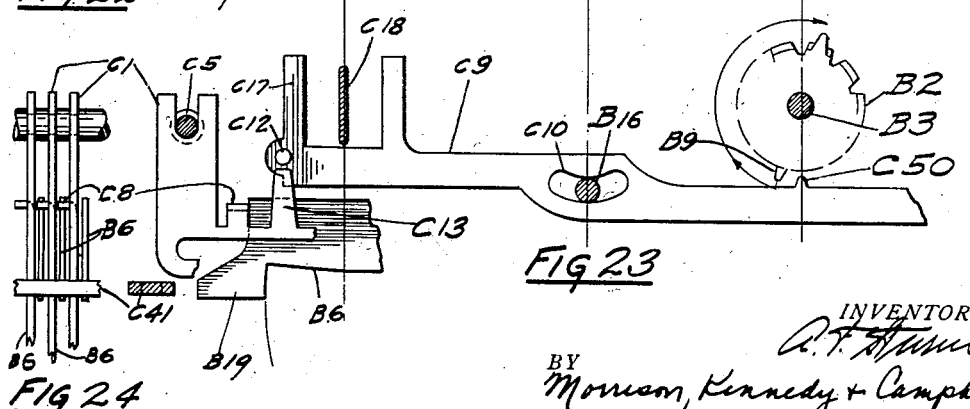

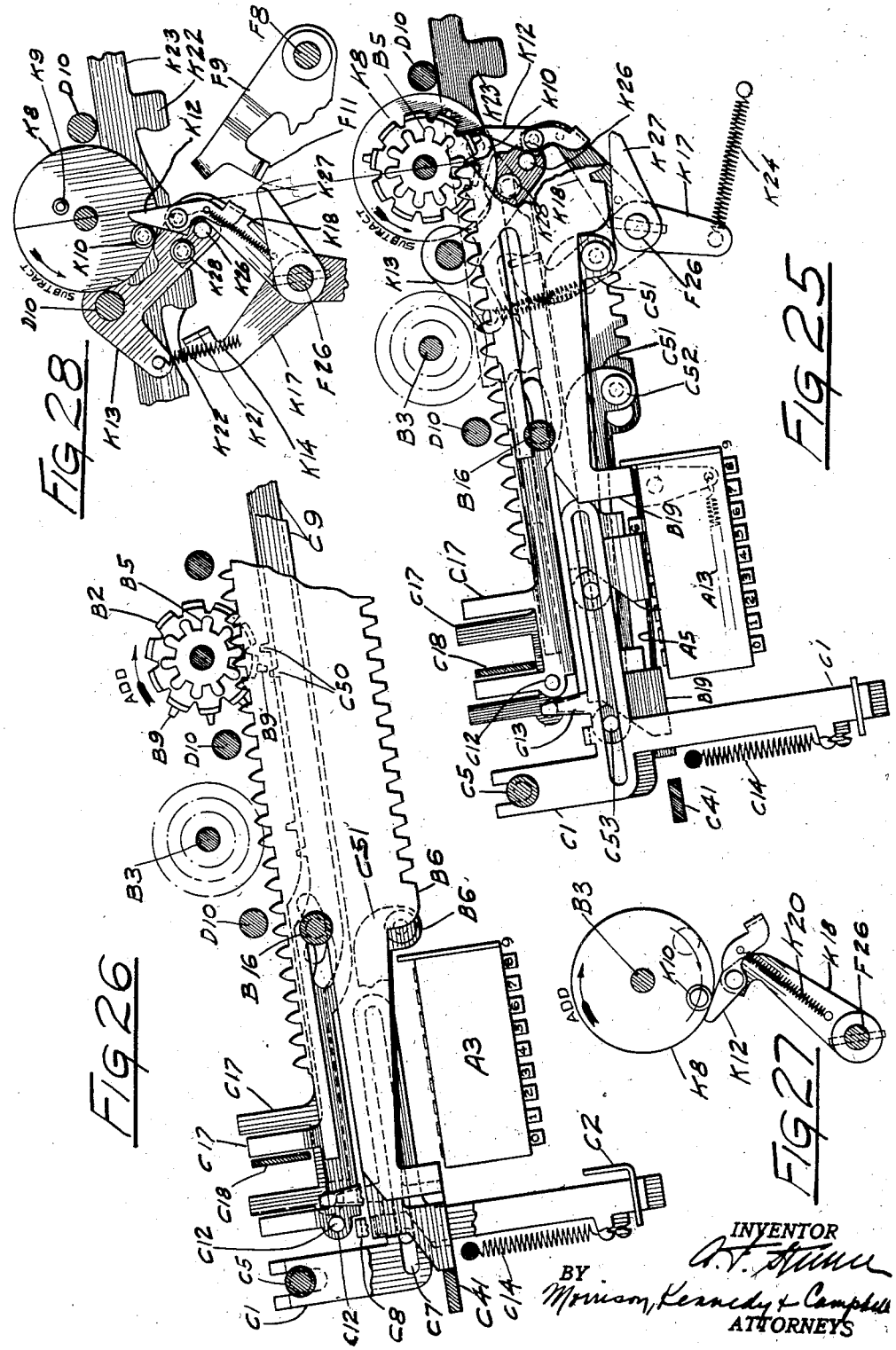

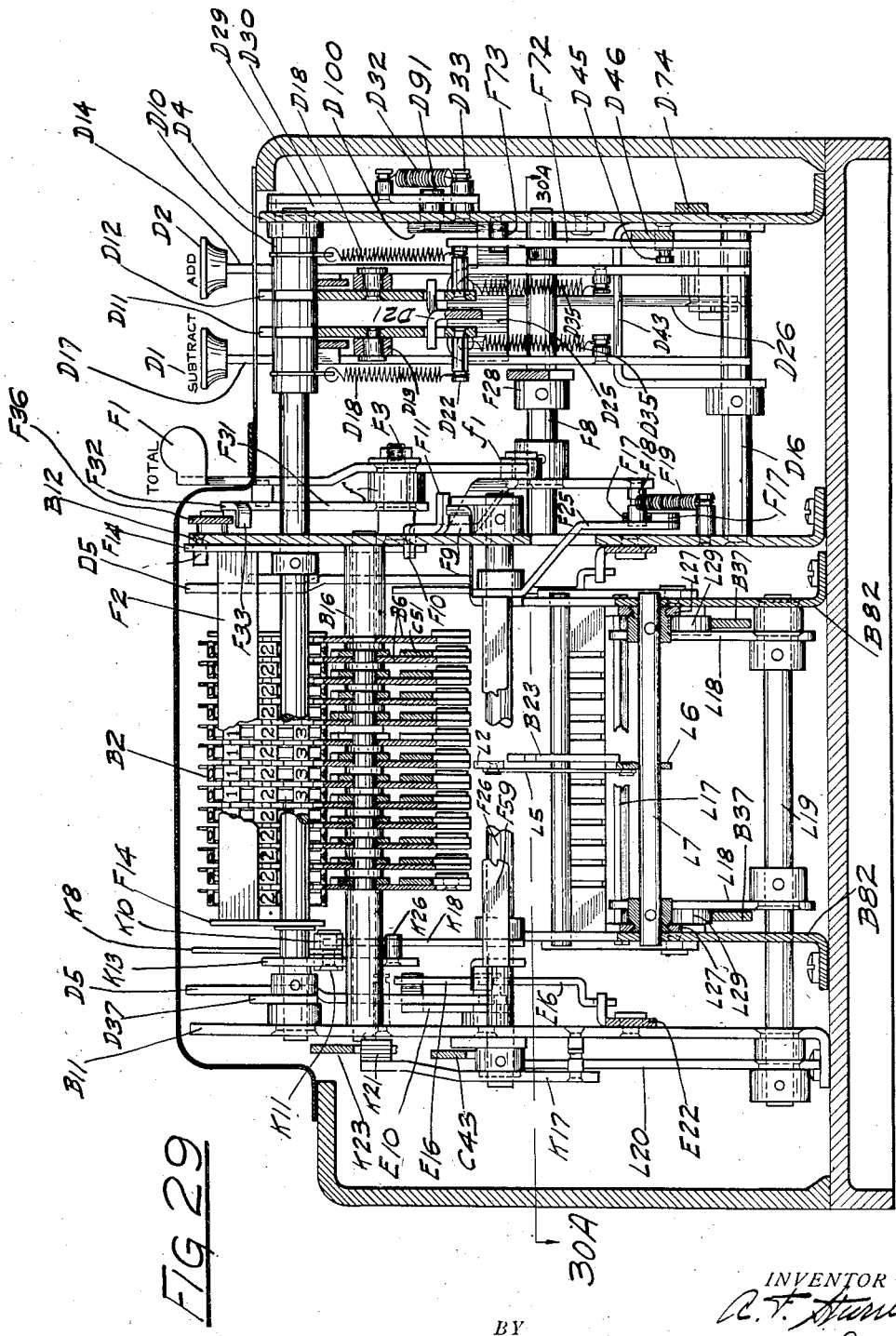

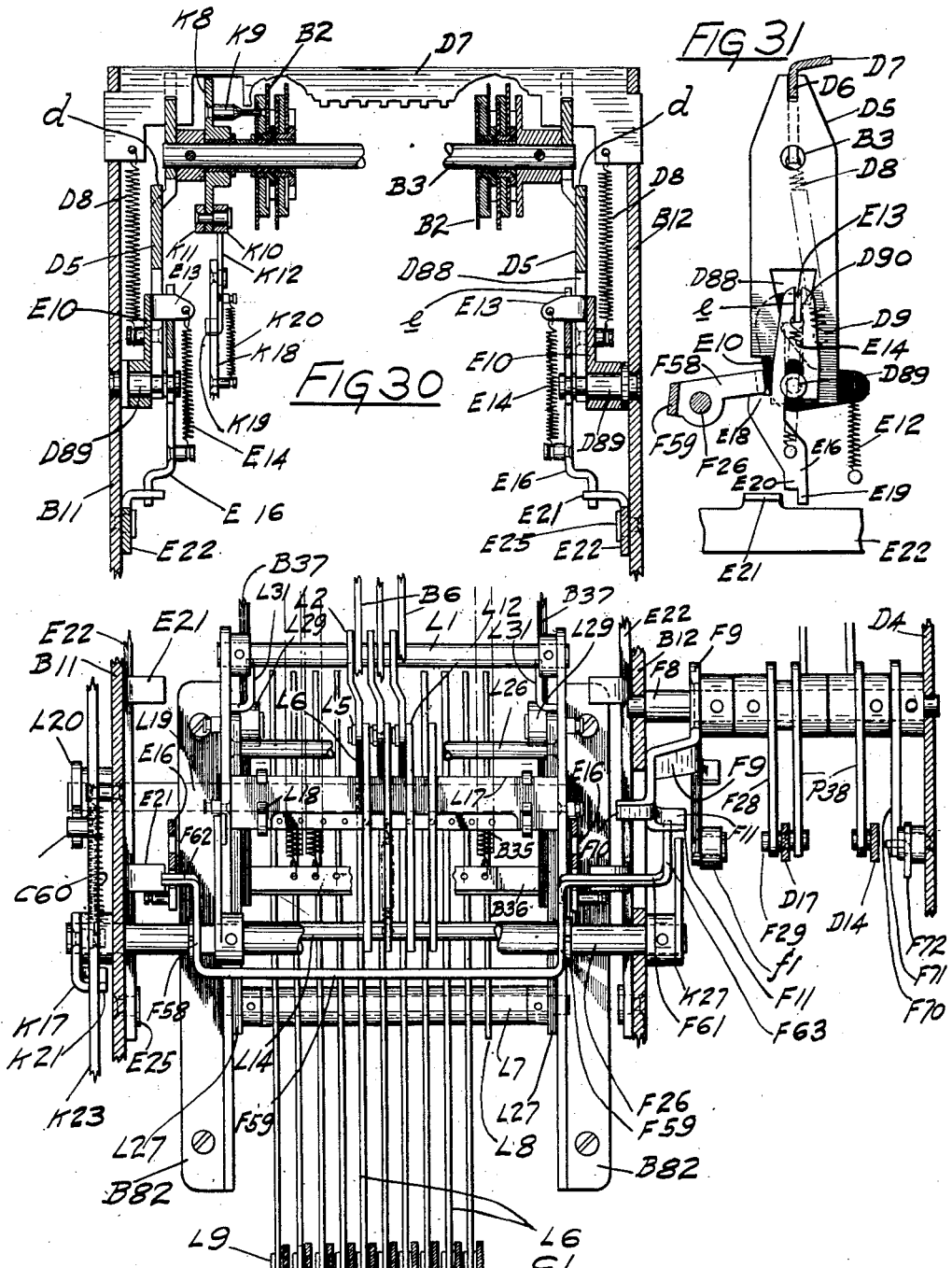

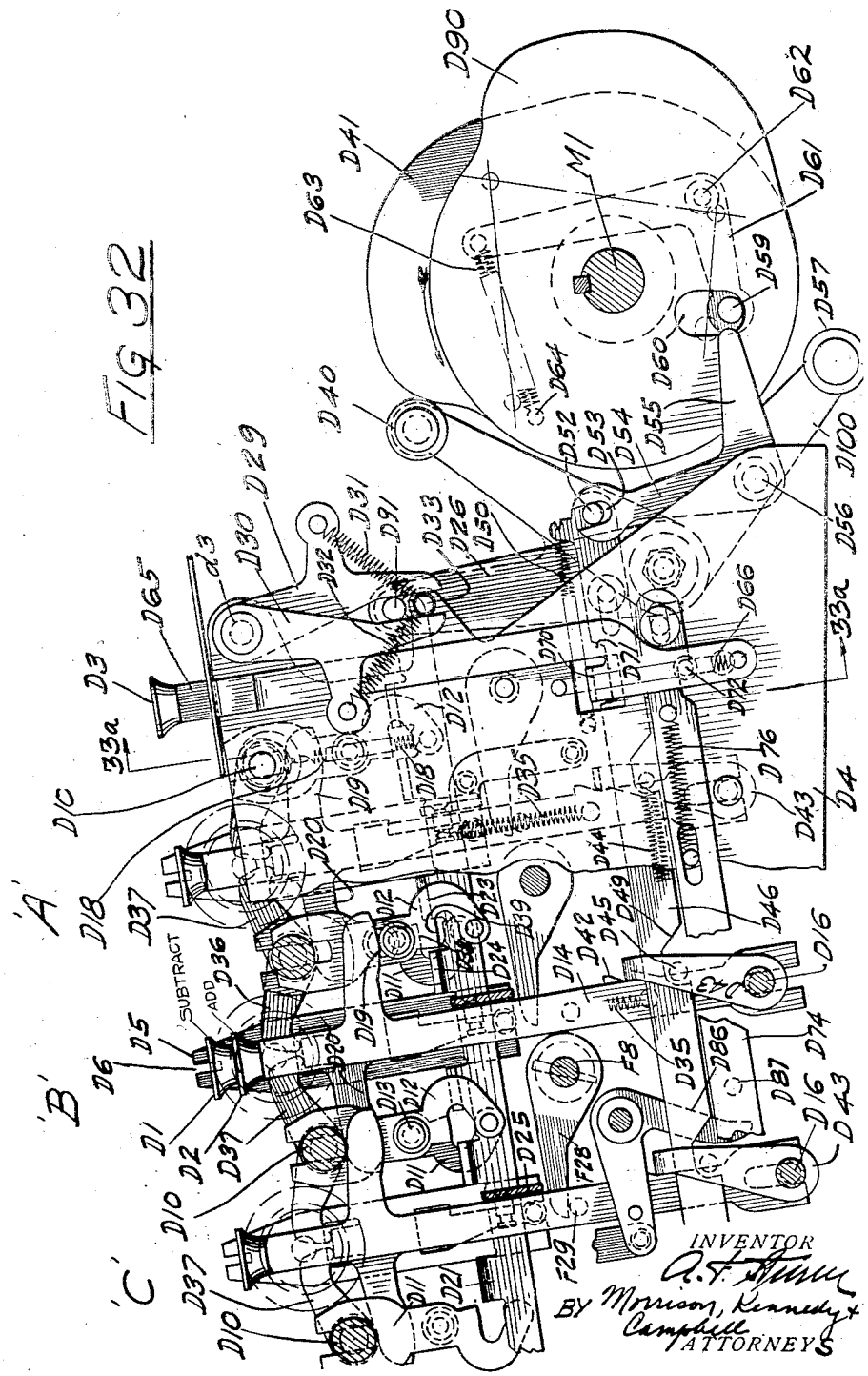

Sept. 1, 1936. A. F. STURM 2,052,905
ACCOUNTING MACHINE
Filed July 29, 1932 39 Sheets-Sheet 16
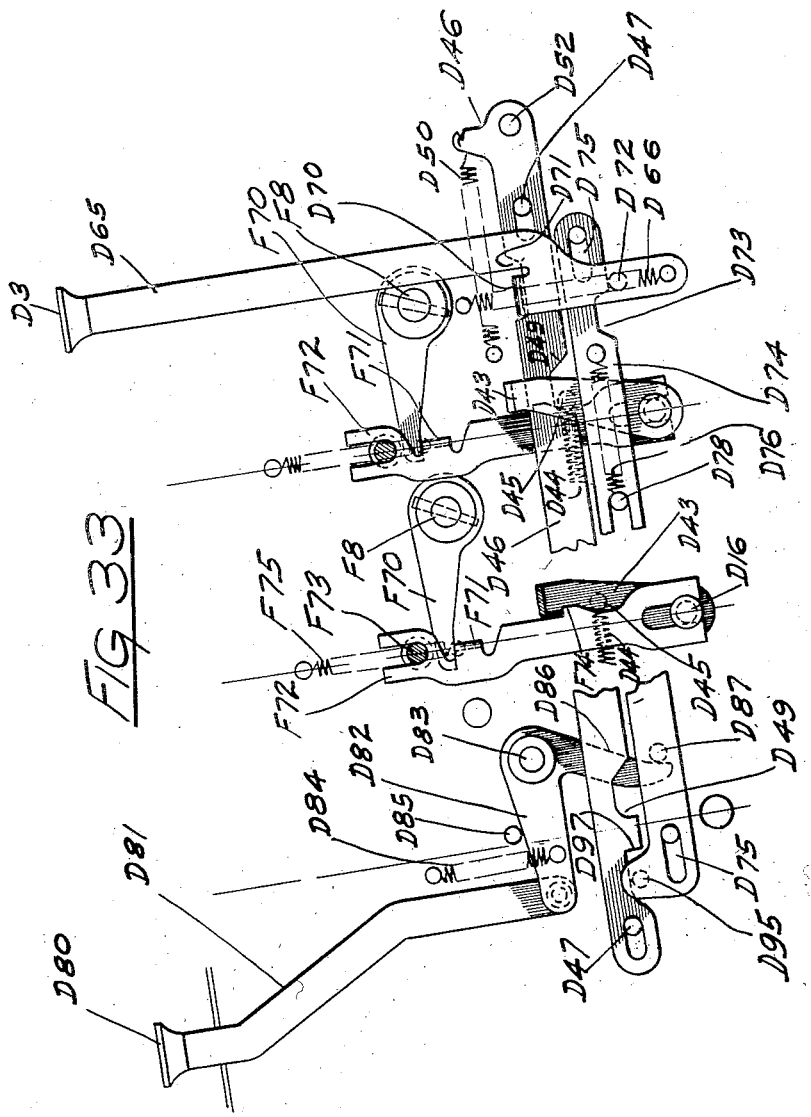
INVENTOR
A. F. Sturm
BY
Morrison, Kennedy & Campbell
ATTORNEYS Sept. 1, 1936.  A. F. STURM  2,052,905
ACCOUNTING MACHINE
Filed July 29, 1932  39 Sheets-Sheet 17

SUBTRACT

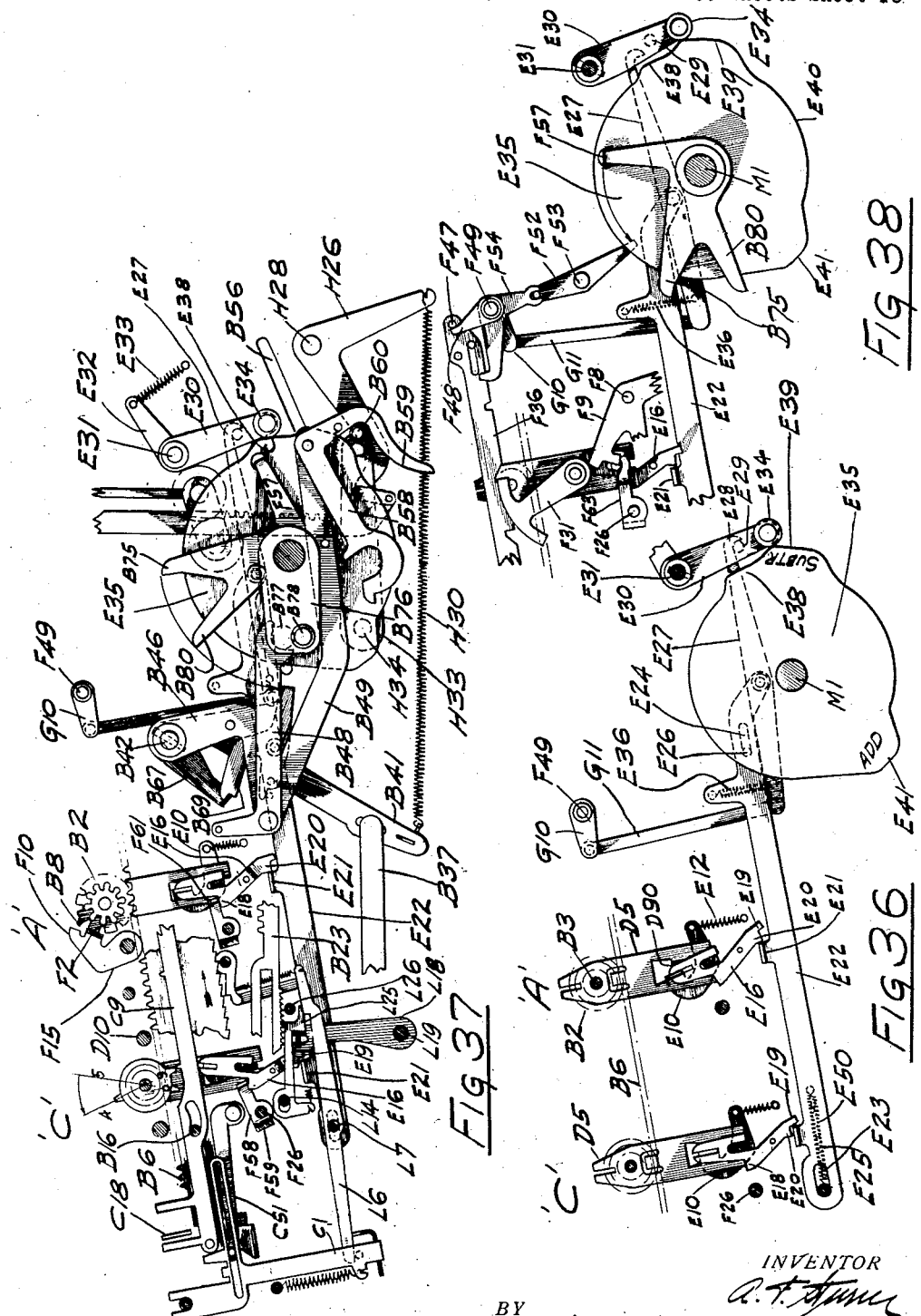

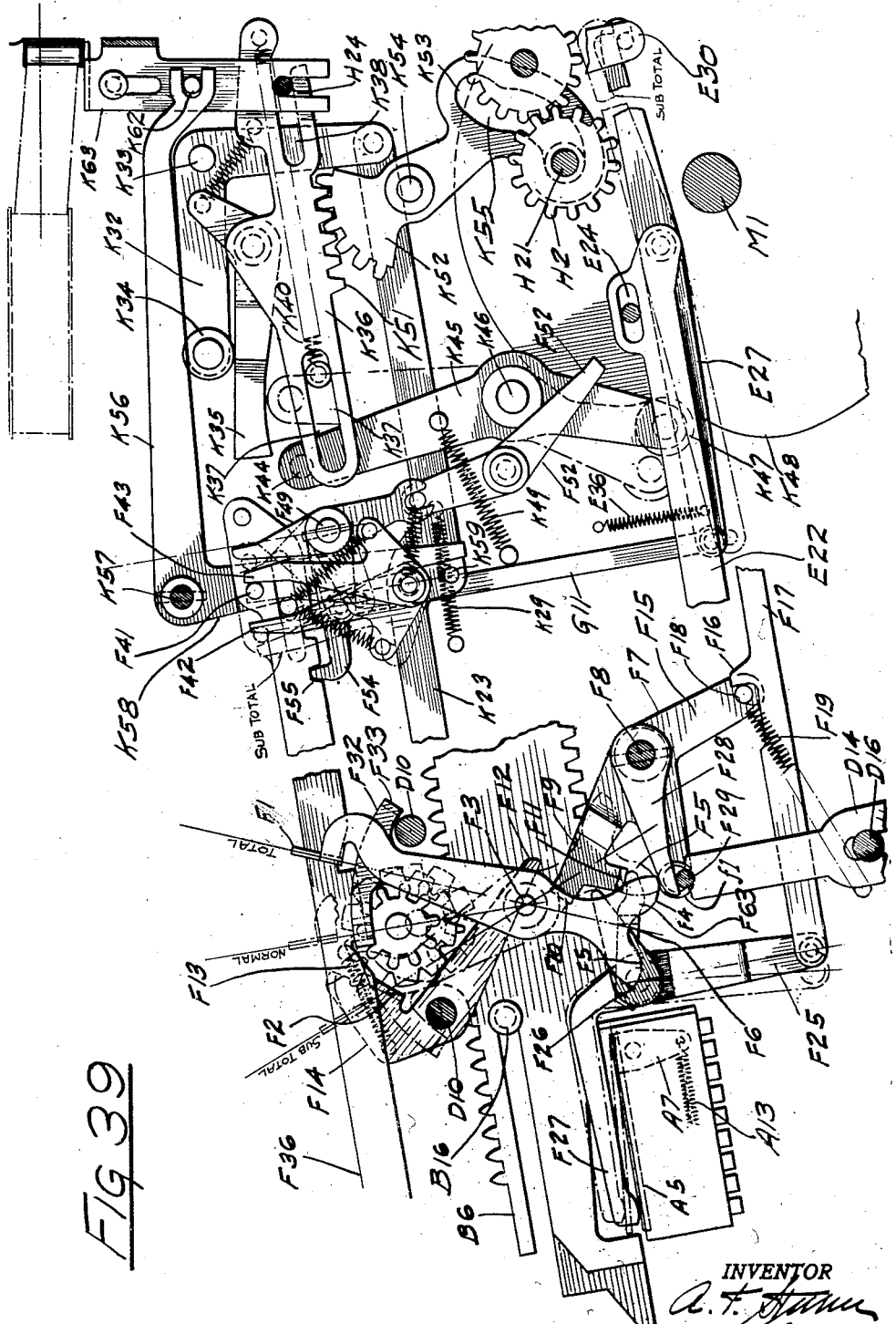

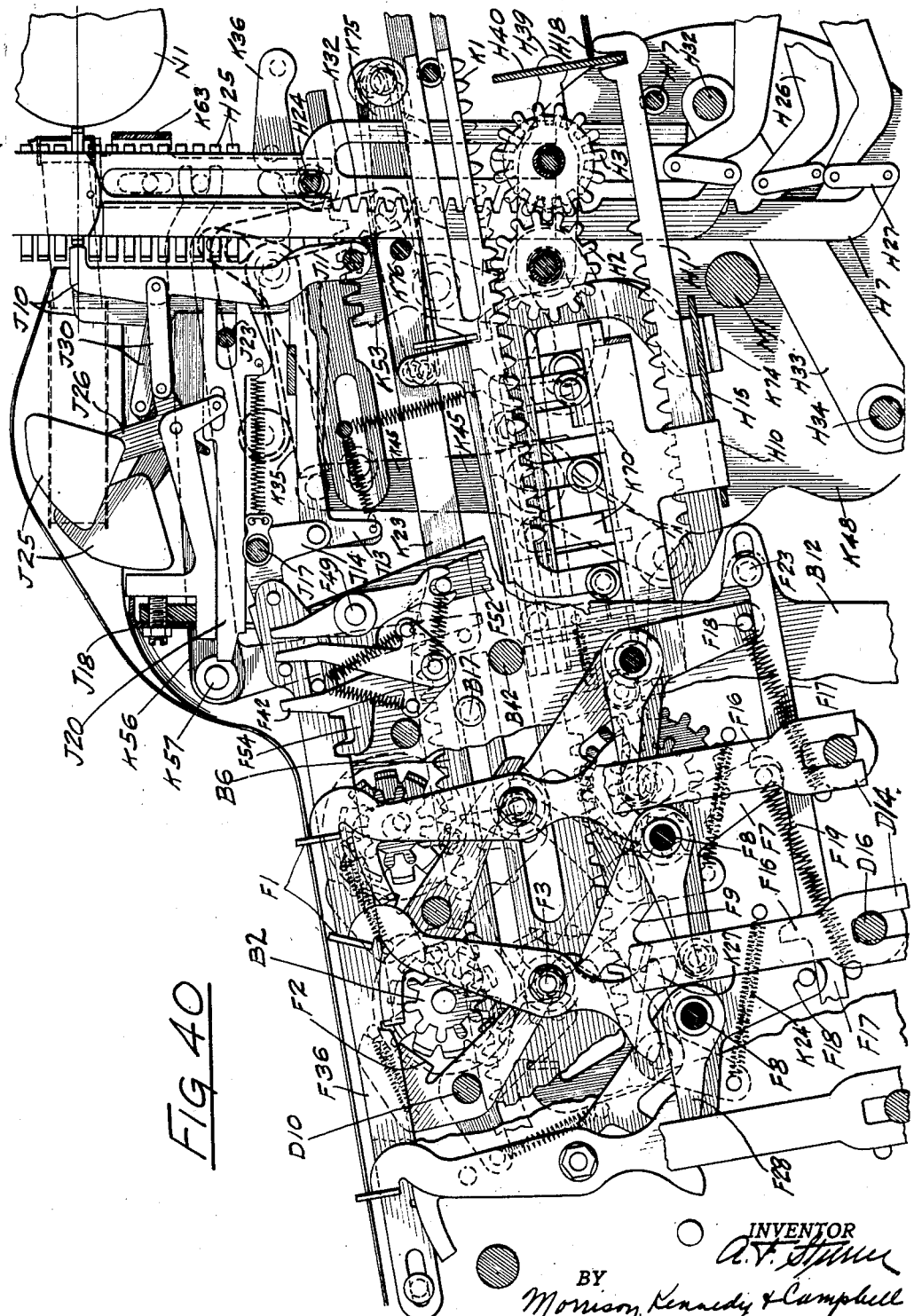

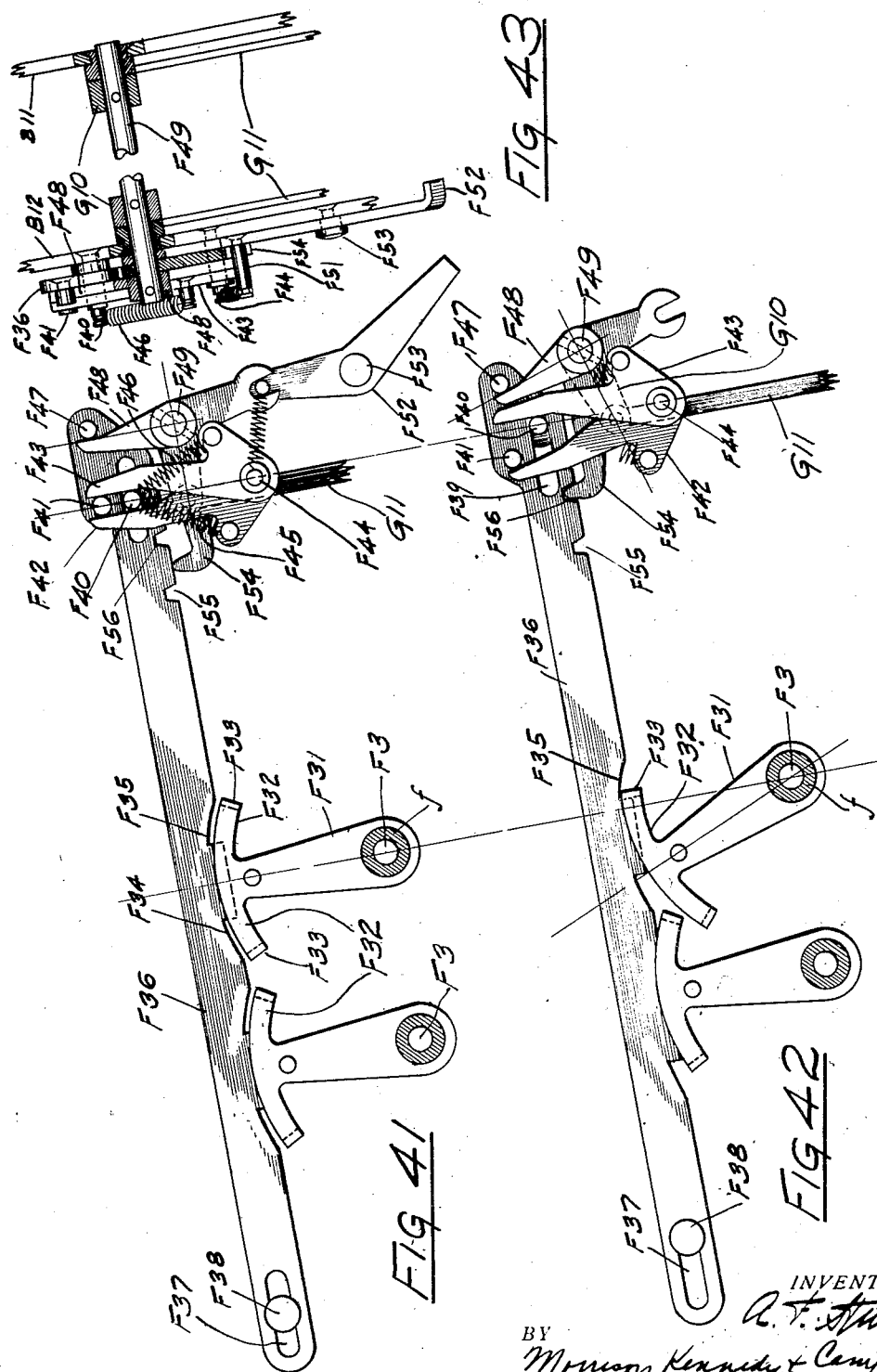

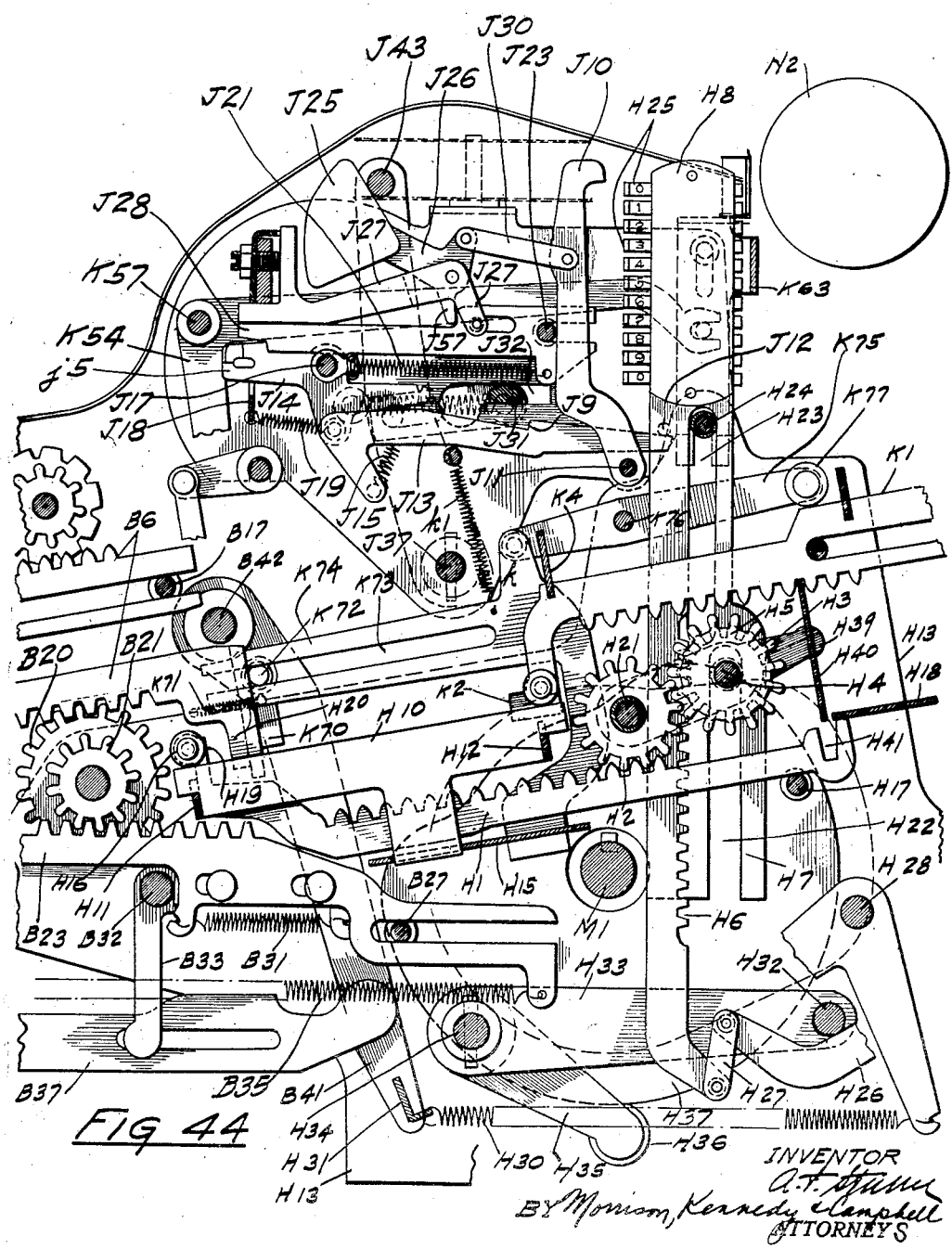

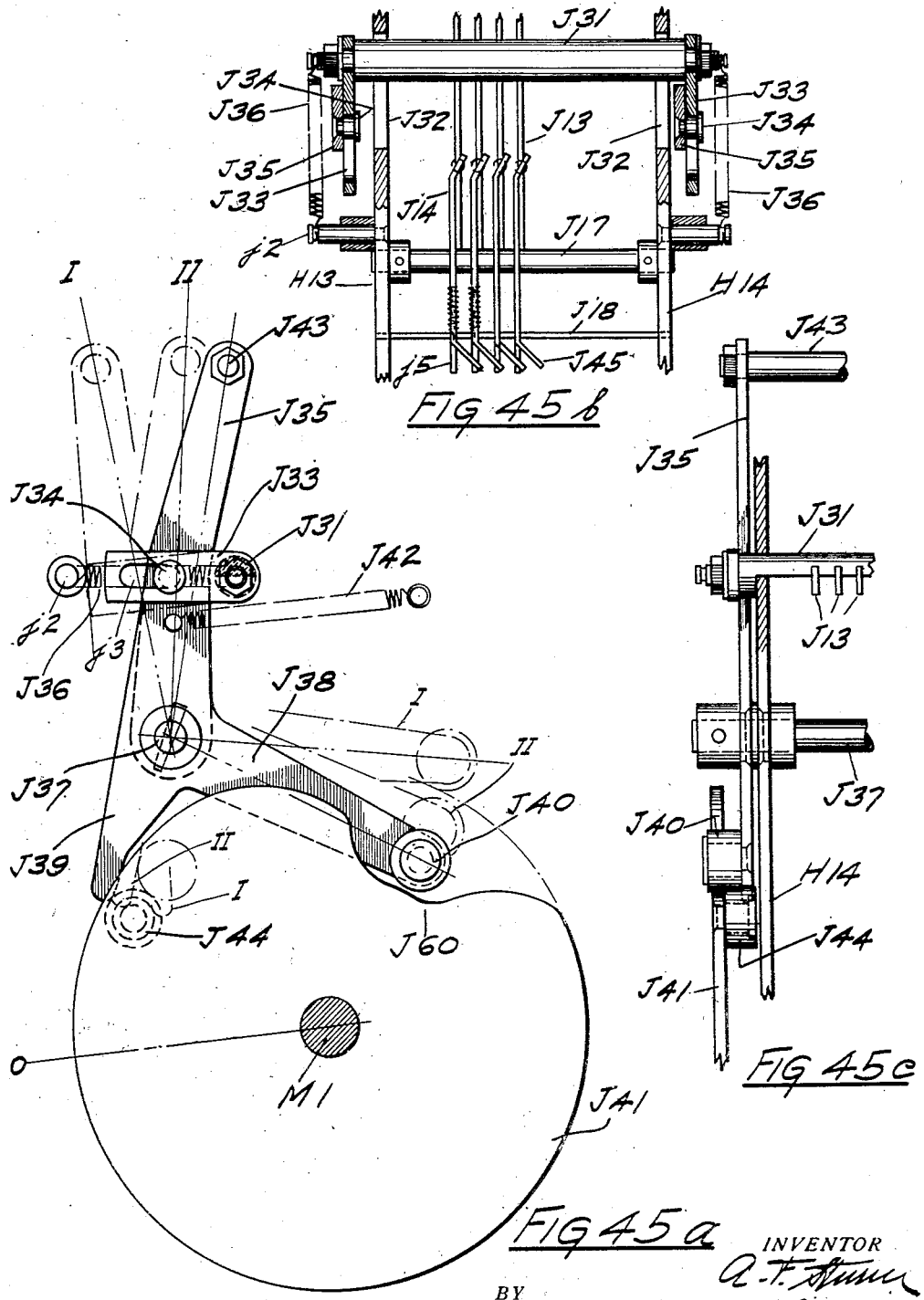

Sept. 1, 1936.  A. F. STURM  2,052,905
ACCOUNTING MACHINE
Filed July 29, 1932  39 Sheets-Sheet 26

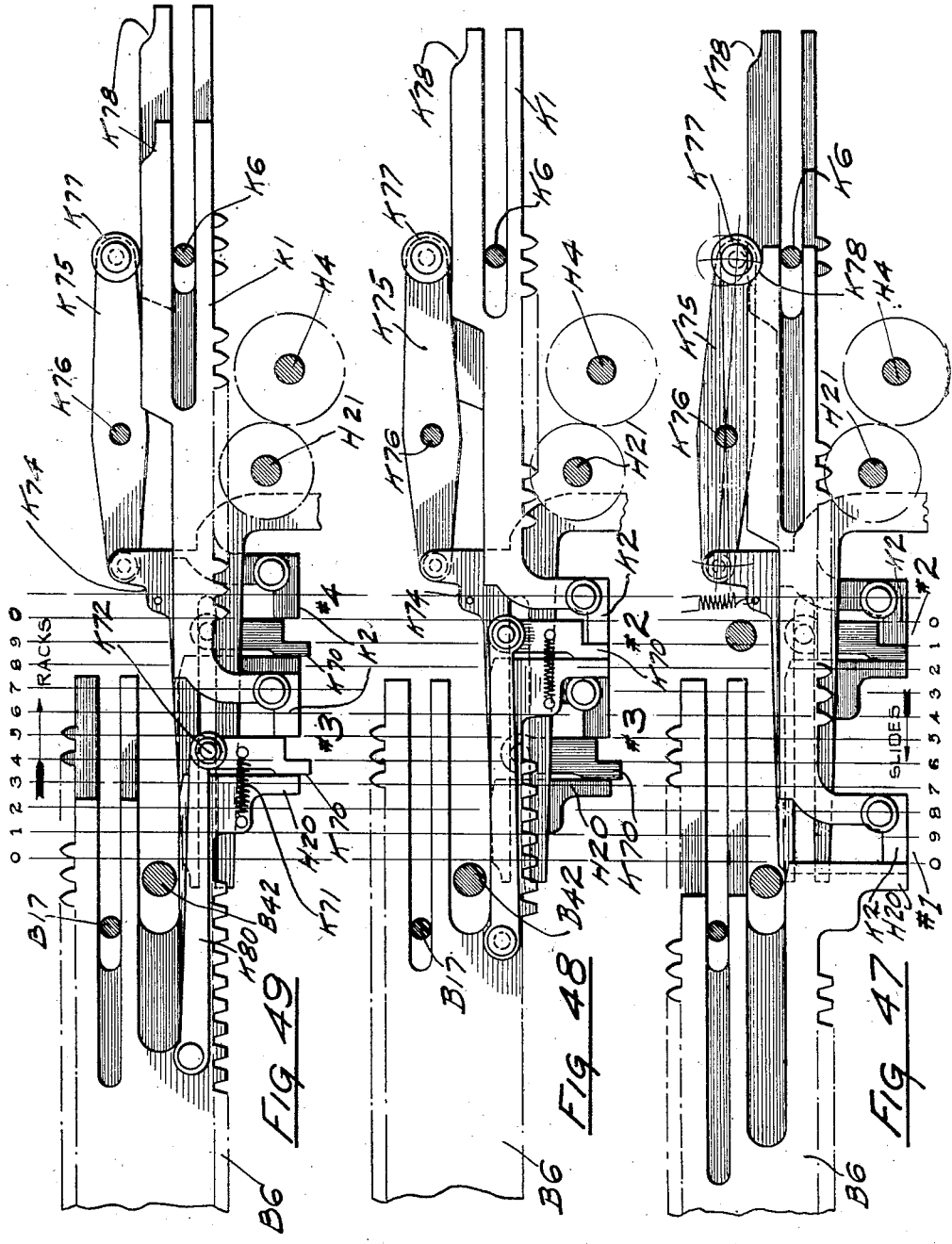

Sept. 1, 1936.  A. F. STURM  2,052,905
ACCOUNTING MACHINE
Filed July 29, 1932  39 Sheets-Sheet 28

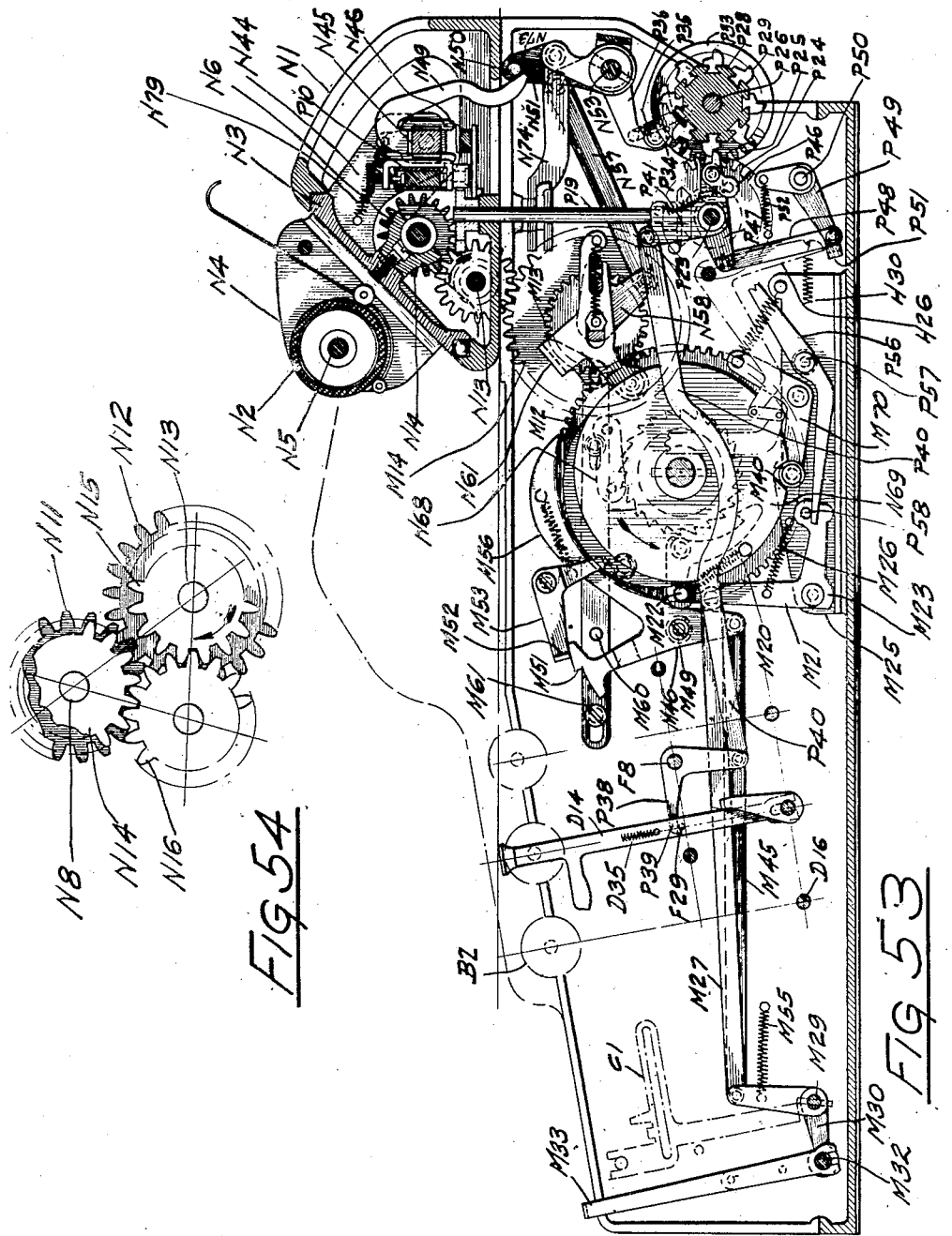

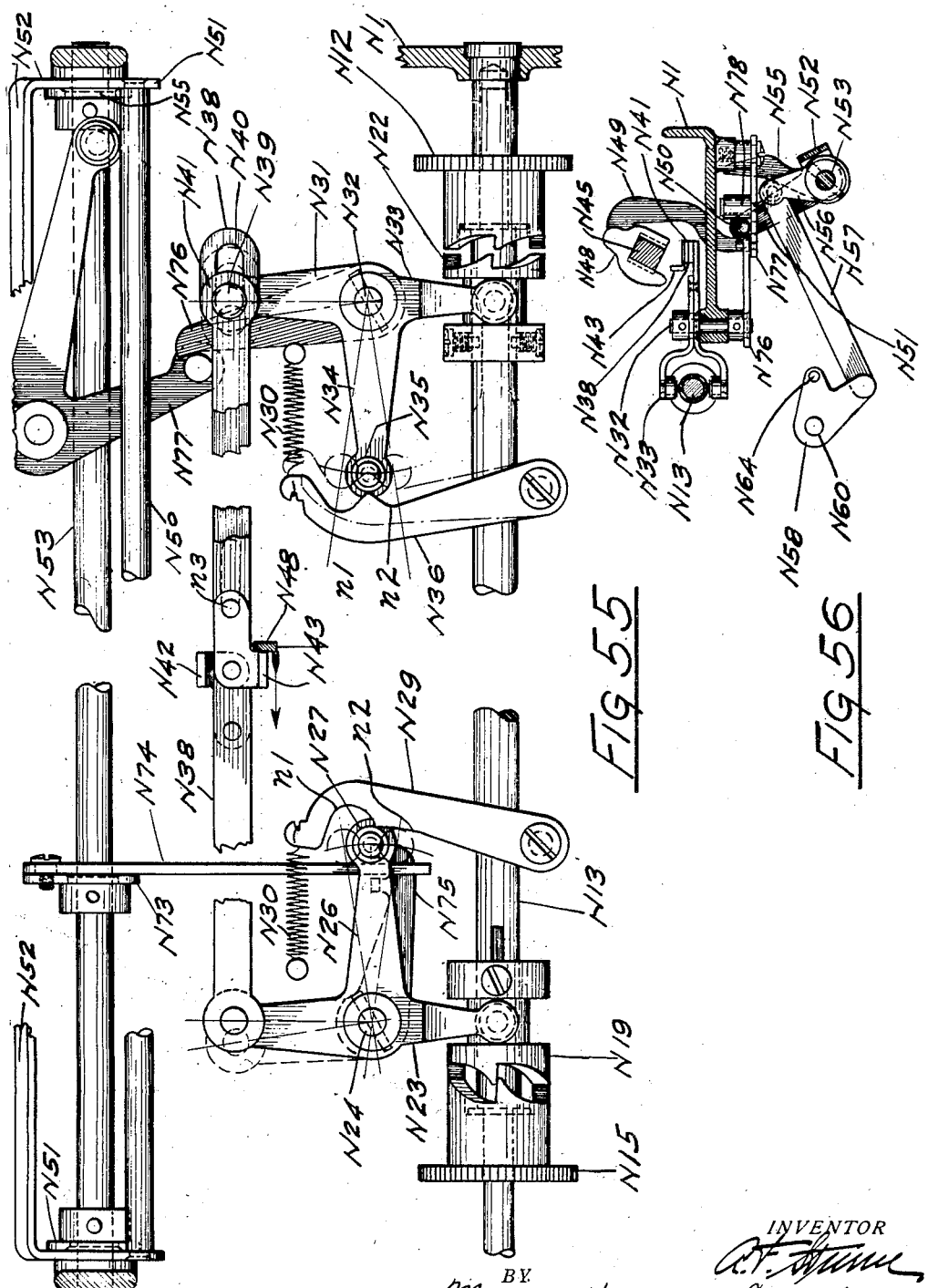

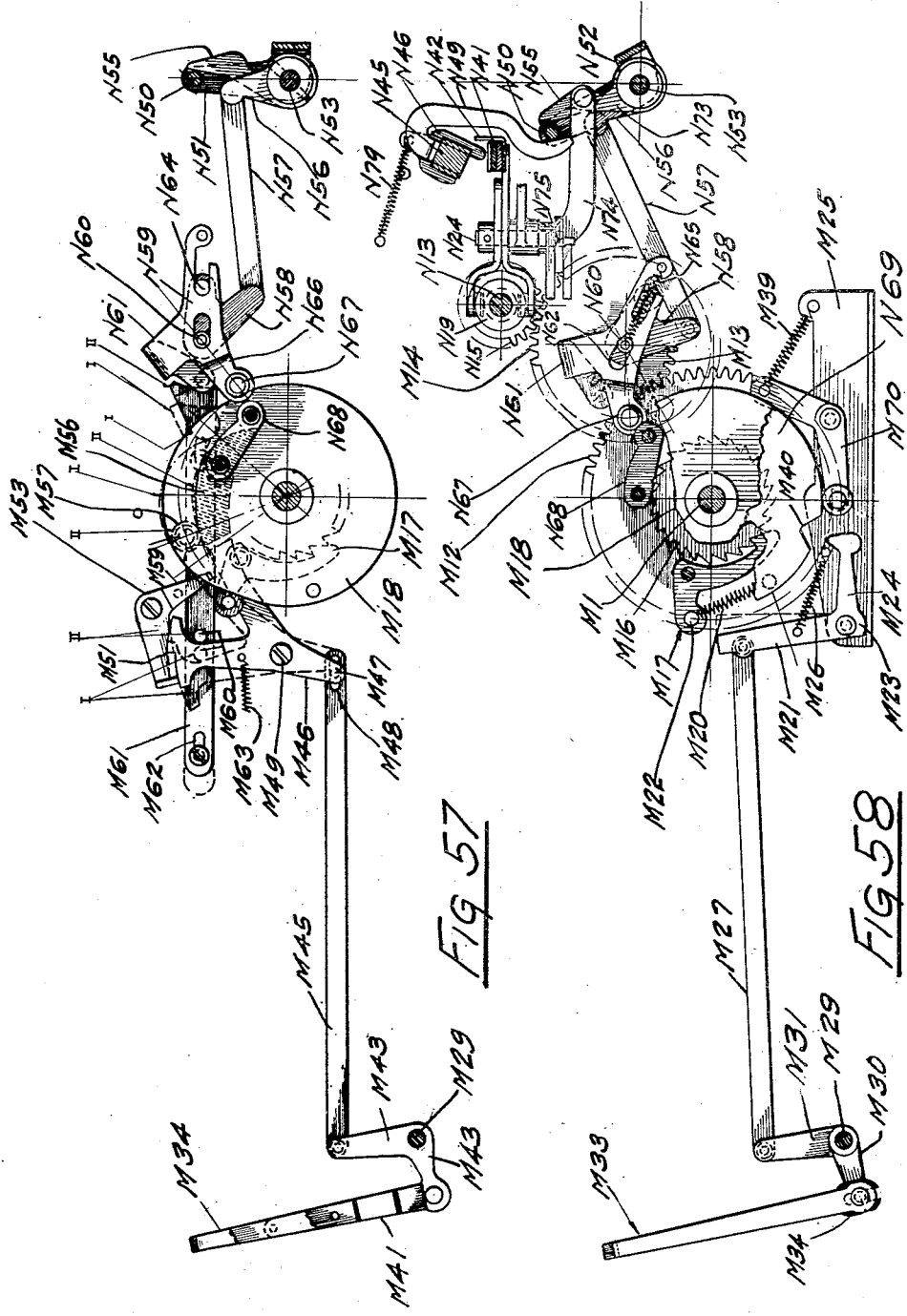

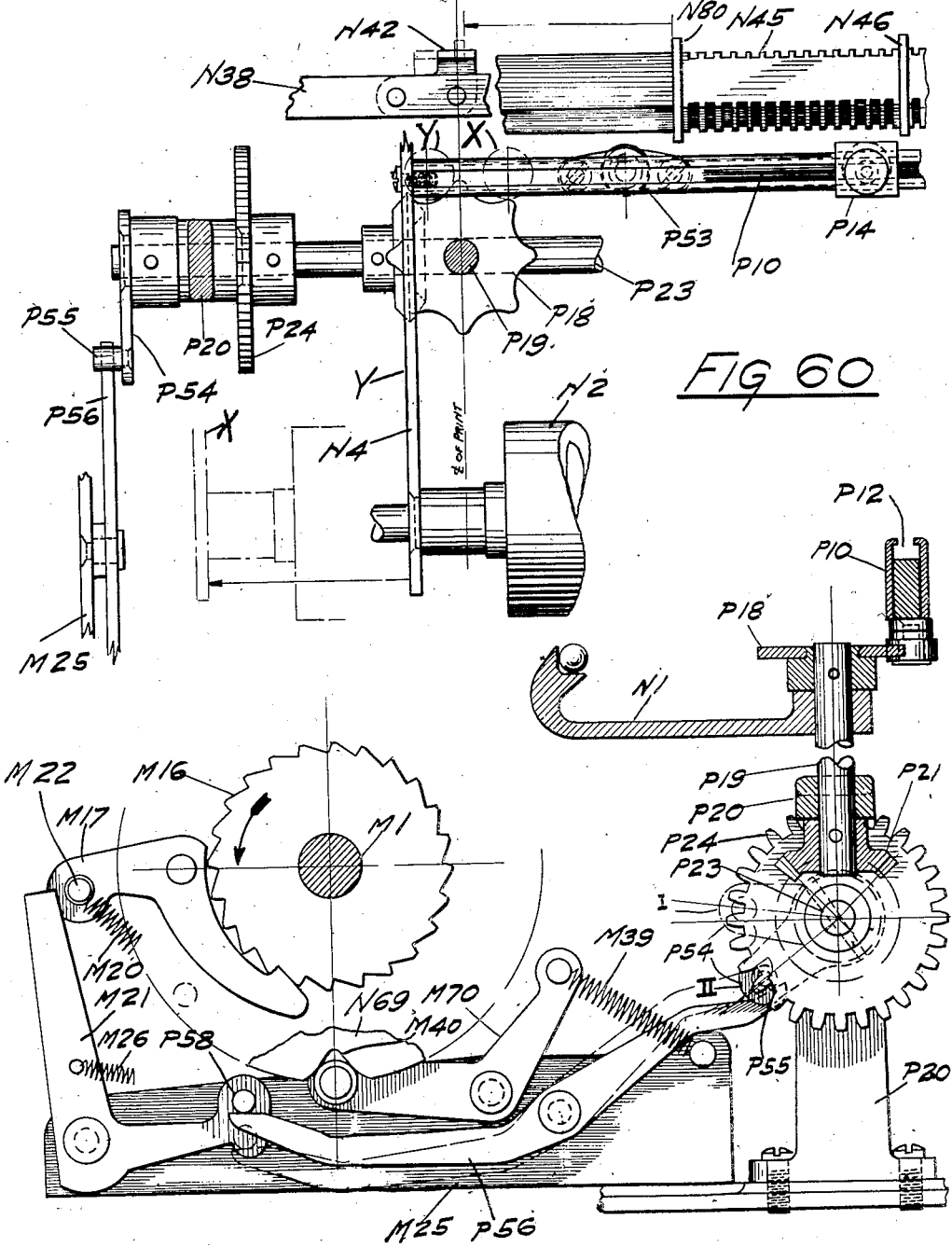

Sept. 1, 1936.  A. F. STURM  2,052,905
ACCOUNTING MACHINE
Filed July 29, 1932  39 Sheets-Sheet 35
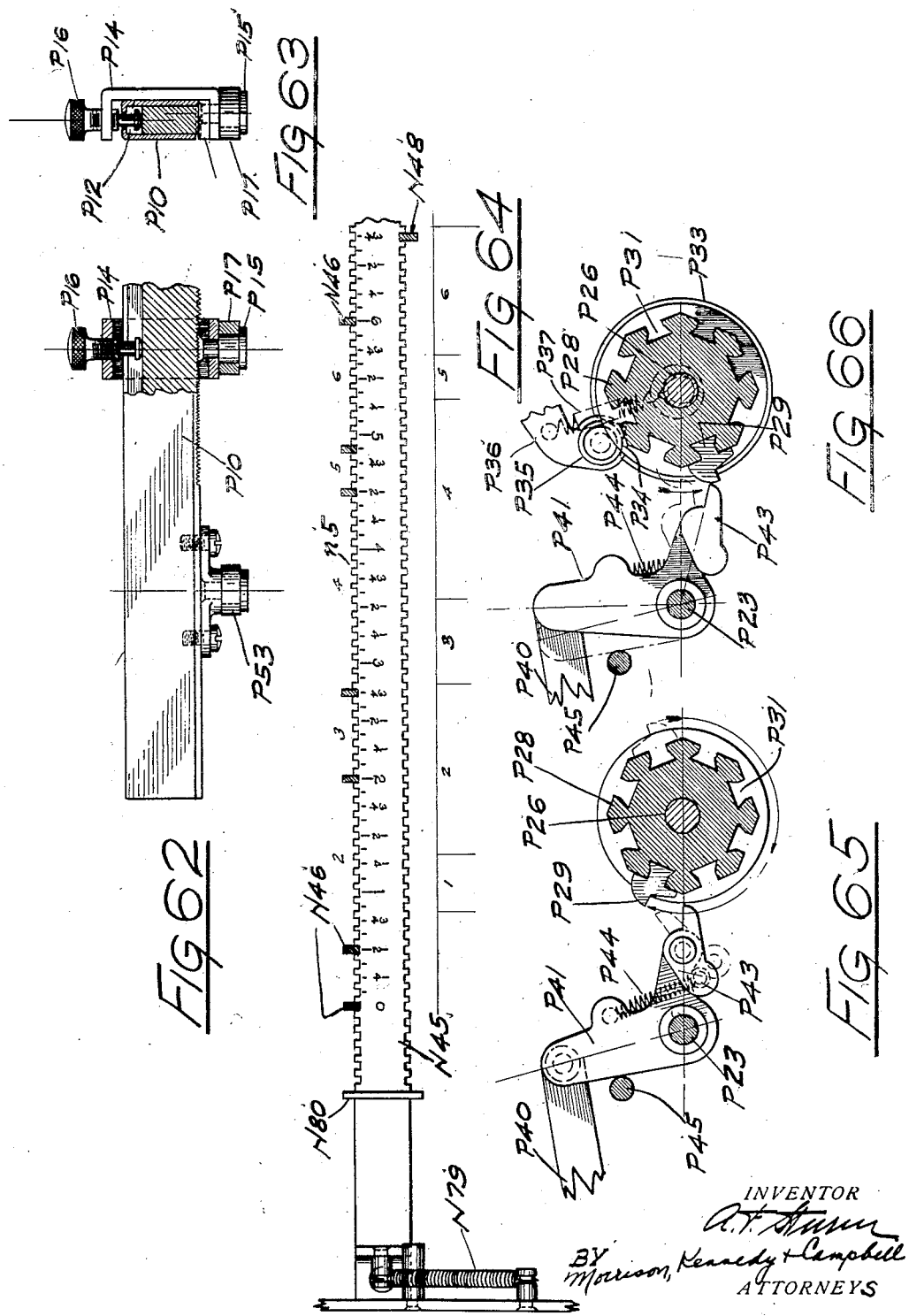

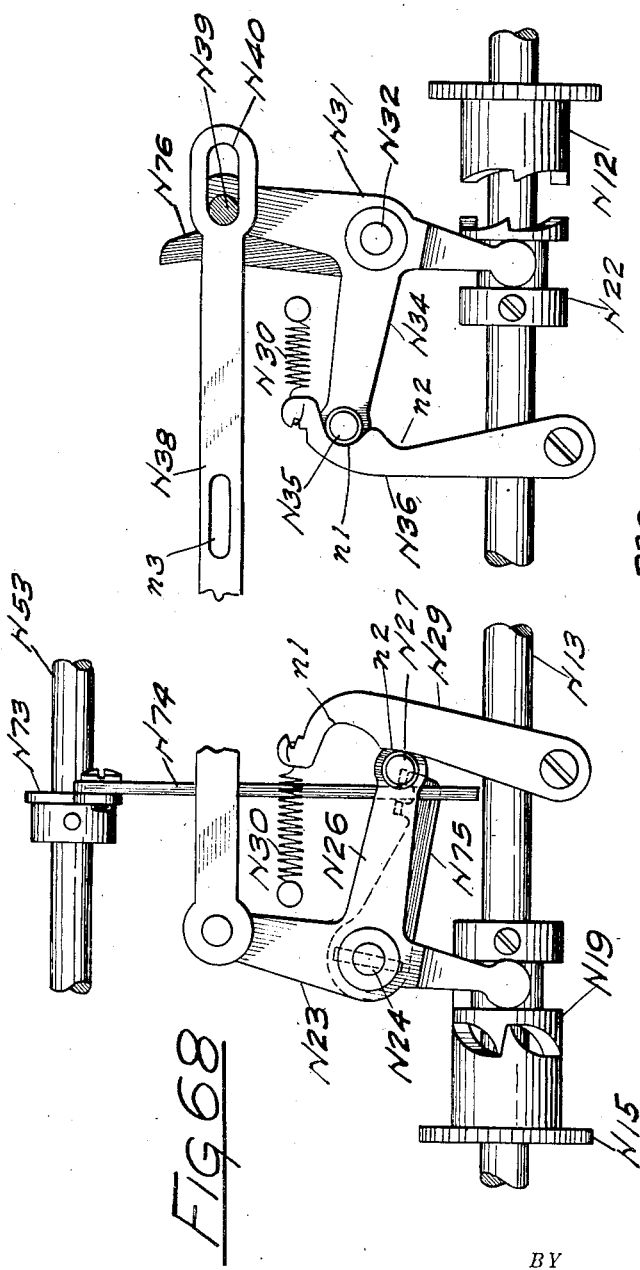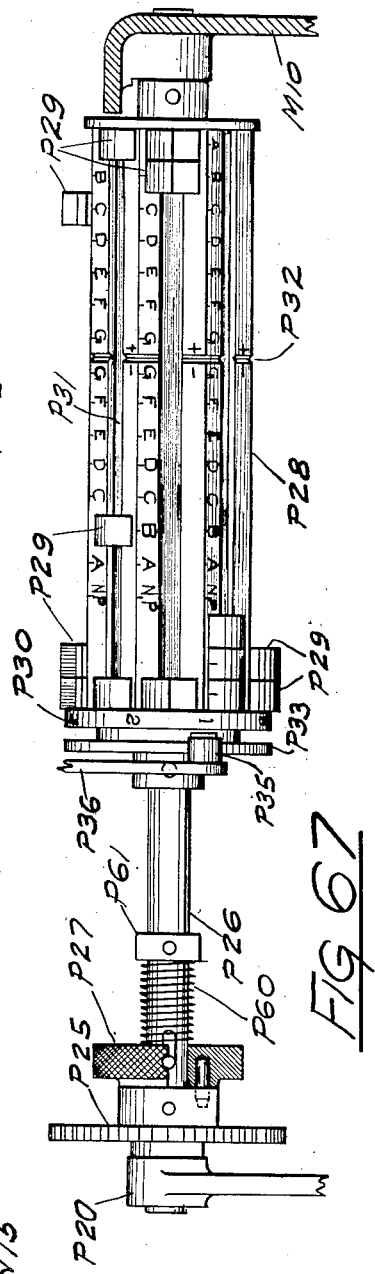

| COL 1 ACCOUNT NO. | COL 2 CREDIT | COL 3 DEBIT | COL 4 BALANCE | |
|---|---|---|---|---|
| 341 | 3261 72 | 372 49 | | |
| | 4729 15 | 2265 50 | | |
| | 1246 27 | 2248 26 | | |
| | 984 35 | 1689 45 | | |
| | 10221 49 | 6575 70 | 3645 79 | |
| 215 | 327 61 | 1278 65 | | |
| | 2439 53 | 3451 97 | | |
| | 1725 56 | 947 00 | | |
| | 876 31 | | | |
| | 1543 17 | | | |
| | 6912 18 | 5677 62 | 1234 56 | |
| 412 | 115 27 | 3729 30 | | |
| | 496 39 | 972 70 | | |
| | 678 84 | 81 65 | | AUTOMATIC ACTUAL NEGATIVE BALANCE – PRINT RED |
| | 1290 50 | 4782 65 | 3492 15 | |
| | | | 9996507 85 | ACTIVE AMOUNT IN ACCUMULATOR |
| | | | 1388 20 | GRAND TOTAL |

FIG 69

Sept. 1, 1936.  A. F. STURM  2,052,905
ACCOUNTING MACHINE
Filed July 29, 1932  39 Sheets-Sheet 38

| DATE | CASH SALES | CREDIT SALES | | ACCOUNTS PAID | | CASH DISBURSM. | TOTAL CREDITS | CASH BALANCE |
|---|---|---|---|---|---|---|---|---|
| | | ACC'T NO | AM'T | ACC'T NO | AM'T | | | |
| | | | | | | | 22527 48 | 26784 73 |
| Nov 3-31 | 21 45 | 214 | 135 15 | | | | | |
| | 15 10 | 536 | 92 38 | | | | | |
| | 26 78 | 537 | 85 00 | 268 | 20 00 | | | |
| | 11 14 | 311 | 127 75 | 145 | 15 00 | 29 30 | | |
| | 11 47 | 392 | 45 60 | 317 | 20 00 | 1 15 | | |
| | 9 65 | 278 | 76 42 | 229 | 10 00 | | | |
| | 17 38 | | | 314 | 15 00 | | | |
| | 7 06 | | | 246 | 10 00 | 6 40 | | |
| | 14 13 | | | 257 | 25 00 | | | |
| | 36 45 | | | 212 | 10 00 | | | |
| | 17 58 | | | 219 | 12 00 | | | |
| | 84 35 | | | 301 | 20 00 | 54 50 | | |
| | | | | | | | | |
| | 375 82 | | 562 30 | | 157 00 | 582 35 | 2293 278 | 2731 7 55 |

ADD ADD ADD SUBTRACT SUBTRACT

FIG 70

INVENTOR.
A. F. Sturm
BY
Morrison, Kennedy & Campbell
ATTORNEYS

Patented Sept. 1, 1936

2,052,905

UNITED STATES PATENT OFFICE 2,052,905

ACCOUNTING MACHINE

Ansgar F. Sturm, New Dorp, Staten Island, N. Y., assignor to Mergenthaler Linotype Company, a corporation of New York Application July 29, 1932, Serial No. 625,590

107 Claims. (Cl. 235—60)

This invention is directed to an improved auditing or accounting machine which is intended to increase materially the range of work capable of being handled by machines of this character and by means of various automatic features to dispense with the major part of the mental effort now required in handling various forms of accounting. The machine is also intended to produce work in a much simpler and more logical form than heretofore, irrespective of the character of the work to be performed. For example, in making up, say, periodical statements for banks, department stores, hotels, etc., the items appearing under "debit" and "credit" are totaled in their respective columns and a single balance thereafter recorded in a separate adjacent column, the totals and actual or true balance being printed automatically whether the latter be positive or negative. Furthermore, if desired, several of such accounts may be handled simultaneously and a grand total (positive or negative) recorded also automatically in the balance column. Business sheets or records may be handled in similar fashion and completely balanced both as to debits and credits without removal from the machine, the individual items thereof being properly distributed although entered without discrimination as to their character.

The different cooperating mechanisms by which the above results are accomplished include generally, one or more accumulators, actuating means therefor, a carrying mechanism, a credit balance mechanism functioning both for positive and negative amounts, a total transfer mechanism, a printing mechanism, and a mechanism for shifting the paper carriage. The machine may have any given number of accumulator sets, all of which are actuated by a single set of reciprocating rack bars, the bars being adapted when moved in one direction to rotate the accumulator wheels for addition and when moved in the other direction to rotate them for subtraction. The bars have a movable range of ten effective spaces in both directions to permit carrying. The accumulators are adjustable vertically into and out of engagement with the actuating bars, their selection being ordinarily controlled by the shifting mechanism of the paper carriage so that the amounts in any particular accumulator will always be printed in the proper column of a sheet. If desired, however, the selection of the individual accumulators may be effected manually by means of corresponding finger keys, when handling special classes of work.

The carrying mechanism is common to all of the accumulators and operates both for addition and subtraction. Carrying is effected through the actuating rack bars, the bars moving an additional space in either direction depending upon whether an addition or subtraction carryover is required. The movable range of ten spaces, above mentioned, is thus required to permit carrying when a bar has moved through nine spaces which is the usual range of movement in other machines of this class.

The credit balance mechanism functions to print the true or actual balance of a series of items regardless of whether the balance is positive or negative. When an amount appearing in an accumulator is positive, it is printed directly. When a larger amount is subtracted from a smaller one, however, the complement of the actual difference appears in the accumulator, but the printing mechanism is automatically prepared under such conditions, to print the complement of the amount in the accumulator which is the actual difference or credit balance. For this purpose, the adjustable type carriers of the printing mechanism are displaceable through a range of ten spaces, instead of the usual nine, and are provided with eleven type elements, representing the numbers 0 to 10, inclusive, (the ten being represented by the character 0). In printing a positive amount, the type carriers are adjusted by the digit wheels of the accumulator being totaled in accordance with the traversed portion of the range of movement of the wheels as the accumulator is cleared, whereas in printing a negative total the type carriers are adjusted in accordance with the untraversed portion of the range of movement of the wheels. The direct printing of the complement of an amount in an accumulator involves borrowing, as in elemental subtraction, and this borrowing operation requires that the type carriers be adjustable so as to print the character "0" both upon maximum and minimum displacement.

The total transfer mechanism permits an amount, appearing in one accumulator, to be transferred either additively or subtractively into another accumulator or directly into two accumulators simultaneously.

A single power driven unit is provided for moving the paper carriage in opposite directions, relatively to the printing unit, and the carriage mechanism also includes means for arresting the carriage in different predetermined positions to effect the columnar spacing of the work.

Substantially all of the functions of the machine may be automatically controlled. For example, the accumulators to be used, as well as the operations to be performed therein, for any particular columnar position of the carriage may be predetermined, so that upon the arrival of the carriage at such position, the necessary controls for selecting and conditioning the accumulators for operation will function automatically and without any mental effort on the part of the operator. The printing mechanism may likewise be controlled so as to be rendered operative or inoperative as desired, resulting in the printing or non-printing of amounts registered in the accumulators. Such automatic means preferably is positively driven, particularly where a large number of functions are controlled simultaneously, thus avoiding the use of large springs and shock absorbers on the carriage. However, if desired, the automatic control device may be actuated from a carriage operated in the usual manner.

The machine is comparatively simple, small and compact, and the number of accumulators that may be employed is determined only by the particular class of work to be performed. The construction of the various parts involved and the manner in which they cooperate will best be understood from the detailed description to follow.

In the accompanying drawings the invention has been shown in its preferred form merely by way of example and in connection with an accounting machine, but it will be obvious to those skilled in the art that it is equally applicable to cash registers and to other machines of similar character. It should, therefore, be understood that the invention is not limited to any specific form or embodiment except insofar as such limitations are specified in the appended claims.

Referring to the drawings:

Fig. 2 is a diagrammatic illustration of an actuator rack bar, showing its cooperation with the printing mechanism;

Fig. 3 illustrates the operation of an accumulator digit wheel during an adding operation;

Fig. 4 is a similar illustration for a subtraction operation;

Fig. 5 shows the construction of an accumulator digit wheel in detail;

Fig. 6 is a partial section on the line 6—6 of Fig. 2, showing the construction of part of the printing mechanism in detail;

Fig. 7 is a diagrammatic view illustrating a totaling operation;

Fig. 8 is a diagrammatic view illustrating a negative totaling operation;

Fig. 11 is a partial section on the line 11—11 of Fig. 1, the parts being shown in a normal position;

Fig. 11a is a detail showing the construction of the first subsidiary rack bar;

Fig. 12 is a partial section on line 12—12 of Fig. 1, the parts being shown in a different position from Fig. 11;

Fig. 13 is a plan view, showing the various mechanisms in detail;

Fig. 14 is an elevation showing a portion of the mechanism for operating the rack bars;

Fig. 15 is a similar view showing certain of the parts in a different position;

Fig. 16 is a detail showing a part of the carry-over control mechanism during one phase of its operation;

Fig. 17 is an elevation of the carry-over control mechanism showing the position of the parts in another phase of its operation;

Figure 33B:
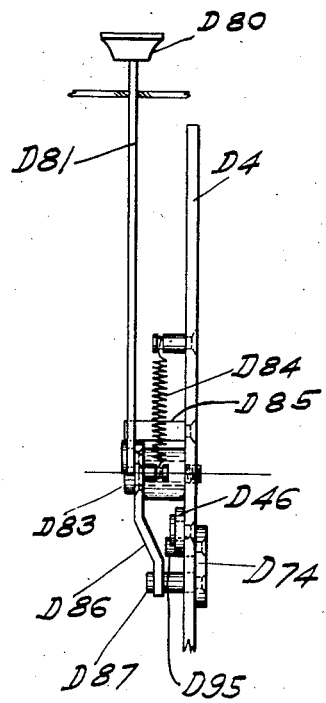
Figure 33A:
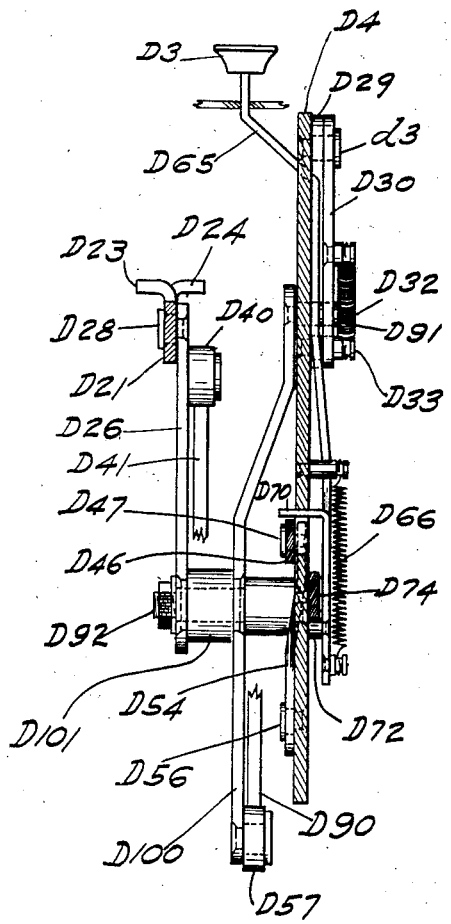
Figure 34:
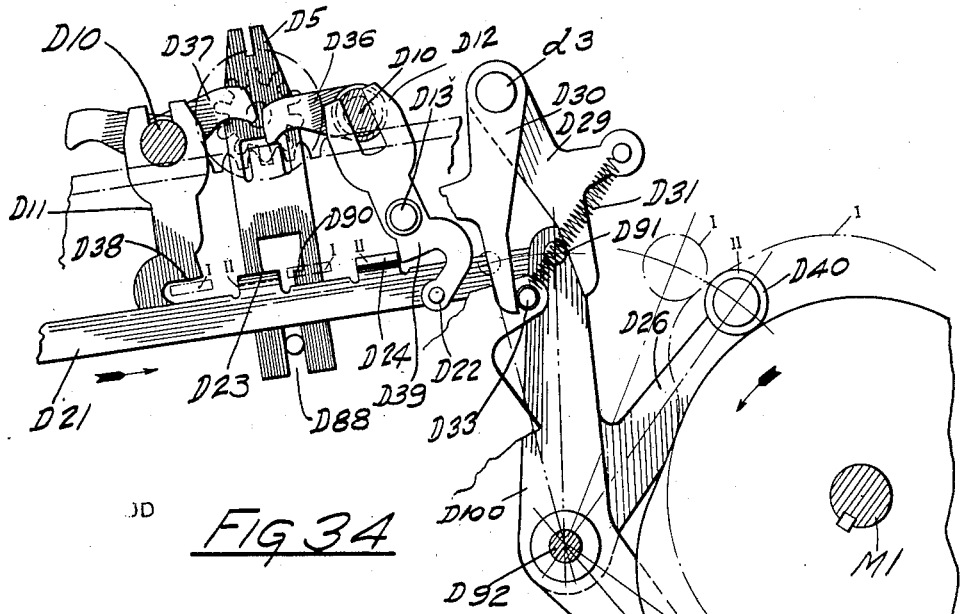
Figure 35:
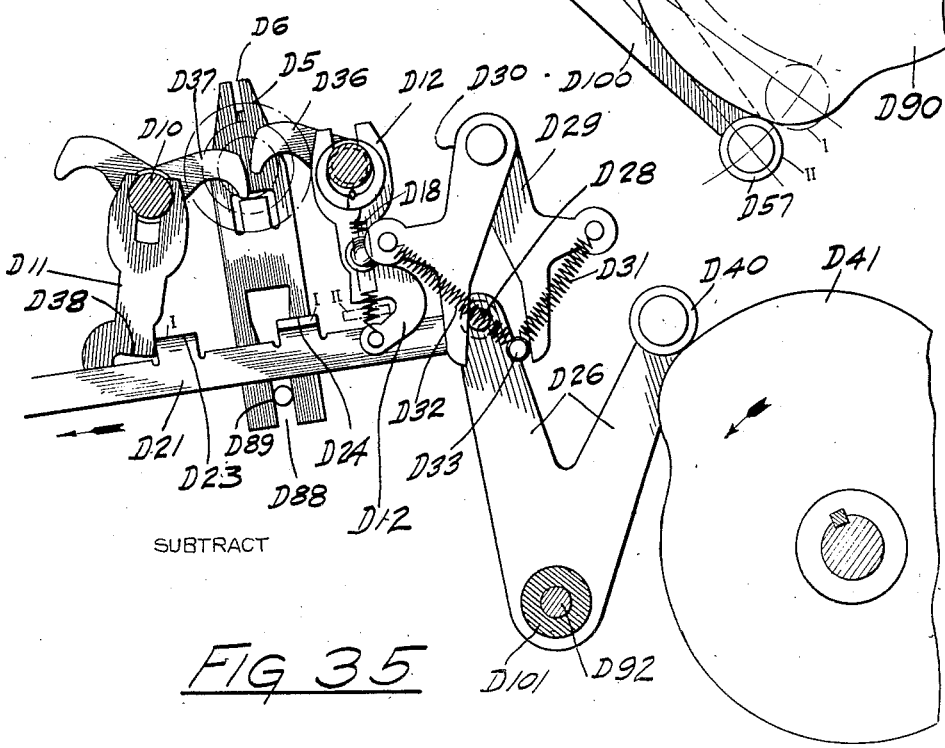
Figure 45:
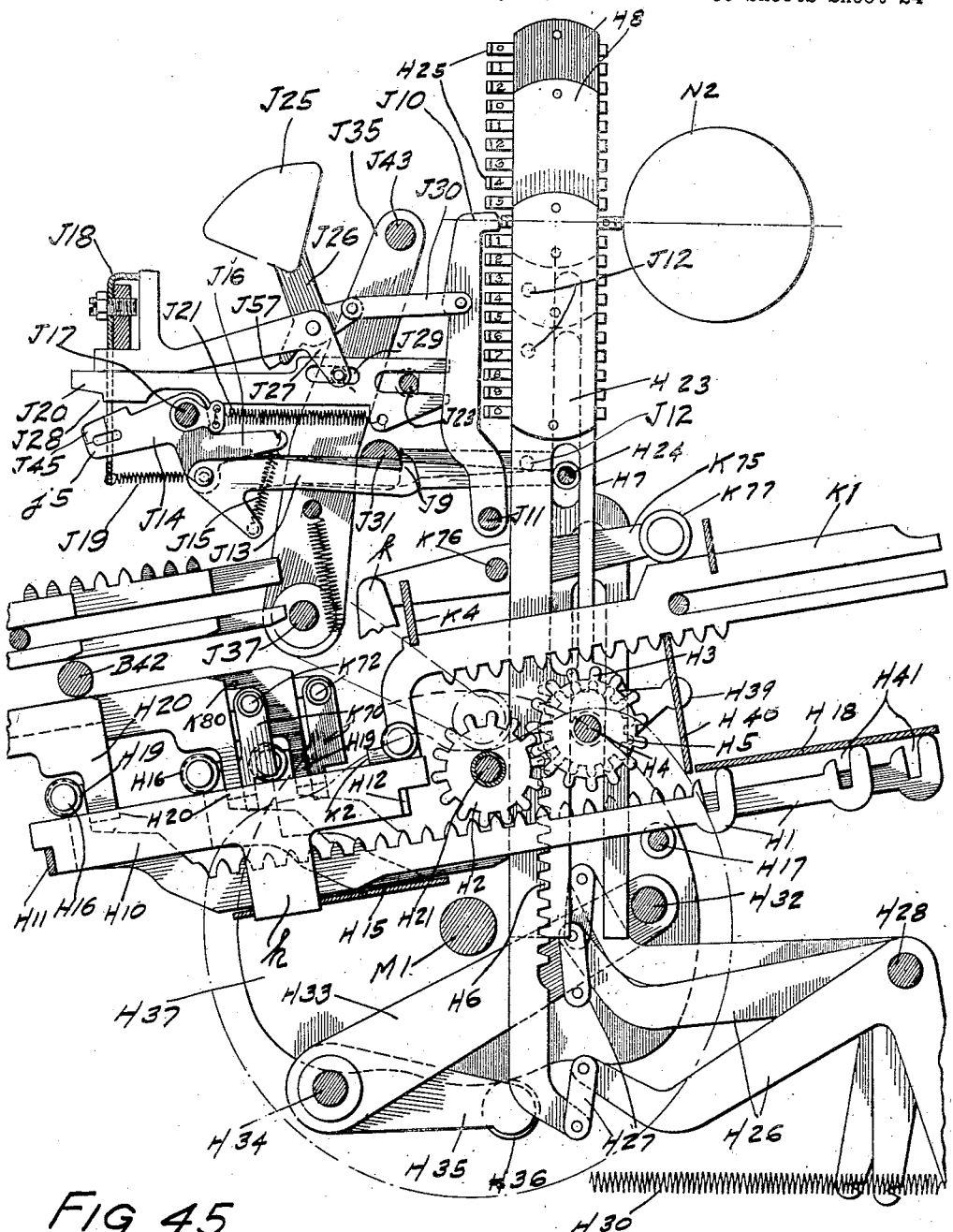
Figure 46:
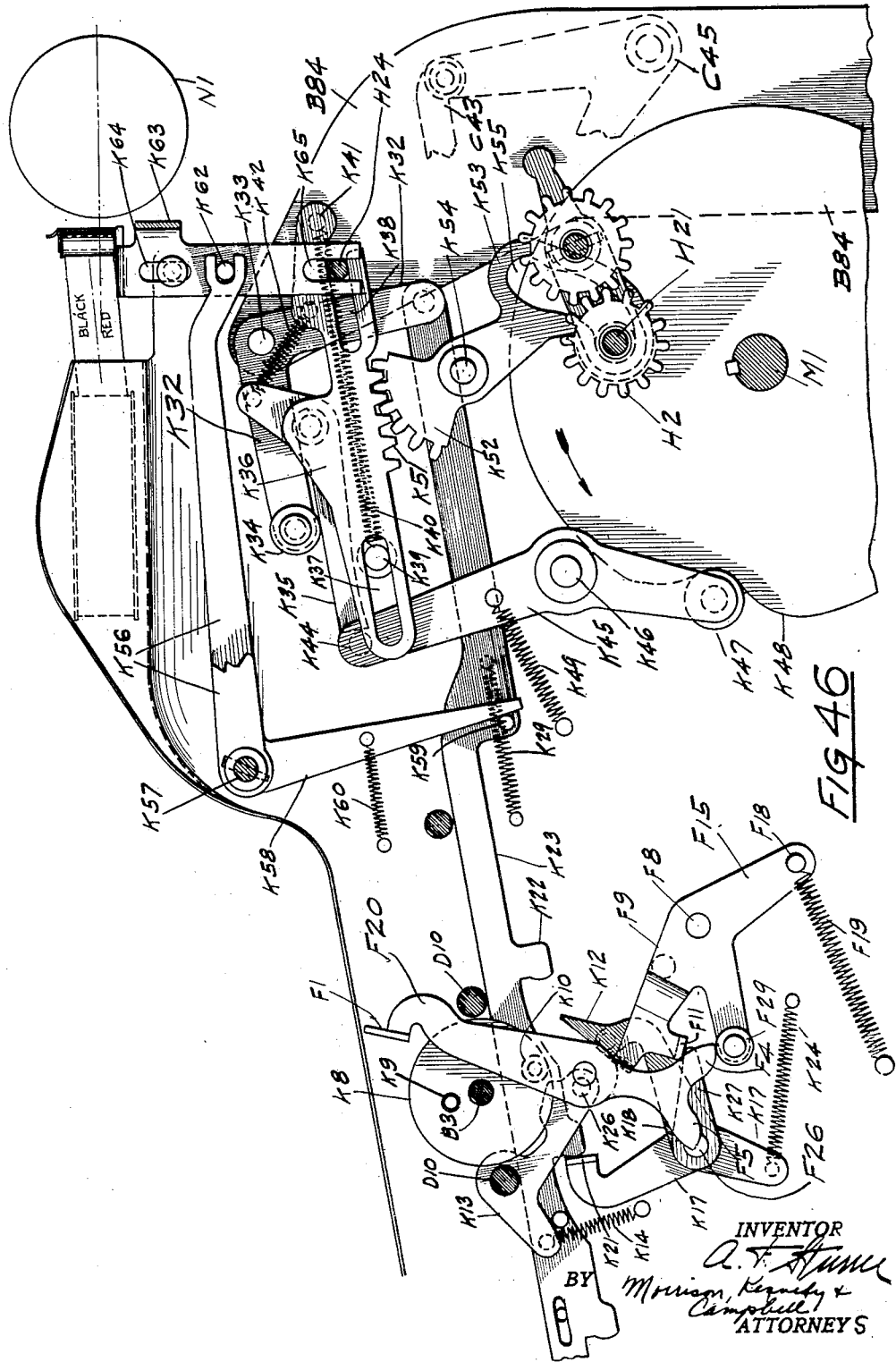
Figures 50, 51:
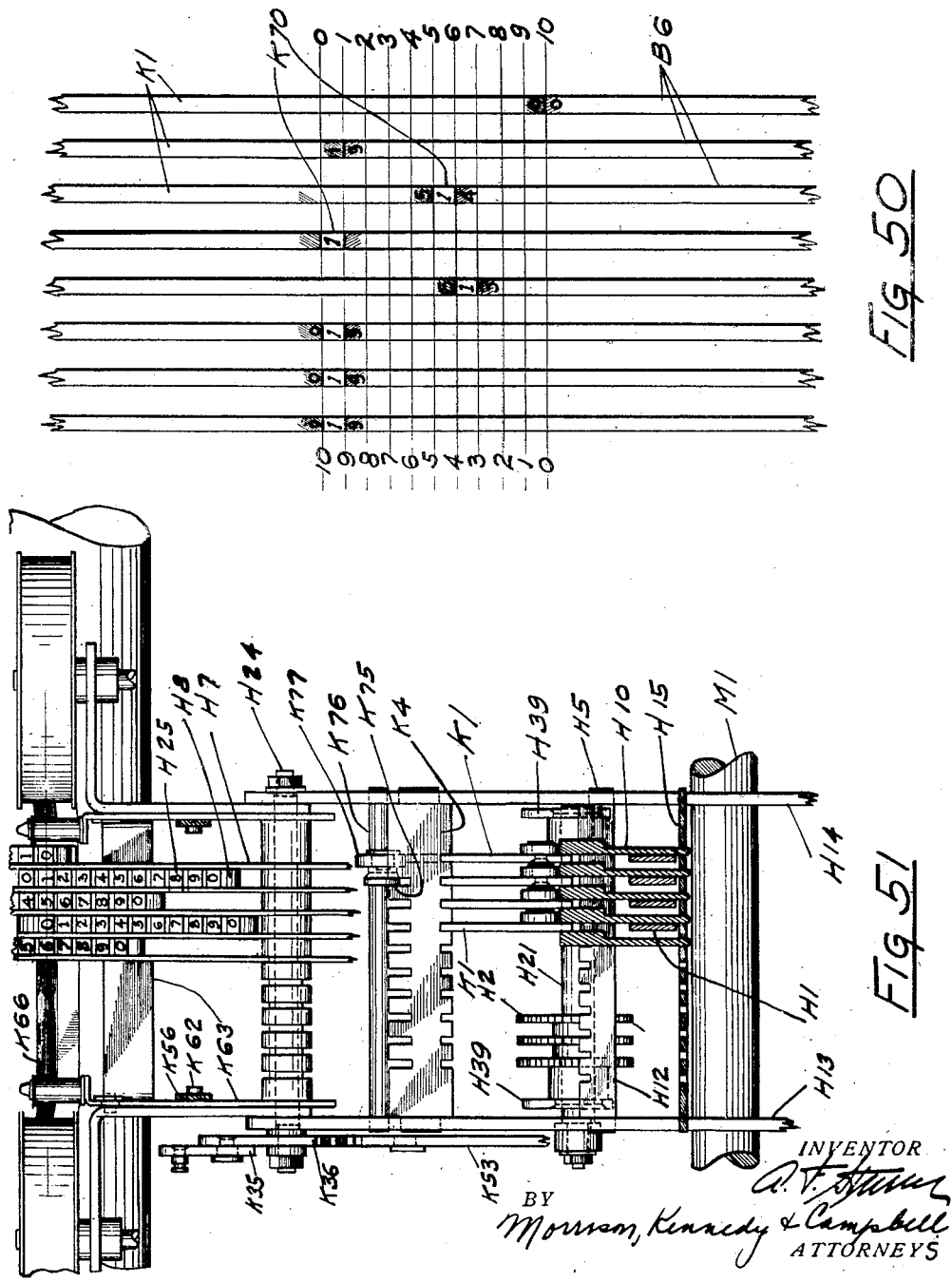
Figure 52:
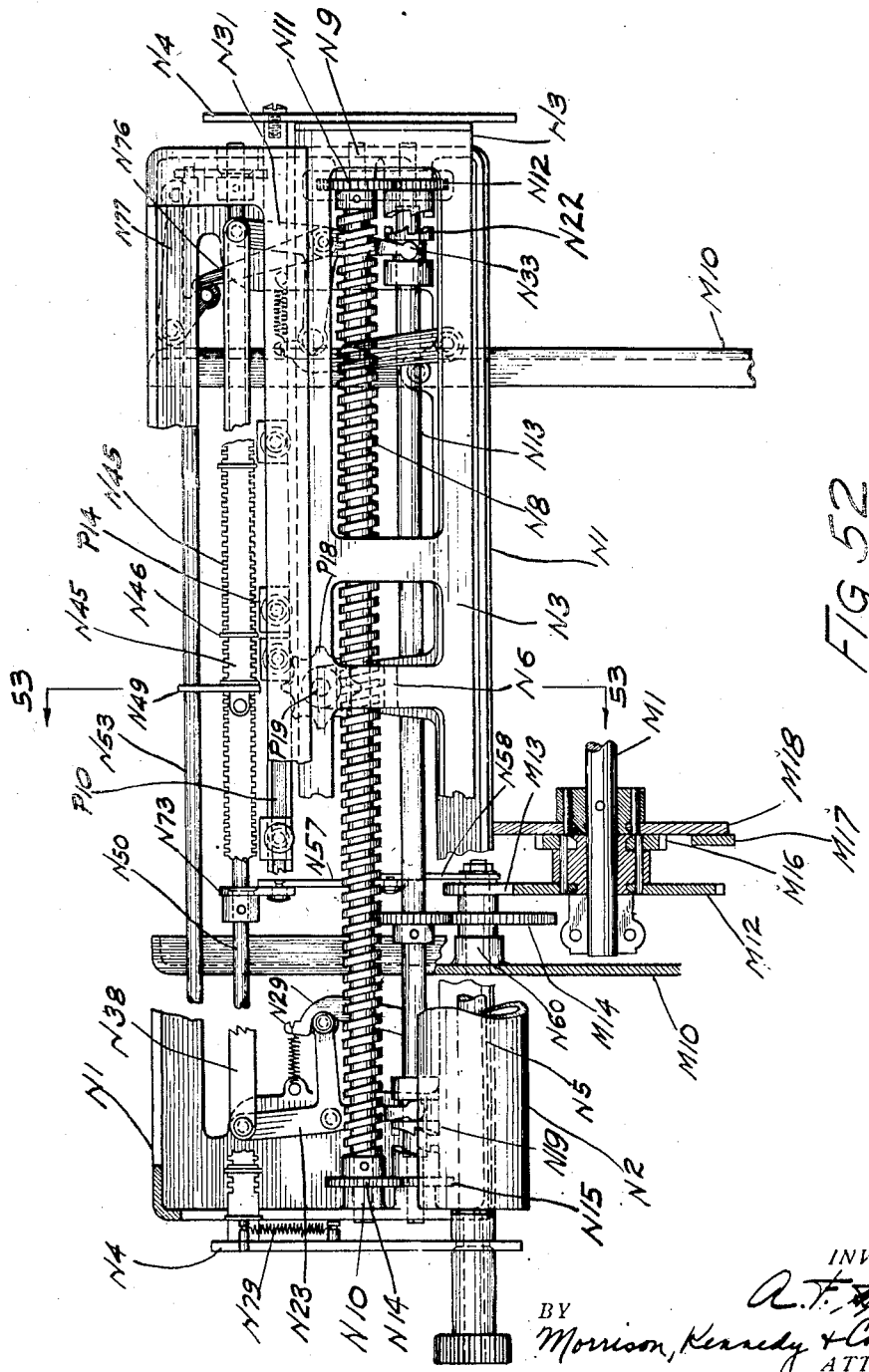
Figure 59:
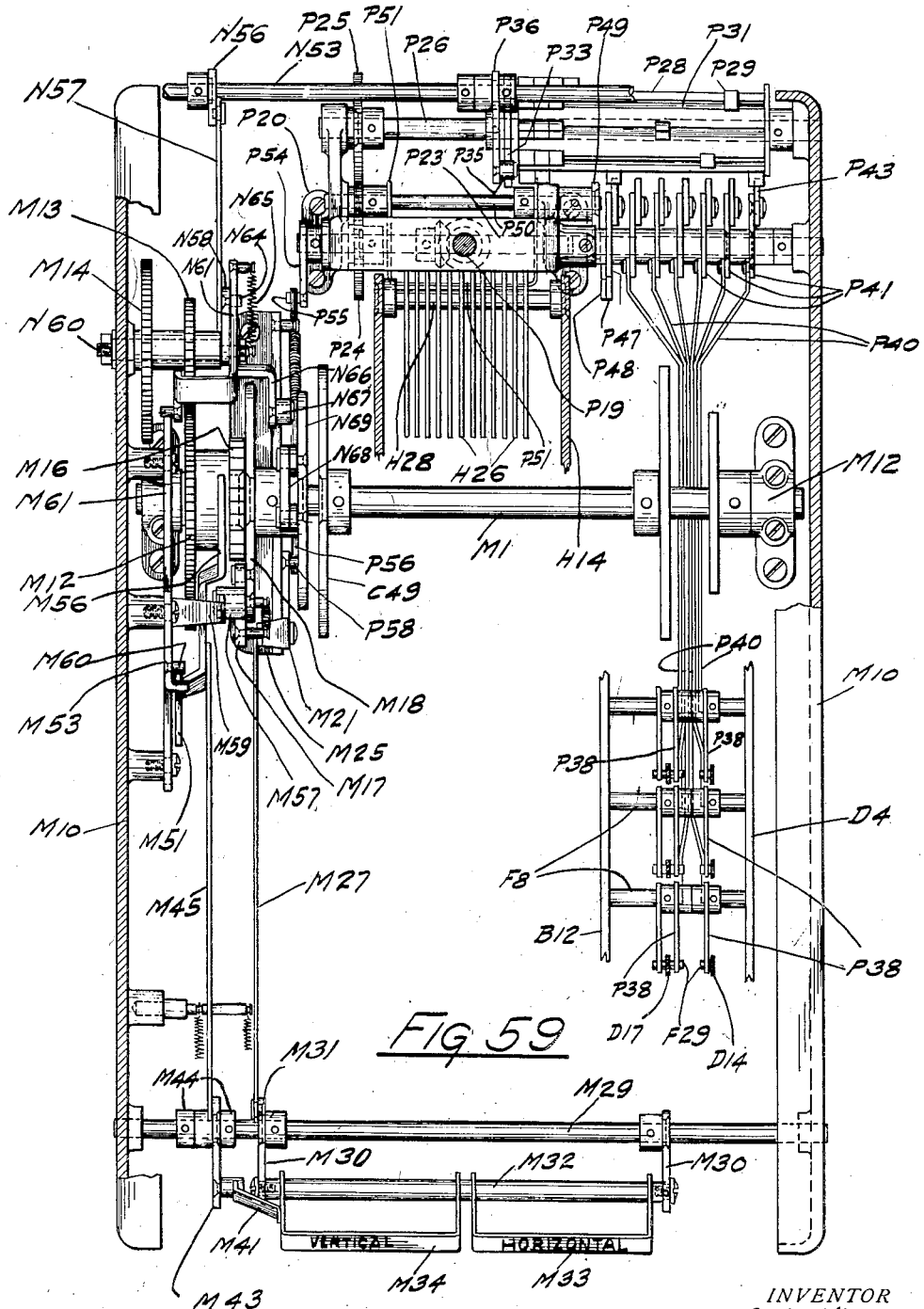
Figure 71:
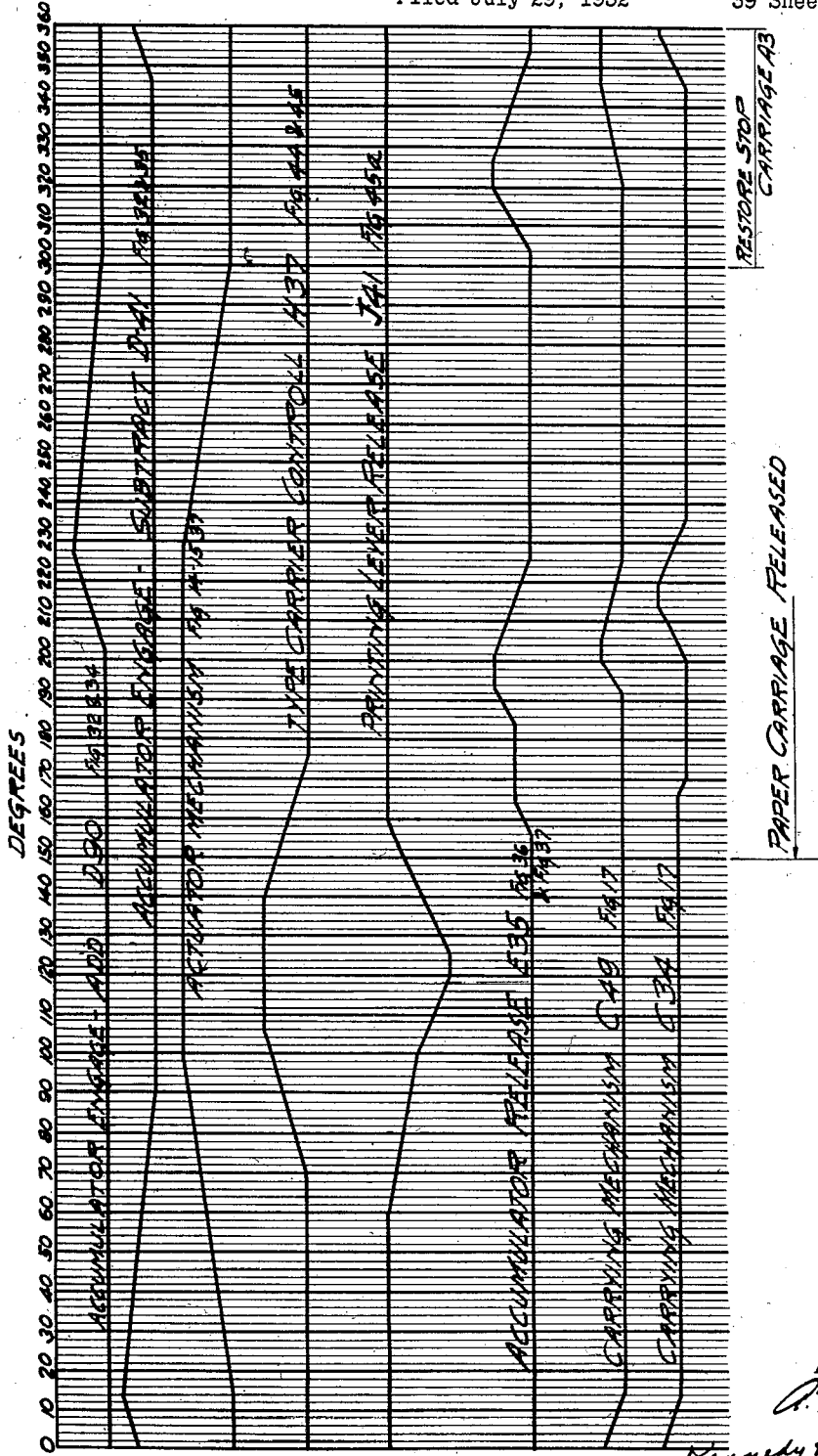

Figs. 18 to 26, inclusive, show parts of the carry-over mechanism in different operative positions;

Figs. 27 and 28 are detail views of part of the negative totaling mechanism;

Fig. 29 is a section on line 29—29 of Fig. 11;

Fig. 30 is a vertical section showing the construction of the accumulator supports in detail;

Fig. 30a is a horizontal section taken on the line 30a—30a of Fig. 29;

Fig. 31 is a detail face view of one of the accumulator supports and parts associated therewith;

Fig. 32 is an elevation showing the accumulator control mechanism;

Fig. 33 is an elevation showing the locking and release mechanisms for the accumulator selecting keys;

Fig. 33a is a vertical section taken on line 33a—33a of Fig. 32;

Fig. 33b is a front view of the release mechanism shown in Fig. 33;

Fig. 34 is an elevation showing a portion of the accumulator control mechanism and the relative position of the parts during an adding operation;

Fig. 35 is a similar view showing the relative position of the parts during a subtraction operation;

Figs. 36 and 37 are elevations showing the accumulator release mechanism in various stages of operation;

Fig. 38 is a similar view showing a portion of the accumulator release mechanism and the relative position of the parts during a sub-totaling operation;

Fig. 39 is an elevation of the total mechanism showing the relative position of the parts in taking a positive total;

Fig. 40 is a similar view showing the relative position of the parts when taking a negative total;

Figs. 41, 42 and 43 illustrate details of construction of the totaling mechanism;

Fig. 44 is an elevation partly in section of the printing mechanism showing the parts in a normal position of rest;

Fig. 45 is a similar view showing the parts in active position;

Figs. 45a, b, and c, are respectively detail views of portions of the control mechanism for the type actuating elements;

Fig. 46 is a view similar to Fig. 39 showing the relative position of the parts in taking a negative total;

Figs. 47, 48 and 49, are elevations showing corresponding units of the negative totaling mechanism in different operative positions respectively;

Fig. 50 is a diagram showing the relative position of the rack bars B6 and K1 in printing a negative total;

Fig. 51 is a vertical section taken on the line 51—51 of Fig. 44;

Fig. 52 is a plan view, partly in section of the paper carriage;

Fig. 53 is an elevation of the power drive and automatic control mechanism, showing the paper carriage and other parts in section;

Fig. 54 is a detail of the driving gears for the paper carriage;

Fig. 55 is a top plan view showing the mechanism for controlling the direction of movement of the paper carriage;

Fig. 56 is a detail vertical section showing a part of the paper carriage release mechanism;

Fig. 57 is an elevation showing the mechanism for inaugurating a cycle of operation where vertical spacing is desired;

Fig. 58 is a similar view showing the mechanism for inaugurating a cycle of operation where horizontal spacing is desired;

Fig. 59 is a top plan view showing the power control part of the paper carriage release mechanism, and the means for effecting automatic distribution;

Figs. 60 and 61 are detail views showing part of the mechanism for reversing the direction of the paper carriage after its return movement;

Figs. 62 and 63 are detail views of certain parts of the automatic control mechanism;

Fig. 64 is a detail view of certain parts of the paper carriage control mechanism;

Figs. 65 and 66 are detail views showing the operation of part of the automatic control mechanism;

Fig. 67 is a detail view of the automatic control cylinder and parts associated therewith;

Fig. 68 is a view similar to Fig. 55 showing the parts in a different position;

Fig. 69 is an example of work that may be performed in the machine;

Fig. 70 is another example of work that may also be performed on the machine if the latter is equipped with six accumulators;

Fig. 71 is a time chart for the machine operating cams.

*Accumulators, stop carriage and general operation*

Figure 1:
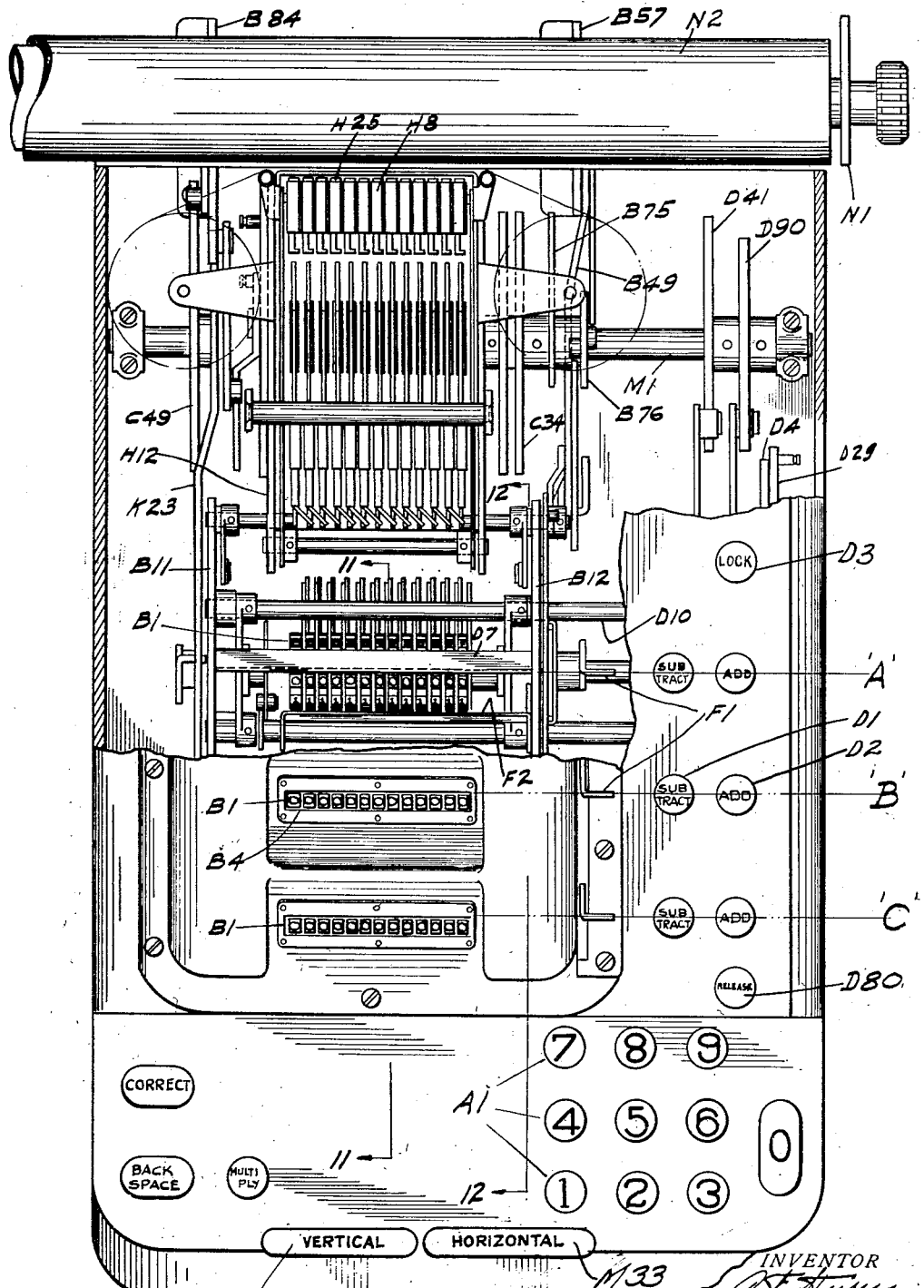
Fig. 1 is a plan view of the machine, with part of the casing broken away, showing the internal mechanism.

As shown in Fig. 1, the machine is equipped with three accumulator sets A, B and C, although a greater or a less number may be employed, if desired. Each set (see Figs. 13 and 29) comprises a plurality of digit wheels B2 rotatably mounted, side by side, on a shaft B3, and provided respectively with the characters 0 to 9, inclusive, which are distributed in numerical order around the peripheral edges of the wheels. As shown best in Fig. 5, each digit wheel B2 includes a pair of thin discs B10 secured to their opposite side faces, and also a small gear wheel B5 by means of which they are rotated. The disc B10 at the right (Fig. 5) is provided with an arresting tooth or tit B8 for locating the digit wheel in the zero position, and the other disc at the left with a corresponding tooth or tit B9, which controls the carrying operation from one digit wheel to another. By depressing a key D1 of a selected accumulator set (Fig. 1) the latter, after the cycle of operation is inaugurated will be engaged with the underlying rack bars B6 of the actuating mechanism before they are moved rearwardly in effecting subtraction; whereas, by depressing a key D2 of the selected accumulator set, it will be engaged with the rack bars just before they start their return movement in effecting addition. The selection of the keys D1 and D2 may be made manually or automatically, the automatic selection being controlled by the movement of the paper carriage. In the latter instances, the items inserted in the machine are distributed to the proper accumulators and added or subtracted therein according to the character of the transaction in the particular column of the sheet in which the items are to be entered. The rack bars B6 are arranged directly beneath the accumulator sets A, B and C, which are movable downwardly and upwardly to carry the gears B5 of the digit wheels into and out of mesh with the said bars. Such engagement of the accumulator sets (hereinafter referred to as "accumulators") with the rack bars is automatic and the selection of the accumulator to be used is accomplished by depressing one or the other of the finger keys D1, D2, associated with that accumulator.

Figure 9:
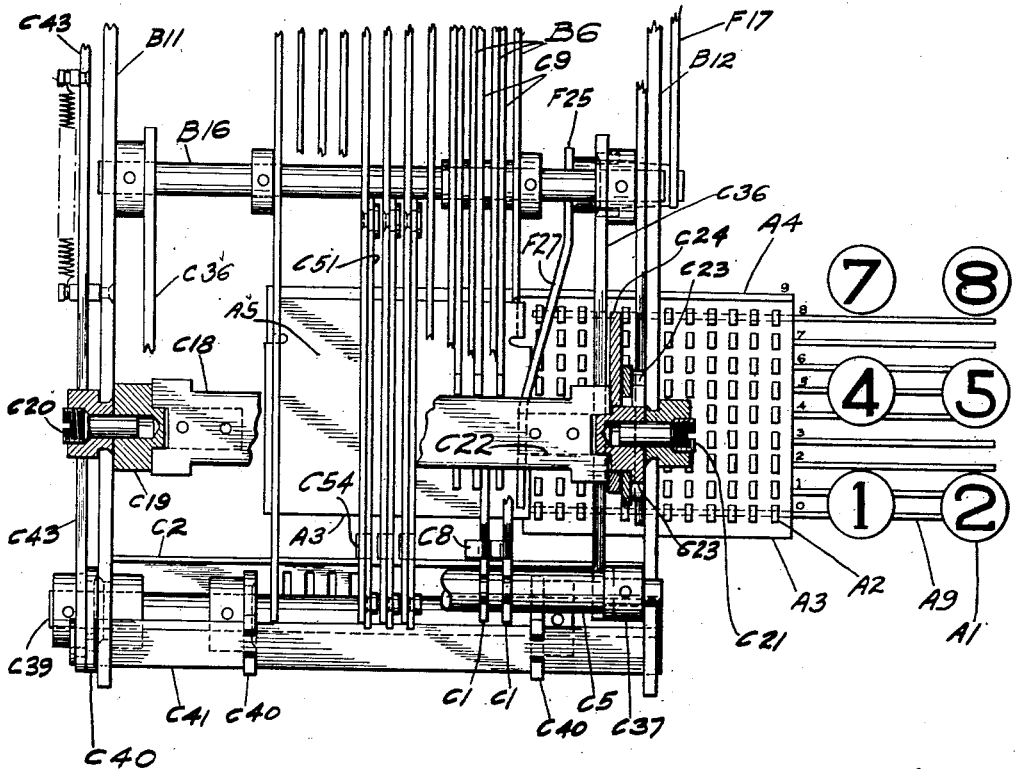
Fig. 9 is a plan view of the stop carriage and associated parts.
Figure 10:
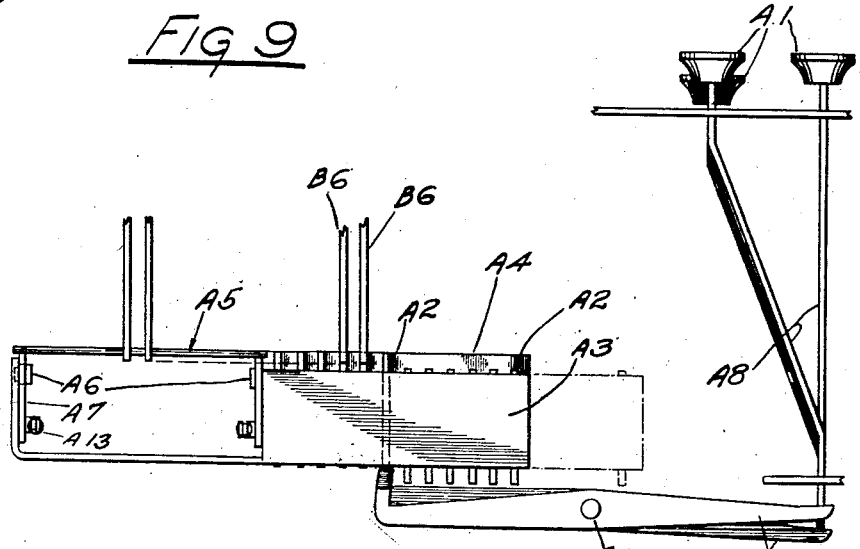
Fig. 10 is a front elevation showing the connections between the digit keys and the stop carriage.

The rack bars B6 extend fore and aft of the machine and are displaced rearwardly and returned once during each machine cycle of operation. The distance through which the rack bars are displaced in any cycle determines the extent of rotation of the accumulator wheels engaged therewith. The displacement of the rack bars B6 is controlled from a key board (Fig. 1) having a set of ten digit keys which are numbered 1 through 9 to 0 respectively, and, when depressed, raise the corresponding stop fingers A2 (Figs. 9 and 10) of a stop carriage A3, into the path of the rack bars to limit their rearward movement. The stop carriage A3, which may be of any suitable construction, is arranged directly below the front ends of the rack bars B6, and includes nine rows of the stops A2 extending horizontally across the carriage, the stops of each row corresponding in number to the number of digit wheels in each accumulator. The individual rows (see Figs. 9 and 10) are numbered 0 to 8 and all the stops in each row are controlled by the same digit key A1. The tenth stop (designated "9", Figs. 9 and 12) is common to all the rack bars and consists of a flange A4 extending the full width of the carriage.

An amount is entered in the machine by depressing the digit keys in the sequence of the digits from left to right. Thus to enter an amount, say 65, the key numbered 6 is depressed which causes the first stop at the left of the row indicated by 6 in Fig. 9 (which is the seventh row from the front of the carriage), to be raised, the carriage at the same time being allowed to escape one space to the left. The second stop from the left in the row corresponding to the key 5 is then raised in a similar manner by depressing the key 5, and the carriage is allowed to escape another space to the left; thus placing this stop in the path of the first rack bar B6 and the stop previously raised in the path of the next adjacent rack bar on the left, these operations being repeated for each successive place in any given amount. The connections between the individual digit keys A1 and the stops A2 consist of a set of horizontally disposed rocker arms A9 (Fig. 10) pivoted on a fixed axis A10 and arranged in operative relation to the vertical stems A8 of the said keys. The escapement mechanism has been omitted to avoid unnecessary complications in the drawings. To prevent the rearward movement of all the rack bars B6 except those aligned with the raised stops A2, the carriage is further provided with a retaining plate A5, which is hingedly connected thereto by depending side arms A7 and held upwardly in active position with its front edge opposed to said bars, by a pair of pull springs A13 (see Fig. 10).

The printing mechanism (to be described in more detail later on) is arranged at the rear of the rack bars B6 and includes a set of vertical slides or type bars H7 (Fig. 2) which are movable individually upwardly and downwardly through ten active spaces from and to the zero position to locate one or another of a series of type elements into and out of operative relation to a platen or printing roll N2. The upward movements of the bars H7 are effected by pull springs H30 (Fig. 44) and are controlled by the rearward movement of the rack bars B6 through intermediate gear sets and one or the other of two series of auxiliary rack bars HI and KI respectively. If a main rack bar is allowed to move, say six spaces (as shown in Fig. 2) into contact with a stop of the carriage A3, the associated auxiliary bar HI is caused to follow it by the pull of the springs H30 so that the vertical type bars H7 may be allowed to rise a corresponding number of spaces.

In "recording", the accumulators are not used, a given amount being entered by actuating the digit keys AI and then printed automatically during the machine cycle of operation. The machine is motor driven and each cycle is inaugurated by actuating one or the other of a pair of motor keys M33, M34, (Fig. 1), located conveniently adjacent the digit keys AI.

In adding, an amount entered in the manner above stated will be registered in a selected accumulator by the return movement of the rack bars B6, which are adapted to turn the digit wheels B2 in a clockwise direction, the said accumulator being caused to engage the rack bars immediately after they are advanced against the stops A2 of the carriage. If the amount is, say "6", the digit wheels will be turned through six spaces so as to register "6". In subtraction, the registering operation is effected by the rearward movement of the rack bars B6, which movement is adapted to turn the digit wheels B2 in the opposite or counter-clockwise direction, the selected accumulator at this time being caused to engage said bars before they are advanced. Consequently, if the amount to be subtracted is 6, and the corresponding digit wheel is located in zero position, the said wheel will be turned again through six spaces, but will now register "4" (compare Figs. 3 and 4).

The carrying operation for addition (i. e., carrying the 1 from a digit wheel of a lower order which has passed through 9 to 0 to the next adjacent wheel of higher order) is effected at the end of the forward or return movement of the rack bars B6, whereas, the carrying operation for subtraction is effected at the end of the rearward movement of the rack bars B6, the accumulators remaining engaged during the carrying operations and being raised to inactive position immediately after such operations have been completed.

In printing a total appearing in any one of the accumulators A, B or C, the keyboard and stops of the carriage A3 are not used, and the selected accumulator is engaged with the bars B6 as in subtraction or before they are moved rearwardly. In such instances, a bar F2, (one being associated with each of the accumulators, Fig. 7), is swung rearwardly into a position to engage the lugs or tits B8 of the digit wheels so as to stop the latter in the zero position as they are turned counter-clockwise by the main rack bars B6. As the digit wheels are arrested, the corresponding rack bars will also be arrested, through their engagement with the gear wheels B5, in different positions according to the extent of rotation of the individual digit wheels, and the type bars H7 will be allowed to rise a corresponding number of spaces to locate the proper type elements in the printing position. The operation of the bars F2 is controlled by manually operated total levers F1 arranged adjacent the respective accumulators, the levers also being adapted when actuated to cause the depression of the retaining plate A5 out of the path of the rack bars B6.

A total appearing in accumulator A, for example, may be added to or subtracted from a total appearing in, say the accumulator B, by merely operating the total lever F1 of the former and depressing the selecting key D2 or D1 of the latter.

If the balance to be printed after a subtraction operation happens to be a negative amount, the complement of the true balance will appear in the accumulator, but the correct amount will be printed automatically. This result is accomplished in the present instance, and as will be more fully described in the detailed description to follow, by employing the stop bar F2 to arrest the rearward movement of the rack bars B6 and automatically substituting for the rack bars HI, the second series of auxiliary rack bars KI, which are moved forwardly from the rear to meet the rack bars B6, and which determine the extent of the upward movement of the type carrying bars H7, see Fig. 8.

*Accumulator actuating mechanism*

The accumulator actuating mechanism is common to all three accumulators, A, B and C, and in the present instance is adapted to function at different stages during each machine cycle to rotate the digit wheels of selected accumulators in one direction for addition and in the other direction for substraction. This mechanism (see Figs. 9, 11 and 12) is supported between upright side frames B11 and B12, fixedly mounted upon the base plate of the machine, and includes the series of main rack bars B6 which are equal in number to the number of digit wheels in each accumulator. As shown in Fig. 11, the bars B6 are formed on their upper edges with a row of teeth B7 and on their lower edges with a row of similar teeth B13. At their front and rear ends the bars B6 are formed with slots B14 and B15 (see Fig. 2) by means of which they are slidably supported and guided on annularly grooved shafts B16 and B17. The lower front edge of each rack bar B6 is cut away at B18 to provide clearance for the stop carriage A3 and at this end they terminate in nose portions B19 adapted to abut against the raised stops A2 when the bars are advanced. Each of the bars B6 is actuated by a set of reduction gears B20 and B21 rotatably mounted on a shaft B22 supported in the side frames B11 and B12. The gears B20 mesh with the teeth B13 on the lower edge of the actuating bars, and the gears B21 with a set of subsidiary racks B23, the latter as best shown in Figs. 11 and 12 being arranged below the bars B6 and mounted for a limited fore-and-aft movement. At their front ends, the racks B23 are guided in a fixed comb plate B26 extending transversely between a pair of bracket members B82, and at their rear ends are supported upon a rod B27 which is also mounted in the side frames B11 and B12. Depending from the rear end of the racks B23 are projections B34, to which are attached tension springs B35 anchored to a bar B36 extending crosswise of the machine and mounted in a pair of fore-and-aft frame members B37 (see Figs. 11 and 29). These members B37 are arranged one adjacent the inner side of each of the two stand brackets B82 (Fig. 12) and are guided therein at their forward ends by means of pins B38 slidably mounted in slots B39 formed in said brackets. The rear ends of the sliding frame members B37 are loosely connected at B40 to a pair of vertically disposed actuating arms B41, depending from a rock shaft B42, which is controlled from the main shaft M1, in a manner presently to be described.

An additional sliding member B28 (Figs. 11 and 12) is connected to each of the subsidiary racks B23 (except the first, as shown in Fig. 11a) by pins and slots b, b1. Both the racks and sliding members have projections B29 and B30, respectively, which are connected together by strong pull springs B31. The movement of the auxiliary rack bars B23 is controlled by a bail rod B32 common to all said bars and connected to the actuating arms B41 through the medium of angular supporting arms B33, which receive support from the sliding frame members B37 by means of pin and slot connections B44 and B45 (see Fig. 11).

When the rock shaft B42 is turned in one direction to swing the arms B41 forwardly, the tension of the springs B31 is first neutralized and the springs B35 are then placed under tension so as to pull the subsidiary rack bars B23 forwardly and through the gears B20 and B21 to force the actuating rack bars B6 rearwardly until they are arrested by the engagement of the nose portions B19 with the stops A2 of the carriage A3. On the other hand when the rock shaft B42 is turned in the other direction to swing the arms B41 rearwardly, the bail rod B32 is adapted to push the auxiliary bars B23 also rearwardly and, finally, through its engagement with the sliding members B28 to stretch the springs B31. The main rack bars B6 are thus moved forwardly until arrested by the engagement of their nose portions B19 with a bail bar C41, located at the front of the machine, and adapted to sustain the bars in a normal position under the tension of the springs B31.

In order that a motor of a minimum size may be used to drive the main shaft M1, the rock shaft B42 is operated in the present instance by a toggle device which is adapted to increase the force applied to said shaft according to the resistance offered thereto by the springs B31 and B35, respectively.

As shown in Fig. 13, the shaft B42 is journaled at its opposite ends in the side frames B11 and B12, and provided with a crank arm B46 which is arranged adjacent the side frame B12 and controlled in its movements by a pair of toggle members B48 and B58. The toggle member B48, see Fig. 14, is pivotally connected to the crank arm B46 by a hinge pin B47, and provided with a pull spring B52 which holds it in a normal position against a fixed stud B50 mounted in an offset bracket B51 of the side frame B12. The free end of the toggle member B48 is formed with a recess B81 located in the path of an anti-friction roller B77 which is carried by an actuating arm B76 mounted on the main shaft M1. The arm B76 also carries a second roller B78 which is adapted to engage a corresponding recess B79 formed in the other toggle member B58 when the main shaft is rotated. The toggle member B58 is pivotally mounted on a hinge pin B55, and formed with a curved tail portion B59 which is held by a pull spring B61 resiliently engaged with an anti-friction roller B60 mounted on an upright stand bracket B57. The toggle members are connected by an intermediate fore-and-aft link B49 pivoted at its front end to the pin B47 and at its rear end to the pin B55. As shown in Figs. 14 and 15 the hinge pin B55 is slidably mounted in an elongated inclined slot B56 formed in the stand bracket B57 so as to permit the swinging movements of the crank arm B46. When the machine is at rest the parts will occupy the position shown in Fig. 14 and the springs B31 of the auxiliary racks B23 will be extended. To hold the parts in their respective positions against the tension of these springs, a spring actuated detent B64 is provided and arranged directly above the rear end of the link B49. This detent (Fig. 14) is hinged at B65 to the stand bracket B57 and formed with a hook-shaped portion B66 which engages a corresponding shoulder formed on the upper edge of the link B49. As soon as the main shaft starts to revolve, a finger B80 of a three-fingered arm secured to said shaft is adapted to lift the detent out of engagement with the link B49 and allow the springs B31 to pull the sliding members B28 of the auxiliary racks B23 a slight distance forwardly (as determined by the slots b1), and thus relieve the tension of said springs. About this time the roller B77 of the actuating arm B76 engages the recess B81 of the toggle member B48 and as the main shaft continues to revolve, the toggle thus formed will be straightened out. As a result, the crank arm B46 of the rock shaft B42 will be swung forwardly and through the actuating arms B41 and the sliding frame members B37 (above referred to) will stretch the springs B35 and cause the rack bars B6 to move rearwardly to the position shown in Fig. 12. Incidental to this operation, the long link B49 is pulled forwardly and the other toggle member B58, through its engagement with the roller B60, is rocked downwardly out of the way of the shaft M1 and caused to assume the position shown in Fig. 37. At the same time an arm B67 fixedly mounted on the rock shaft B42 is swung into engaging relation with a rocker detent B69 which is pivoted at B71 to the side frame B12 and adapted to maintain the springs B35 under tension as the cycle proceeds and the roller B77 passes out of engagement with the toggle member B48 (see Fig. 37). The detent B69 has its upper portion offset inwardly (see Fig. 13) to permit a lip B68 of the arm B67 to pass freely thereunder and into engagement with a notch b3 located at the front end thereof. The detent (see Figs. 14 and 15) is formed with a trip arm B70 by means of which it may be disengaged from the arm B67 and provided with a pull spring B73 which is anchored to the side frame and tends to hold the detent in contact with a fixed stud B72. As the cycle proceeds the roller B78 of the actuating arm B76 is caused to enter the recess B79 of the toggle member B58 just before a second finger B75 of the three-fingered arm on shaft M1 trips the detent B69, and will thus sustain the shaft B42 through the crank arm B46 and long link B49 against the tension of the springs B35. Thereafter, the springs B35 tend to restore the parts to their original position under the control of the main shaft M1 until their tension is spent, at which time the toggle formed by the arm B76 and member B58 begins to straighten out and the bail rod B32 is moved against the slides B28 to extend the springs B31. The rack bars B6 are thus urged forwardly against the bail bar C41, and the long link B49 finally forced into engagement with the hooked detent B64 so as to hold the crank arm against the pull of the springs B31 and to permit the roller B78 to pass out of engagement with the toggle member as the cycle is completed.

Carrying mechanism

During the operation of the actuator bars B6, as just described, the selected accumulators are rotated for addition and subtraction. In performing these mathematical operations, it is often necessary to carry over from one accumulator wheel into another, as for instance, when the addition of several digits in one wheel exceeds 9, or when a digit of the subtrahend is greater than its corresponding digit in the minuend. A carrying mechanism is, therefore, provided which, according to the present invention, is not only common to a plurality of sets of accumulators, but is also capable of effecting carrying both for addition and subtraction in selected accumulators. Moreover, by using this mechanism in conjunction with a total mechanism later to be described, totals appearing in one accumulator may be transferred additively or subtractively or both into other accumulators during one machine cycle. As before stated, the carrying operations in addition are adapted to take place at the end of the forward movement of the rack bars B6, and in subtraction at the end of the rearward or advance movement of said bars. These operations in the present instance are accomplished by means of a single set of fore-and-aft links C9 and a corresponding series of vertical slides C1. The links C9 (see Fig. 11) are arranged alongside the respective rack bars B6 and supported on the shafts B16 and B17, which extend transversely through curved slots C10, C11, formed in said links. Each of the links C9 is provided at its front end with a laterally extending stud C12 and formed at spaced intervals along its upper edge with three lugs C50, (one for each accumulator), by means of which it may be moved longitudinally in either direction and as permitted by the slots C10 and C11. These lugs, in the normal position of the links, are located directly below the axes of the respective accumulators A, B and C, so as to be disposed in the path of the tits or lugs B9 of the individual accumulator wheels, when they are lowered into mesh with the teeth of the rack bars B6. The angular position of the tits B9 is such that when the accumulator wheels are turned clockwise (as in addition) from 9 to 0, the corresponding links C9 will be pushed forwardly, (see Fig. 21), and when the accumulator wheels are turned counter-clockwise (as in subtraction, Fig. 19) the links will be pushed rearwardly. The links are restored to their normal or intermediate position by a thin cross bar C18 which is common to all the links and is arranged to engage one or the other (according to the position of the links) of a pair of vertical fingers C17 rising from the upper edges of the links near the front ends thereof. The bar C18 is fastened at the left to a hub member C19 pivoted on a fixed stud C20, and at the right to a similar hub member C22 pivoted on a corresponding stud C21 (Fig. 9), such mounting of the bar C18 permitting it to be rocked from a horizontal to a vertical or inactive position to free the links C9, and thence back to its horizontal or active position in restoring the links. The bar C18 is operated by a gear segment C23 from an edge cam C34 which is keyed to the main shaft M1 (see Figs. 16 and 17). Motion from the main shaft M1 is imparted to the segment C23 through a bell crank lever C29 and an intermediate connecting link C28, the latter being provided with a short toothed section C25 which meshes with the teeth of said segment. The bell crank lever C29 is pivoted at C31 to the fixed bracket B84 and is provided with a pull spring C35 which tends to move the connecting link C28 forwardly and holds an anti-friction roller C33 carried by said lever, constantly engaged with the cam C34. When the main shaft is at rest, the roller C33 is engaged with a high portion C55 of the cam C34, and the link C28 is held rearwardly against the tension of the spring C35 so as to locate the cross bar C18 in its horizontal retaining position shown in Fig. 11. However, as soon as the cam shaft starts to revolve, (the high portion C55 being comparatively short), the spring C35 is allowed to pull the link C28 forwardly and, through the gear segment C23, to turn the retaining bar C18 to the position indicated by the dotted lines, Fig. 16, thus freeing the carrying links C9 for operation by the tits B9 of the accumulator wheels.

The slides C1, which cooperate with the links C9, are guided at their lower ends in a fixed comb-plate C2 and provided with pull springs C14 which urge them upwardly. At their upper ends the slides are slotted to engage a vertically movable cross bar or bail C5, which holds the slides in a normal depressed position against the tension of the spring C14. The bail C5 is guided in the fixed framework and connected by link C37 and a pair of actuating arms C36 to the shaft B16, before mentioned. As best shown in Fig. 11, the slides C1 are formed with rearward extensions C6 having longitudinal slots C7 and provided with upstanding projections C13 arranged directly beneath the studs C12 of the carrying links C9. The slides C1 are also provided with bent-over ears or lips C8 arranged in front of the projections C13 and which, in the normal position of the slides, are disposed in the path of the next adjacent rack bar B6 at the left (see Fig. 22). When the bail C5 is raised, however, the springs C14 tend to lift the slides so as to locate the lips C8 in a position out of the path of the rack bars. The bail C5 and slides C1 are held in their lower position (Fig. 11) by a concentric segmental disc C24 keyed to the hub member C22 and engaging an anti-friction roller C38 mounted on one of the actuating arms C36. As shown in Fig. 17, the disc C24 is formed in its outer edge with a depression or recess c which is adapted at a predetermined point during each cycle of operation and as permitted by a corresponding depression C56 formed in the cam C34, to be brought into registry with the roller C38 in order to allow the bail C5 to rise under the influence of one or more of the springs C14 of the slides C1 (see Fig. 16). It may be stated in this connection that immediately after a cycle of operation is inaugurated, the bail or abutment C41 for the rack bars B6 is swung forwardly a distance of one space to the position shown in Fig. 17; and that in lieu of the bail, the rack bars B6 will be retained by the lips C8 of the slides; also that when the bail C5 is raised the slides C1 will ordinarily be retained by the studs C12 of the links C9 through the upstanding projections C13. However, if any of the links C9 have been actuated, as above described, during the forward movement of the rack bars, the slides associated with said links will be allowed to rise, due to the displacement of the studs C12 from their position above the projections C13. As a result, the corresponding rack bars are allowed to move forwardly one additional space into engagement with the bail C41 so as to rotate the digit wheels of the accumulator the necessary extra space for carrying. The rack bars are thereafter restored to their normal position by a rearward movement of the bail C41, the slides C1 are depressed by the bail C5, and the active links C9 cammed back into place by the rotation of the bar C18, these operations taking place in the order given as the cycle of operation is completed.

Figs. 23 and 21 illustrate, respectively, the relative positions of the parts just before and immediately after a carrying operation in addition has been effected. In this particular instance an accumulator wheel B2, previously registering 5, has been turned by the forward movement of its associated rack bar B6 through six spaces (one space beyond zero) so as to register 1 when said bar banks against the lip C8 of the associated slide C1 (see Fig. 23). In passing the zero position, however, the tit B9 of the accumulator wheel displaces the link C9 associated with the adjacent rack bar B6 at the left (Figs. 21 and 22) so that the accumulator wheel of the next higher order will be moved one space from the zero position and also register 1 as said rack bar by the rise of the associated slide C1 is allowed to engage the bar C41, thus:

```
   5 in accumulator before carrying
  +6
  ___
  11 in accumulator after carrying
```

The bail C41, as herein illustrated, (see Fig. 17), is supported by a plurality of arms C40 rising from a rock shaft C39, and its movements are controlled from an edge cam C49 mounted on the main shaft M1. The intermediate connections include a long fore-and-aft link C43 pivotally connected at its front end to one of the arms C40 and similarly connected at its rear end to one arm C44 of a bell crank lever C45 which is hingedly mounted at C46 to the stand bracket B84. A pull spring C60, attached to the link C43, tends to swing the bail C41 forwardly and maintains an anti-friction roller C48 which is carried by the other arm C47 of the lever C45, constantly engaged with the cam C49. As shown in Fig. 17, the cam C49 is formed with a high portion C58 which retains the bail C41, through the lever C45 and link C43, in its rearward position and which, as may be observed, is somewhat wider than the high portion C55 of the cam C34 so that the rack bars B6 will be restored by the said bail before the slides C1 are depressed.

Carrying in subtraction is accomplished in much the same manner as in addition, interponents C54 corresponding to the lips C8 and movable into and out of action, being employed for the purpose, and the cam C34 being formed with a second depression C56' (Fig. 17) to permit raising of the bail C5 when the rack bars have attained their rearward positions. The interponents C54 (see Figs. 11 and 19) depend from arms C51 and fit against the rear edges of the nose portions B19 of the rack bars B6. The arms C51 are arranged alongside the bars B6 and pivoted thereto by pins C52. At their front ends, the arms C51 are provided with studs C53 by means of which they are supported in the elongated slots C7 of the vertical slides C1. When the slides C1 are depressed the interponents will be located in their active position so as to engage the key controlled fingers A2 of the stop carriage, and when the slides rise, the interponents through the connecting studs C53 will be moved to inactive position above the said fingers and allow the bars B6 to move rearwardly a distance determined by the width of the interponents, or one space (see Fig. 25).

For the sake of clearness it may be mentioned that due to the fact that no carrying is done in the accumulator wheel of the lowest order, the first rack bar at the right of the series (Fig. 9) is devoid of the arm C51 and the interponent C54, its rearward movements being limited by the direct engagement of its nose portion B19 with the stop fingers A2; also, that this particular rack bar is not related in any way to the bar C41 or to the slides C1, its forward movement being limited at all times by the engagement of the end of the open slot B14 with the shaft B16 (see Figs. 25 and 26).

If now, for example, 6 is to be subtracted from 15, registered in the accumulator, the first rack bar will be allowed to advance six spaces into contact with the raised stop finger A2, while the remaining bars B6 of the series will be restrained against the tension of their actuating springs in their normal position, by the hinged stop plate A5 of the carriage. The first accumulator wheel is thus turned counter-clockwise through six spaces so as to register 9, and as it passes through zero, actuates the link C9 which controls the slide C1 associated with the next adjacent rack bar B6, the pin C12 being displaced rearwardly from its position above the upstanding projection C13. When this slide is allowed to rise, the interponent C54 to which it is connected will be pulled upwardly and thus allow the second rack bar B6 to slip rearwardly into direct engagement with the stop plate A5 (as shown in Fig. 25). The second accumulator wheel B2 in this way is turned one space also in a counter-clockwise direction so as to register 0 instead of 1, and the digit 9 alone, which is the correct remainder, is left in the accumulator; viz.,

```
  15 in accumulator before subtraction
  -6
  ___
   9 in accumulator after subtraction
```

After carrying in subtraction, the rack bars that have been allowed to move the extra space in carrying, are forced back this distance to their original position by a horizontal cross bar L17 through intermediate connections later to be described. The bar L17 (as shown in Fig. 17) is supported between a pair of side arms L18 rising from a rock shaft L19 which is operable by means of a crank arm L20 controlled from the main shaft M1. The crank arm L20 (Fig. 17) is connected to the link C43, before described, and the cam C49 is formed with a second high portion C59 which, at the proper moment during each cycle, is adapted to engage the bell crank lever C44 and through the link C43, crank arm L20, and rock shaft L19, actuate the bar L17 in the manner required. The depression of the slides C1 and restoration of the links C9 immediately follow, but at this time these operations are brought about by a separate high portion C57 of the cam C34, which corresponds to the high portion C55 thereof and is adapted through the link C28 and lever C29, to rock the hub member C22. The bail C5, as a result, is forced downwardly by the disc C24, and the link control bar C18 is moved to its horizontal or active position. While the high portions of the cams C34 and C39, as may be observed, (Fig. 17), are comparatively short, the intervening tracking surfaces thereof, except for the two depressions C56' and C56, are such as to sustain the parts in the position shown in Fig. 17; i. e., with the links C9 free to be moved by the accumulator wheels, and with the slides C1 depressed by the bail C5.

Accumulator control mechanism

The accumulator control mechanism which includes the "subtract" keys D1 and the "add" keys D2, is arranged at the right of the accumulators A, B and C, between the frame member B12 and another frame member D4. As before stated, the shafts B3 of the individual accumulators are carried in vertical slide brackets D5, which (as best shown in Figs. 30 and 31) are guided in their vertical movements and restrained against edgewise displacement by fixed cross bars D7 and studs D89 projecting inwardly from the frame members B11 and B12, the cross bar D7 engaging slots D6 formed in the upper ends of the brackets D5 and the studs D89, corresponding slots D88 formed in the lower ends thereof. Pull springs D8 connected to the brackets D5 urge them upwardly into contact with the cross bar D7 and maintain the accumulators in their raised or inactive position. The brackets D5 are also formed with shoulders d by means of which they may be depressed against the tension of the springs D8 to lower the accumulators into engagement with the rack bars B6. This operation is brought about by the rotation of rock shafts D10, four of which are provided extending transversely of the machine between the frame members B11 and D4, as shown in Figs. 13 and 32. The shafts D10 are arranged alongside the accumulators A, B and C, and provided with actuating arms D36 and D37 disposed in operative relation to the shoulders d of the accumulator supporting brackets D5. The arms D36 extend forwardly and the arms D37 rearwardly from the shafts D10 so that when the latter are turned in opposite directions the arms will be caused to engage and depress the brackets D5 of one or the other of the adjacent accumulators depending upon the direction in which the shafts are rocked. Since, however, there are but three accumulators employed in the embodiment illustrated, the shaft D10 at the front (as may be observed, Fig. 32) is provided with only one pair of arms D37 adapted when the shaft is turned clockwise to depress the brackets of the first accumulator C; and the shaft D10 at the rear is likewise provided with only one pair of arms D36 which are adapted when said shaft is turned counter-clockwise to depress the brackets of the third accumulator A.

Rocking of the several shafts D10 is effected by a single reciprocable fore-and-aft slide bar D21 through the medium of wrench elements D11, D12, which are connected to the shafts and movable downwardly and upwardly into and out of operative relation to the said bar, the upper or head portions of the wrenches being slotted and fitting snugly in vertical cuts formed transversely in the shafts D10. Pull springs D18 connected by means of studs D22 to the wrenches, urge them upwardly and hold them against the shafts D10 in a neutral position (see Fig. 29). The wrenches D11 and D12 are provided with anti-friction rollers D13, and are formed near their lower ends with shoulders D38 and D39 respectively, the shoulders D38 of the wrenches D11 (Fig. 32) being arranged to cooperate with offset lugs or ears D23 projecting from one side of the bar D21, and the shoulders D39 of the wrenches D12 being arranged to cooperate with similar lugs or ears D24 projecting from the other side of said bar. The ears D24 are disposed in front of the wrenches D12 and the ears D23 at the rear of the wrenches D11 so that the shafts D10 may be turned in one direction or the other by the reciprocation of the bar D21, according to the vertical position of the individual wrenches D11 and D12. The bar D21 is maintained in a normal position (Fig. 32) by a pair of fingers D29, D30, depending from a common axis d3 and engaging the opposite sides of a pin D91 mounted at the upper end of a bell crank lever D100, the latter being connected to said bar through the medium of a second lever D26 integrally connected to the lever D100 by a hub member D101 which is pivotally mounted on the stub shaft D92 as shown in Fig. 33a. The fingers D29 and D30 are provided with pull springs D31 and D32 respectively, which hold them resiliently engaged with a fixed stud D33 and permit them to yield when the bar D21 is reciprocated.

The movements of the bar D21 forwardly from its normal position (Fig. 32) are effected by the rocking lever D26 which is controlled by an edge cam D41 keyed to the main shaft M1; whereas the movements of said bar rearwardly from its normal position are effected by the bell crank lever D100 which is controlled by a separate cam D90 (see Fig. 34). One arm of the lever D26 is connected to a pin D28 located at the rear end of the bar D21, and the other arm thereof is provided with an anti-friction roller D40 which tracks upon the cam D41 (see Fig. 35). The lever D100 is likewise provided with an anti-friction roller D57 arranged to track upon the cam D90, the relation of the parts being such that as soon as the cam shaft M1 starts to revolve, the bar D21, through the lever D26, will be pushed forwardly by the cam D41 against the tension of the spring D32, and any one of the wrenches D11 that may have been depressed, will be swung to the position shown in Fig. 35, by the engagement of the ears D23 with the shoulders D38. The associated rock shaft D10 is thus turned clockwise and by means of the arms D37, forces the brackets D5 of the corresponding accumulator downwardly to engage the accumulator wheels with the rack bars B6, where they are retained by means presently to be described. As the shaft M1 continues to revolve and after the rack bars are advanced against the stop fingers of the carriage, the bar D21 is allowed to return to its original position under the influence of the spring D32, and the depressed accumulator is then allowed to rise out of engagement with the rack bars B6. About this time the cam D90 is adapted to actuate the bell crank lever D100 so as to pull the bar D21 rearwardly against the tension of the spring D31, and if any one of the wrenches D12 happens to be depressed, it will be swung to the position shown in Fig. 34 by the engagement of the ears D24 of the said bar with the shoulder D39. The associated rock shaft D10 by this operation is turned counter-clockwise and through the arms D36, causes the engagement of the corresponding accumulator with the rack bars B6, the bar D21, wrench D12, and accumulators all being restored to their normal positions by their respective springs after the rack bars B6 are returned and as the revolution of the shaft M1 is completed.

The movements of the individual wrenches D11 and D12 into and out of engaging relation with the bar D21 are controlled by the subtract and add keys D1 and D2 of the respective accumulators A, B and C, the stems D14 of the add keys being provided with rearwardly extending arms D19 arranged to engage the anti-friction rollers D13 of the wrenches D12; and the stems D17 of the subtract keys being provided with forwardly extending arms D20 arranged to engage the corresponding rollers D13 of the wrenches D11. As best shown in Figs. 29 and 32, the stems of the selecting add and subtract keys of the respective accumulators are guided at their lower ends by separate fixed cross rods D16 and provided with light pull springs D35 which tend to maintain them in their raised position.

To hold the key stems and the corresponding wrenches D11 or D12 in their depressed positions preparatory to the inauguration of a cycle and the consequential lowering of an accumulator into engagement with the rack bars B6, the mechanism includes three U-shaped rocker detents D43, (one for each pair of selecting keys) which are hingedly mounted on the cross rods D16 and arranged to engage ears D42 projecting from the rear edges of the key stems D14 and D17. Each detent is provided with a spring D44 for holding it resiliently engaged with the key stems, and is also provided with a stud D45 by means of which it may be rocked rearwardly to release the key stems. Rocking of the detents is controlled from the main shaft through a bell crank lever D54 and a fore-and-aft slide rod D46 which is common to all three detents and is mounted by pin and slot connections D47 against the inner face of the frame plate D4 (see Figs. 29 and 33). As shown best in Fig. 33, the rod 46 is formed in its lower edge with notches D49 wherein the studs D45 of the detents engage, and is provided at its rear end with a pin D52 which engages in an open slot D53 formed in the upper end of one arm of the bell crank lever D54. A pull spring D50 connected to the rod D46 and anchored to the framework, urges it forwardly out of engagement with the detent studs D45 against the pins D47 (Fig. 33). The other arm D55 of the lever D54 is located in the path of a stud D59 which projects from a second lever D61, through an aperture D60 formed in the cam D90. This second lever (indicated by dotted lines, Fig. 32) is pivoted at D62 to the cam D90 and provided with a spring D63 which is stronger than the detent and slide rod springs combined, and keeps the stud D59 yieldingly engaged with the lower wall of the aperture D60.

Ordinarily, the selecting keys are released automatically as the machine cycle of operation is completed, the stud D59 at this time being adapted to rock the bell crank lever D54 and through the slide bar D46 and connecting pins D45 of the detents D43 to swing the latter momentarily out of engagement with the lugs D42 of the key stems, thus permitting them to return to normal position under the influence of their associated springs. However, it is often desirable when listing a number of items of a single account, to lock a selecting key in its lower or depressed position so that the accumulator wherein the items are to be registered may be engaged with the rack bars without manipulating the selecting keys D1 or D2, during successive cycles of operation.

Accordingly, means controlled by a separate key D3 are provided for locking the rod D46 against rearward movement. Such means (as best shown in Fig. 33) includes a second fore-and-aft slide rod D74 arranged immediately below the rod D46 and similarly mounted on the frame plate D4 by pin and slot connections D75. The rod D74 is urged forwardly by a pull spring D76, and is retained in a normal position (Fig. 32) against the tension of said spring by a stud D72 which projects laterally from the stem D65 of the lock key D3 and engages in an elongated recess D73 formed in the rod D74. The key stem D65 is slidably mounted for vertical movement in the framework and is provided with a pull spring D66 which tends to raise it and to hold the stud D72 engaged with the upper wall of said recess D73. The key stem D65 is also provided with an offset lug or lip D70 adapted, when the key is depressed, to engage snugly a corresponding recess D71 formed in the upper edge of the rod D46. At such times the stud D72 is disengaged from the recess D73 and allows the rod D74 to slip forwardly a limited distance over the said stud. The bar D46 will thus be locked against rearward movement by the lip D70 and the key stem D65 also locked against upward movement by the rod D74 through the intermediate stud D72. Consequently, any selecting keys D1 or D2 that may have been previously depressed will be retained by the detents D43 during successive revolutions of the main shaft M1 irrespective of the actuating stud D59, the latter as it is brought into contact with the arm D55 of the bell crank lever D54, being allowed to yield upwardly and finally pass out of engagement with the said arm through the rocking of the lever D61.

To release the lock key D3 and incidentally the accumulator selecing keys D1 or D2, the mechanism includes still another finger key D80 which (as best shown in Fig. 33) is connected by a stem D81 to one arm of a bell crank lever D82 arranged adjacent the front ends of the rods D46 and D74. The lever D82 is pivoted on a fixed axis D83 and is held by a spring D84 against a stop pin D85. The other arm D86 of this lever is adapted to engage a pin D87 which is mounted on the lower slide rod D74 and is so located as to be brought into contact with the arm D86 when said rod occupies its forward or locking position. Consequently, when the key D80 is depressed the rod D74 will be moved by the lever D82 rearwardly and as the recess D73 is brought into registry with the stud D72 of the key stem D65, the latter will be allowed to snap upwardly under the influence of the spring D66, the lip D70 being thus raised out of locking engagement with the rod D46 and the stud D72 caused to enter the recess D73 so as to sustain the rod D74 in its normal position against the tension of the spring D76 as pressure on the key D80 is released. It will be observed, however, that only a slight rearward movement of the rod D74 is required to release the lock key D3 and that said rod is capable of further movement in this direction under pressure applied to the key D80, and as permitted by the slots D75. By this additional movement or overthrow of the rod D74, a stud D95 (Fig. 33) carried at the front end of said rod is adapted to engage a shoulder D97 of the rod D46 and push the latter rearwardly so as to rock the detents D43 and thus release the selecting keys D1 or D2. As pressure on the release key D80 is released the parts are allowed to assume their normal position shown in Fig. 32.

*Accumulator retaining and releasing mechanism*

The accumulators A, B and C, are held engaged with the actuating rack bars B6 by detents E10 and their release is effected automatically by means controlled from the main shaft M1, reference being directed to Figs. 30, 31, 36 and 37. The detents E10 (as shown best in Figs. 30 and 31) are in the form of small bell crank levers pivoted on fixed studs D89, and are controlled by vertically adjustable rocker members E16 also mounted on the studs D89.

The vertical arms of the detents E10 are provided with fingers E13, which project laterally therefrom through the upper flared sections of the slots D88 in the accumulator supporting brackets D5, so as to engage vertical slots e formed in the upper ends of the rocker members E16. Pull springs E12 attached to the other arms of the detents E10 hold the fingers E13 resiliently engaged with the rear side walls of the slots D88 in position to engage shoulders D90 formed on said brackets when the latter are depressed by the arms of the rock shafts D10. The rocker members E16 (Fig. 31) are provided with pull springs E14 and formed at their lower ends with toe and heel portions E19 and E20, respectively. The pull springs E14 urge the members E16 upwardly against the fingers E13, which thus serve to locate the said members in their normal position (Fig. 31) with the toe portions E19 in the path of bent-over lugs E21 formed on a pair of fore-and-aft actuating slide bars E22. For reasons later to be described, the rocker members E16 are also provided with shoulders E18 by means of which they may be depressed against the tension of the springs E14 to locate the heel portions E20 in the path of the lugs E21. At their front and rear ends the bars E22 are mounted by means of pin and slot connections E23 and E24 to the respective side frame members B11 and B12 and are operated by an edge cam E35 against the tension of pull springs E25. At their rear ends (see Figs. 36 and 37), the bars are provided with pivoted extension or rocker arms E27 which are loosely connected by means of hooks E28 and studs E29 to a pair of crank arms E30 depending from a rock shaft E31. Normally, the hooks E28 of the rocker arms are held engaged with the studs E29 by pull springs E36 anchored to the links E22, but under certain conditions later to be described the hooks may be disengaged from the said studs by rocking the arms E27 about their pivotal axes, as shown in Fig. 38. The crank arm E30 associated with the right hand bar E22 is provided at its lower end with a roller E34 which rides upon the cam E35 and is held resiliently engaged therewith by a spring E33, through the medium of a third crank arm E32 keyed to the rock shaft E31 (see Fig. 37). The cam E35 is formed on its periphery with two differently located high portions E39 and E41, and when the machine is at rest the roller E34 is disposed just past the high portion E41 of the cam, as shown in Fig. 14. As the cam E35 is rotated, the high portion E39 will first be brought into engagement with the roller E34 so as to pull the bars E22 rearwardly soon after the rack bars B6 have completed their advance or rearward stroke; and as the cam completes its rotation the high portion E41 will be brought into engagement with said roller to pull the bars again rearwardly after the rack bars have completed their return stroke, the springs E25 acting to restore the bars to their original position after the high portions of the cam E35 pass the roller E34. By these successive operations of the bars E22, the ears E21 thereof, through their engagement with the toes E19 of the vertical members E16, rock the latter about the studs D89 and thus release the supporting brackets D5 of any engaged accumulator so that it may rise out of engagement with the rack bars, these operations being effected at the proper moments or immediately after the addition and subtraction operations have been performed.

It will now be seen that by merely depressing the selecting keys D1 and D2 of different accumulators, an amount set up by the operation of the digit keys A1 may be added in one accumulator and subtracted in another during the same machine cycle of operation, the selected accumulators A, B or C, being thrown into and out of action automatically as required and all parts finally restored to a normal position of rest.

Total mechanism

The total mechanism, which is controlled by the individual manually operated levers F1, hereinbefore referred to, is adapted as one or another of these levers is actuated to perform five separate functions preparatory to starting the machine: (1)—to move the stop bar F2 into the path of the tits B8 of the accumulator wheels B2; (2)—to rock the retaining plate A5 downwardly out of the path of the rack bars B6; (3)—to release the associated add key D2 if it happens to be locked down by the corresponding detent D43; (4)—to depress the associated subtract key D1 so that the selected accumulator will be caused to engage the rack bars B6 prior to their advance or rearward stroke; and (5)—to depress the vertical rocker members E16 so as to locate the heels E20 thereof in the path of the contiguous lips E21 of the accumulator release bars E22. The manner in which these operations take place and the different trains of connections involved will now be described, reference being directed to Figs. 29, 30a, 33, 39, 41 and 42.

The several total levers F1 are pivotally mounted on fixed studs F3 to the side frame B12 so that they may be swung backwardly or forwardly from their normal vertical position shown in Fig. 39. For reasons presently to appear, the levers F1 are provided with vertical T-shaped members F31, which are connected thereto through integral hub portions f (see Fig. 39). At their lower ends the levers F1 are bifurcated so as to present respectively a pair of curved cam surfaces F4, F5, and an intermediate recess F6. Since the connections between the total levers and the different parts they control are the same for all, only one set will be described. Thus, (as shown in Fig. 39), motion from the total lever F1 of the accumulator A is transmitted to the accumulator stop bar F2 through the medium of a three arm lever F7 pinned to a rock shaft F8, which is journaled at its opposite ends in the vertical frame plates B12 and D4 (see also Fig. 29). The horizontal arm of the lever F7 is provided with an anti-friction roller f1 which fits the recess F6 of the total lever, and is maintained therein by a pull spring F19, the latter being anchored to the frame plate B12 and attached to a stud F18 projecting from the downwardly extending arm F15 of the lever F7.

The stop bar F2 (Fig. 39) is pivotally mounted by means of depending side arms F14 on the rock shaft D10 (hereinbefore referred to), and is provided with a pull spring F13, which tends to swing it rearwardly into active position against the digit wheels B2 of the accumulator. The arm F14 at the right end of the bar F2 extends downwardly beyond the rock shaft D10 so as to engage the upper edge of an offset projection or lip F10 formed on the third or upwardly extending arm F9 of the lever F7. The tension of the spring F19 is sufficient to overcome that of the stop bar spring F13 and also to maintain the total lever in an upright position through the seating of the roller in the recess F6. According to this arrangement, when the total lever is pushed rearwardly to the position shown in Fig. 39, the roller f1 will be forced downwardly against the pull of the spring F19 by the cam surface F4, so as to free the stop bar F2 and allow the spring F13 to move it into action, the total lever, incidentally, being held by the roller F6 in its rearward position as it passes dead center.

The operative connection between the total lever F1 and the retaining plate A5 for the rack bars B6, is established by means of a fore-and-aft link F17 and a bell crank lever F25 which is pivoted to a rock shaft F26 arranged at the rear of the stop carriage A3 between the frame plates B11 and B12. The horizontal arm F27 of the lever F25 extends forwardly from the rock shaft F26 and terminates directly above the front edge of the retaining plate A5 (Fig. 9), while the other arm F25 of this lever depends from the shaft F26 and is offset to the right (Fig. 29) so as to connect with the front end of the link F17. At its rear end, this link (see Fig. 40) is slidably supported on a fixed stud F23 alongside the frame B12 and at predetermined points along its upper edge is provided with upstanding lugs F16 which are located in engaging relation to studs F18, carried by the vertical arms F15 of the respective levers F7. Consequently, as the lever F7 is actuated by the total lever F1 and the downwardly extending arm F15 thereof swings rearwardly, the stud F18 will force the link F17 in the same direction, rock the bell crank F25 and force the retaining plate A5 downwardly out of the path of the rack bars B6.

The depression of the subtract key D1 (see Fig. 39) is effected by an arm F28 extending forwardly from the rock shaft F8 and arranged to engage a lateral stud F29 mounted in the stem D14 of said key.

The release of the add key D2 (see Fig. 33) is accomplished by means of a vertical slide bar F72 which is controlled by an arm F70 also extending forwardly from the rock shaft F8 and arranged to engage a bent-over lip F71 formed on the said bar. At its upper end the bar F72 is slotted and guided in its vertical movements by a stud F73 riveted to the frame plate D4; and at its lower end is similarly guided and sustained in an annular groove formed in the cross rod D16. A pull spring F75 attached to the bar F72 urges it upwardly and, holds it resiliently in its raised position against the stud F73. Below the lip F71, the bar F72 is also formed with a lug or ear F74, which (as shown in Fig. 33) is located directly above a stud D45 carried by the locking detent D43 of the associated selecting keys D1 and D2. When the shaft F8 is rocked by the total lever, the arm F70 of the said shaft is adapted to depress the bar F72, and as the lug F74 engages the stud D45 the detent D43 will be rocked rearwardly and thus release the add key D2 if it happens to be locked in its depressed position as a result of a previous adding operation.

The depression of the rocker members E16 of the accumulator release mechanism is also brought about by the rocking movements of the lever F7 which for this purpose is provided with a second bent-over lip or lug F11 formed on the arm F9. The lip F11 (see Figs. 30a and 39) is arranged to engage an angular extension F63 of a rocking bail F59 hingedly mounted on the rock shaft F26. The side arms F58 and F59 of the said bail (Fig. 30a) are formed with offset portions F61 and F62 respectively, which are adapted when the bail is rocked by the lip F11, to engage the corresponding shoulders E18 of the members E16 and move the latter downwardly against the tension of the springs E14 so as to locate, as above stated, the heels E20 of said members in the path of the bent-over ears E21 of the sliding bars E22 (see Fig. 37).

Ordinarily, the respective accumulators are cleared during the totaling operation, so as to be ready to register items of a new account and in these instances, the total levers F1 are swung rearwardly. Occasionally, however, so-called "sub-totals" (presently to be described) are desired, and in such instances the amount appearing in the selected accumulator is preserved and the said levers are swung forwardly.

To prevent the operation of more than one of the total levers F1 at a time, and to hold the one selected against possible displacement, in either of its active positions, the total mechanism includes also a fore-and-aft slide bar F36 which (as best shown in Figs. 41 and 42) is arranged above and in operative relation to the T-shaped members F31 of the total levers. The cross pieces F32 of these members are formed at their opposite ends with bent-over lips F33, which are adapted when the total levers are rocked about the pivot studs F3, to engage one or the other of the notches F34 and F35 formed in the lower edge of the bar F36, and by continued movements of said levers, to actuate the bar F36. The bar F36 is mounted at its front and rear ends on studs F38, F40, riveted to the frame plate B12 and engaging corresponding slots F37 and F39 formed in said bar. A pair of vertical rocking fingers F42, F43, hold the bar F36 resiliently in a centralized position, these fingers (see Fig. 41) being mounted on a fixed axis F44 and provided with springs F45, F46, which tend to swing them in opposite directions against a stud F41 carried by said bar. The fixed stud F40 which supports the bar F36 serves as a common stop for the fingers F42, F43, and hence acts as a medium for locating the bar longitudinally. When the bar F36 is moved by a selected total lever F1 in either direction the notches F34 and F35 will be carried out of registry with the lips F33 of the other total levers and any movement of the latter at such times will be prevented by the lower edge of the bar. The rearward movement of the bar is resisted by the spring F46 through the fingers F43, and the forward movement thereof is resisted by the spring F45 through the other finger F42. As the bar reaches the limit of its movement in either direction (as determined by the length of the slots F37) it is locked by an angular, spring actuated pawl F54, which at such times is adapted to engage one or the other of a pair of notches F55, F56 formed in the lower edge of the bar. The pawl F54 is pivotally mounted on a rock shaft F49 and is controlled from the main shaft M1 through a trip lever F52 which latter is pivoted at F53 to the frame plate B12. The lower end of the trip lever F52 (see Fig. 38) is disposed in the path of a lug or lip F57, which projects from the third finger of the arm B75 (before described) through an aperture in the cam E40.

Assume now that a total lever has been moved rearwardly to the position shown in Fig. 39 and the above preparatory operations have taken place in the manner stated. When the cycle of operation is inaugurated the accumulator associated with the said lever, due to the depression of the subtract key D1, will be caused to engage the rack bars B6 immediately, and the digit wheels B2 thereof will be rotated counter-clockwise as the bars move rearwardly. When the tits or lugs B8 of the respective digit wheels engage the stop bar F2, which will occur when the said digit wheels register zero, the rack bars will be arrested in their rearward movements at different distances from their normal position, according to the extent of rotation of the corresponding digit wheels. If the total in the accumulator, for example, were 659, the first rack bar at the right would be allowed to move through nine spaces; the second, five spaces; and the third, six spaces, the remaining bars being restrained against any movement by the stop bar F2 through their associated digit wheels which already register zero. At the same time, the vertically movable type carriers H7 corresponding to the active rack bars will be allowed to rise different distances determined by the movements of these bars and the total "659" will be printed. The accumulator is thus cleared (all digit wheels registering zero) and as the cycle of operation proceeds it is disengaged from the rack bars in the manner previously described through the rearward movement of the fore-and-aft bars E22 and the consequent rocking of the retaining detents E10. At this time, however, and as shown in Fig. 37, the rocking of the detents E10 is accomplished by a third rise or high portion E38 of the cam E35, which is located slightly in advance of the high portion E39 thereof. The high portion E38, although somewhat lower than the high portions E39 and E41 is, nevertheless, capable of effecting the release of an accumulator, since the heels E20 of the vertical rocker members E16 are wider than the toes E19 and will, therefore, be located in closer relation to the contiguous lips E21 of the bar E22 when the said members are depressed. In other words, a shorter stroke of the bar E22 is sufficient to release an accumulator after a totaling operation, than is required after an addition or a subtraction operation. This particular arrangement permits an accumulator, which has been lowered into engagement with the rack bars for a totaling operation, to be released slightly in advance of another accumulator, which, for reasons later to be pointed out, may have been also engaged with the bar by actuation of a subtract key D1.

After the release of the accumulator and the restoration of the rack bars to their forward position, the trip lever F52 is actuated by the lug F57 so as to free the total lever locking bar F36. As the pawl F54 is disengaged from the notch F55, the said bar is pushed forwardly by the finger F43 under the influence of the spring F46 to its normal position shown in Fig. 41. The total lever F1, through the engagement of the lip F33 with the notches F34, is thus swung forwardly sufficiently far to pass dead center and the spring F19 is allowed to act through the three-arm lever F7 and roller f1 to restore the total lever to its normal or vertical position. As the roller f1 rides over the cam surface F4 at the lower end of the total lever, the rock shaft F8 is turned clockwise by the spring F19 and the lip F10 of the lever F7 is adapted through its engagement with the side arm F14 of the stop bar F2 to swing the latter forwardly out of engagement with the accumulator. At the same time and by the same movement of the shaft F8 the rocker member E16, the rack bar retaining plate A5, and the depressed subtract key D1 are all restored to their original or normal positions, under the influence of their respective springs and the control of the lever F7.

*Subtotal*

In order to permit the printing of a total appearing in any one of the accumulators A, B or C, without clearing the accumulator of that total, the present machine is equipped with means controlled by the forward movement of the total lever locking bar F36 for breaking the connection between the bars E22, which control the release of the accumulators, and the cam shaft M1, so that the selected accumulator will remain engaged with the rack bars B6 during both their forward and rearward movements. Such means (see Figs. 38 and 41) includes a crank arm F48 rising from the rock shaft F49 and operable by a stud F47 projecting laterally from the rear end of the locking bar F36. The shaft F49 (Fig. 38) is provided with a pair of arms G10 (arranged one arm at each end of the shaft) projecting forwardly therefrom and connected by links G11 to the front ends of the rocker links E27, before referred to.

According to this arrangement, when the bar F36 is moved forwardly by a total lever F1 to the position shown in Figs. 38 and 42, the shaft F49 will be turned by the stud F47 and through the arms G10 and links G11, is adapted to rock the front ends of the arms E27 downwardly against the tension of the springs E36. As a result of this operation, the hook-shaped rear end portions of said arms are disengaged from the studs E29 of the cam arms E30 and the fore-and-aft release bars E22 will be rendered inactive during the major portion of the succeeding cycle of operation. As the cycle nears completion and after the actuating rack bars B6 have completed their return movement, the locking pawl F54 is disengaged from the notch F56 of the bar F36, as previously described, and allows the spring actuated finger F42 to push the bar rearwardly to its normal position. At this time, the low portion E40 of the cam E35 is opposed to the anti-friction roller E34 of the arm E30 and allows the spring E36 to cause the re-engagement of the rocker link E27 with the stud E29 of the actuating arm E30, so that the accumulator may be released in the usual way by the high portion E41 of said cam as the cycle of operation is completed.

*Type rack control*

The lower set of subsidiary rack bars H1 (previously mentioned) are active in the printing of positive totals registered in any one of the accumulators A, B or C, and are movable back and forth by the vertical spring actuated type bars H7 through the intermediate sets of gears H2, H3, H5. The bars H1 are firmly guided facewise by a series of fixed guide plates H10 and obtain support at their front ends by means of anti-friction rollers H16 which track upon the upper edges of the guide plates. At their rear ends the bars H1 are sustained in annular grooves of a fixed supporting rod H17 wherein they are held against upward displacement by a horizontal cross plate H18 (Fig. 45). The guide plates H10 are anchored to thin cross bars H11, H12, and are formed with lower extensions h which are similarly connected to a second horizontal cross plate H15, the bars H11, H12, as well as the cross plates H15 and H18, being fastened to upright side members H13 and H14 of the machine frame. Adjacent their front ends the rack bars H1 are formed with stop shoulders H19 disposed directly in front of heel portions H20 which depend from the rear ends of the main rack bars B6 (see Fig. 44).

The gears H3 and H5 (Fig. 6) of the respective gear sets are rotatably mounted on a relatively fixed rock shaft H4 journalled in the frame members H13 and H14, whereas the associated gears H2 are carried by a shaft H21, which is movable bodily to swing the gears H2 downwardly and upwardly into and out of engagement with the rack bars H1. As shown best in Fig. 6, the shaft H21 is mounted in a bracket H39 hingedly connected to the shaft H4 and including a vertically disposed cross plate H40 (Fig. 44) which is adapted when the gears H2 are disengaged from the teeth of the rack bars H1 to engage corresponding notches H41 formed in the rear ends of said bars H1 and thus lock the latter against endwise movement. The gears H5 are integrally connected to the gears H3 and arranged in mesh with teeth H6 formed on the lower extensions of the type bars H7. The gears H3 mesh with the gears H2 and the movement of the type bars H7 may thus be imparted to the auxiliary rack bars H1. The type bars H7 are guided and sustained in their vertical movements by the shaft H4 and a fixed cross rod H24, both of which are common to all said bars but engage different vertical slots H22 and H23 respectively, formed therein. Each type bar H7 at its upper end is provided with a type rack or carrier H8 carrying eleven type elements H25, which are numbered successively from top to bottom, 0, 1, 2, 3, 4, 5, 6, 7, 8, 9 and 0, and adapted as the bars are raised to be brought into the printing position. At their lower ends the type bars are connected by short links H27 and bell crank levers H26 to their individual actuating springs H30. The levers H26 are pivotally mounted on a fixed shaft H28 and are operated by a rock shaft H34 through a bail rod H32 which is common to all the levers and is connected to the rock shaft by a pair of side arms H33 (see Fig. 45). The rock shaft H34 receives its motion from an edge cam H37, being provided with a crank arm H35 having an anti-friction roller H36 which tracks upon said cam. The actuating springs H30 for the type bars H7 are anchored to a connecting cross member H31 of the vertical arms B41, before referred to, and are adapted to be stretched when said arms are swung forwardly.

Consequently, after the selected rack bars B6 are advanced against the raised stops of the carriage A1, the low portion of the cam H37 (Fig. 45) will be brought into registry with the roller H36 of the crank arm H35 and thus allow the springs B30 previously tensioned, to raise the corresponding type bars H7 and through the gears H2, H3 and H5, move the subsidiary rack bars H1 rearwardly until the stop shoulders H19 thereof bank against the opposed heel portions H20 of the main bars B6, the bail rod H32 incidentally, yielding upwardly by the rocking of the bell crank levers H26 (see Fig. 45). In this way the extent of the upward movement of the individual type bars H7 is governed by the traversed portion of the range of movement of the rack bars B6; that is to say, if a bar B6 moves through, say, six spaces, the associated bar H1 will likewise move through six spaces and the connected type carrier H8 will be raised six spaces to bring the type element "6" into the printing position. In this connection, it may be stated, that while the eleventh or lowermost "0" printing element is not used in the printing of positive totals (the bars B6 and H1 having but a nine space range of movement) it is most essential to the printing of negative totals presently to be described.

After the printing operation, the cam H37, as it continues to rotate, swings the crank arm H35 downwardly from the position shown in Fig. 45 to that shown in Fig. 44 and through the bail rod H32 and the bell crank levers H26 pulls the type bars H7 downwardly to their original position, the auxiliary bars H1 at the same time being moved forwardly by their respective gear sets just prior to the return stroke of the main bars B6.

*Type actuating mechanism*

The type actuating mechanism (see Figs. 1, 44, 45, 45a, 45b, and 45c) includes a series of vertically disposed type actuating levers J10, arranged respectively, directly in front of the individual type carriers H8. The levers J10 (see Fig. 44) are pivotally mounted at their lower ends on a fixed cross rod J11, and connected by toggle links J30 to corresponding toggle levers J26 which are pivoted to relatively fixed supporting plates J27 and provided with integral weights J25. The levers J26 are formed with nose portions J57, which are maintained, under the influence of said weights, in contact with horizontal reciprocable actuating bars or "firing pins" J20. The type actuating levers J10, through their connecting links J30 are thus sustained in upright position with their upper ends at the printing level, the weights J25 tending to maintain the levers in contact with the reciprocable actuating bars J20. These bars are supported and guided at their rear ends by a second cross rod J23 and provided with springs J21, anchored to a third cross rod J17, said springs tending to pull the bars forwardly.

Triggers J14 are pivotally mounted on the cross rod J17 and arranged to engage shoulders J28, formed on the front ends of the bars J20, to hold the latter in the normal position shown in Fig. 44 against the tension of the springs J21. The triggers J14 are provided with trip fingers J13 and also with pull springs J19 which latter are anchored to a fixed vertical guide plate J18 and tend to keep the triggers engaged with the shoulders J28 of the weight actuating bars J20. The fingers J13 are pivotally connected to the triggers and extend rearwardly therefrom so as to engage, from below, studs J12 which project laterally from the respective type bars H7. Pull springs J15, connected to the fingers J13 and anchored to auxiliary arms J16 of the triggers, tends to swing the rear ends of the fingers upwardly into engagement with said studs, the parts being so arranged that by moving the fingers J13 slightly rearwardly, the triggers J14 will be swung downwardly out of engagement with the actuating bars J20, and the latter being thus released will snap forwardly under the influence of the springs J21 to rock the toggle levers J26, and propel the weights J25 upwardly. The impetus, attained by the weights, causes them to straighten out the toggles (as shown in Fig. 45) to drive the aligned type members H25 against the platen N2. As the type members engage the platen, the weights are adapted to rebound, collapse the toggles, and carry the nose portions J57 of the toggle levers again into contact with the associated actuator bars J20. The rearward movement of the trip fingers J13 is effected by a single horizontally reciprocable cross bar J31 and the fingers J13 are selectively engaged with said bar according to the vertical position of the corresponding type bars H7. The bar J31 (see Figs. 44 and 45) overlies the fingers J13 and is arranged in operative relation to shoulders J9 formed on the upper edges of the fingers. Normally, i. e., when the machine is at rest, the fingers are retained in their lowermost position (Fig. 44) by the studs J12 of the type bars, and the upper zero type members H25 are all located below and out of the path of the type actuating levers J10. When one or more of these upper zero type members are located in the printing position by a slight upward movement of the type bars H7, the corresponding fingers J13 are adapted to rise, but will stop in the intermediate position shown in Fig. 45 with the shoulders J9 still out of engagement with the bar J31, so that these zero type members will not be actuated except in a manner presently to be pointed out. However, when the type bars H7 are allowed to rise to any one of the higher levels, the fingers will engage the cross bar J31 so as to be actuated thereby when it is reciprocated.

The bar J31 (see Figs. 45a and 45b) is slidably mounted in slots J32, formed in the stationary frame plates H13 and H14, and is operated from the main shaft M1 by a cam J41, through the medium of a pair of vertical rocker arms J35 and a pair of short fore-and-aft links J33. The arms J35 are connected at the top by a cross rod J43 and pinned at the bottom to a rock shaft J37 also mounted in the frame plates H13 and H14. The arm J35 at the right (Fig. 45b) is provided with two actuating arms J38 and J39, respectively. The arm J38 (see Fig. 45a) extends rearwardly from the rock shaft J37 and is provided with an anti-friction roller J40 arranged to track upon the cam J41; whereas, the arm J39 extends downwardly from said shaft and is disposed in the path of a stud or roller J44 mounted on the contiguous side face of said cam. The cross bar J31 (Fig. 45b) is provided, at its opposite ends, with pull springs J36 anchored to studs j2 which project outwardly from the frame plates H13, H14, and serve also to limit the forward movement of the bar J31 through the fore-and-aft links J33. The vertical arms J35 are connected to the links J33 by studs J34 which are arranged in slots j3 formed in the links so as to permit a limited movement of the said arms in relation to the cross bar J31. A pull spring J42 attached to one of the arms J35 tends to swing both arms rearwardly and maintains the roller J40 resiliently engaged with the cam J41. Normally, the cam J41 is adapted to sustain the arms J35 and the cross rod J43 in the position I indicated by broken lines, Fig. 45a, the links J33 at such times being engaged with the studs j2, and the studs J34 of the arms being located at the front ends of the slots j3 of said links. However, at the proper moment during the rotation of the main shaft, a recess J60 formed in the cam J41 will be brought into registry with the roller J40, and thus allow the spring J42 to rock the arms J35 rearwardly until they are arrested by the engagement of the studs J34 with the rear ends of the slots j3. As a result of this operation, the connecting cross rod J43 is carried out of the path of the weights J25 from position I to position II, also indicated by broken lines in Fig. 45a, so as to free said weights. Thereupon the cam roller J44 is adapted to engage the arm J39 and rock the arms J35 further rearwardly, to shift the actuating bar J31 also rearwardly in the guide slots J32. The trip fingers J13, which may have been raised into the path of the bar J31, will thus be operated and the corresponding type actuating levers J10 subjected to the action of the weights J25 in the manner above described. As the cam shaft continues to revolve, the roller J44 passes out of engagement with the arm J39 and the roller J40 is forced upwardly out of the recess J60 on to the high concentric portion of the cam J41, the arms J35 being thus returned to position I and the springs J36 allowed to restore the bar J31 to its original or normal position. Incidentally, or during the return movement of the rocker arms J35, the cross rod J43 is adapted to engage the weights J25 of the active levers J10 and through the nose portions J57 of the toggle levers J26, to push the "firing pins" J20 rearwardly until they are caught by the triggers J14.

It will be understood that if the total to be recorded is, say, 5600, it is necessary or important that the two ciphers at the right of the third digit (6) be printed, and equally important or at least desirable, that those ciphers which appear in the accumulator at the left of the fourth digit (5) should not be printed. This problem is partially solved by arresting the trip fingers J13 in the intermediate position, as before described, the type actuating levers J10 for all type racks located at the zero level shown in Fig. 45 being unaffected by the reciprocation of the actuating bar J31. However, in order to print one or more ciphers which happen to fall at the right of a digit in any given amount, the triggers are formed at their front ends with offset ears or lugs J45 which are located (as shown in Fig. 45b) directly over corresponding shoulders j5 formed on adjacent triggers to the right. Consequently, all triggers at the right of one tripped by the action of the bar J31 will be tripped by the ears J45 independently of said bar, and the required cipher type members H25 as a result will be driven against the platen.

*Negative total mechanism*

A correct negative total is the actual difference between a large and a small amount when the former is subtracted from the latter and is also referred to as "credit" or "deficiency balance". For example: if 900 were subtracted from 500 the correct negative balance would be 400; however, the result appearing in an accumulator after the subtraction operation would be 9,999,600, which is the complement of 400, thus:

```
0000500  in accumulator before subtraction
 —900
─────────
9999600  result in accumulator after subtraction
```

According to this invention the correct negative totals are obtained and printed directly from the accumulators wherein their complements are registered. That is to say, when an accumulator is cleared by a regular total operation the true balance will be recorded whether or not the amount registered in said accumulator be positive or negative. To bring about this result, the totaling mechanism includes a second series of subsidiary rack bars K1 which are adapted, whenever a negative amount registered in any one of the accumulators A, B or C, is totaled, to control the adjustment of the type carriers. These bars K1, as may be noted, Fig. 8, in controlling the vertical position of the bars H7 are caused to move through the untraversed portion of the range of movement of the main rack bars B6 when the latter in totaling are moved rearwardly. The bars K1, which are adapted to function independently of the other series of short bars H1, are brought into use automatically whenever an accumulator registering a negative amount is selected for totaling. In printing the correct total, all the eleven digits of the type carriers H8 are utilized, including the lowermost "0" type elements, the latter being active in printing the first cipher or ciphers which may occur at the right of the first digit (above "0") of the desired total (reading from right to left) and the uppermost "0" type elements being adapted to print the cipher or ciphers which may occur between such digits. The short bars K1, therefore, have a range of ten spaces or one space more than the range of movement of the main bars B6.

In the preferred embodiment illustrated (see Figs. 44 to 49, inclusive), the rack bars K1 overlie the rack bars H1 so as to be engaged by the gears H2 when the latter, by rotation of the rock shaft H4, are swung upwardly out of engagement with the bars H1, the cross plate H40 at such times being adapted to lock the bars H1 against possible displacement in the manner before described and as shown in Fig. 40. The rocking of the shaft H4 is effected from the main shaft M1 by an edge cam K48 through intermediate mechanism controlled by one or another of the accumulators A, B and C, wherein a negative amount is registered. A part of this mechanism is duplicated for the respective accumulators and a description of one will suffice for all.

As best shown in Figs. 27, 28 and 30, each accumulator includes a disc K8 loosely mounted on the shaft B3 and rotatable with the last accumulator wheel B2 (the one at the extreme left) by means of an intermediate connecting pin K9. The disc K8 is provided with a pair of antifriction rollers K10 and K11, mounted on a common axis and disposed, respectively, adjacent the opposite side faces of the disc. The roller K11 is arranged to cooperate with an angular detent K13 pivotally mounted on the shaft D10 (Fig. 28) and the roller K10 is arranged to cooperate with a finger K12, which is pivotally attached to the free end of a crank arm K18 of the rock shaft F26. The finger K12 is provided with a light pull spring K20 which holds it resiliently in a normal position with its upper end disposed in the path of the roller K10 and its lower end in contact with the rear edge of the arm K18. A pull spring K24 (see Fig. 25), attached to an arm K17 depending from the shaft F26, tends to rotate the latter in a counter-clockwise direction, and a spring K14 attached to one arm of the detent K13 tends to rock it in the same direction, the movement of both the arm and detent being limited ordinarily by a pin K26 which projects laterally from the other arm of said detent and seats in a recess formed in the crank arm K18. When the digit wheels of an accumulator are turned in a subtraction operation to register a negative amount, and the wheel of the highest denomination (the one at the extreme left) as a result is caused to pass from zero to nine, the roller K10 of the disc K8 is adapted to engage the finger K12 and rock the arm K18 clockwise from the position shown in Fig. 28 to that shown in Fig. 25. By this operation, the detent K13 is allowed to swing upwardly under the tension of spring K14 and the pin K26 thereof is adapted to hold the arm K18 in its newly acquired position indicated in Fig. 25. At such times, the upward movement of the detent K13 is limited by means of an anti-friction roller K28 mounted thereon, banking against the periphery of the disc K8. Incidental to the rocking of the arm K18, an arm K27 located at the right-hand end of the rock shaft F26 is moved into the path of the lip F11 of the three arm lever F9, and a third arm K17 pinned to the extreme left end of shaft F26 (Figs. 29 and 30a) is moved into contact with a lug K22 of a fore-and-aft link K23, the parts being adapted to maintain such relative positions during the raising and lowering of the accumulator for further subtraction operations and also for addition operations provided the amount added does not exceed the complement of that registered. If, however, the added amount does exceed the complement of the amount registered in the accumulator, the wheels thereof will be turned in the opposite direction (clockwise) and the roller K11 of the disc K8, as the connected digit wheel is turned clockwise from 9 to 0, will engage and depress the detent K13 so as to restore the parts to their original position (Fig. 28). In the ordinary addition operations, the registered amounts rarely exceed the capacity of the accumulator, but in such event, the finger K12 of the arm K18 is adapted to yield as it is engaged by the roller K10 so that the parts controlled by said arm will be undisturbed (see Fig. 27).

The link K23 is slidably mounted on the machine frame for longitudinal movement and held resiliently in its forward position (Fig. 28) against a stop (not shown) by a pull spring K29 (Fig. 46). At its rear end, the link K23 is connected to the vertical arm of a bell crank lever K32 which is pivoted to a stud K33, located near the top of the fixed stand bracket B84, before mentioned (see Fig. 46). The horizontal arm of the lever K32 is provided with a roller K34 which tracks upon the upper edge of a rocker arm K35, the latter being pivotally attached to a fore-and-aft rack plate K36 and held against the roller K34 by a pull spring K42. When the link K23 occupies its forward position, the rocker arm K35 is inactive (see Fig. 39) but when the link K23 is pushed rearwardly (as shown in Fig. 46), said arm is rocked downwardly against the tension of the spring K42 into the path of a stud K44 which is mounted at the upper end of a lever K45 pivoted at K46 on the side frame H13 of the machine. At its lower end the lever K45 is provided with a roller K47 which is arranged to track upon an edge cam K48 and held in contact therewith by a spring K49.

The rack plate K36 is formed with slots K37, K38, and also mounted for longitudinal movement on a fixed stud K39 and cross rod H24 which engage said slots respectively. A spring K40, anchored to the stud K39 and attached to the rear end of the plate K36, tends to pull it forwardly and holds it resiliently in the position shown in Fig. 46. The teeth K51 of the rack plate K36 mesh with a gear segment K52 which is formed with a lower extended portion K53 and pivoted on a fixed axis K54. The extension K53 (see Fig. 46) is provided with a cam slot K55 wherein one end of the shaft H21, which supports the type bar adjusting gears H2, is engaged. The rearward movement of the link K23 is effected by operating any one of the total levers F1 and whenever by the action of the associated accumulator in registering a negative amount, the arm K27 of the rock shaft F26 is positioned, as above described, in the path of the lip F11 of the three arm lever F9. To bring about this result, the arms K17 of the rock shafts F26 are formed with upper extensions K21 which at such times are swung into contact with corresponding lugs K22 formed on the lower edge of the link K23 so that a total lever, when operated, will cause a further rocking of the shaft F26 through the lip F11, and thus force the link K23 rearwardly against the tension of the spring K29 to the position shown in Fig. 46. At this time and according to the above arrangement, when the cam K48 is rotated the lever K45 will be actuated and through the stud K44 is adapted to push the rocker arm K35 and rack plate K36 rearwardly. As a result, the gears H2, through the medium of the segment K52 and its extensions K53, will be cammed upwardly out of engagement with the rack bars H1 and into engagement with the upper rack bars K1, which will now control the adjustments of the type bars H7. After the printing operation and the restoration of the total lever to its normal position, the spring K29 is allowed to return the link K23 and raise the rocker arm K35 out of the path of the stud K44 so that the rack plate K36 will be unaffected by the lever K45 during succeeding cycles, or until another negative amount is to be totaled. In a word, the link K23 is a conditioning member and, when it is located in its forward position, those connections active in printing a positive amount registered in an accumulator will be conditioned for operation, whereas when it is in its rearward position, those connections active in printing the complement of a negative amount registered in an accumulator will be conditioned for operation.

As in the case of the rack bars H1, motion is imparted to the rack bars K1 from the type bars H7 through the intermediate sets of gears H2, H3 and H5, and although the bars K1 during the rise of the printing racks are moved forwardly instead of rearwardly, they are adapted by direct or indirect contact with the rear ends of the corresponding rack bars B6, to arrest the upward movement of the type bars in proper position to record a true balance when an amount registered in one or another of the accumulators A, B, C, is negative. In the preferred embodiment illustrated (see Figs. 13 and 44), all the rack bars B6, except the first at the right (Fig. 13), are provided with vertically adjustable toes or interponents K70, which are carried at the rear ends of arms K80 and depend from pivot studs K72. The arms K80 (Fig. 49) are hingedly connected to the bars B6 and the studs K72 are made sufficiently long to engage elongated slots K73 formed in the front ends of corresponding vertically movable supporting members K74 mounted in the upper and lower guide plates K4 and H15 (see Fig. 44). The toes K70 are held snugly against the rear edges of the rack bars B6 by pull springs K71 and are adapted, as the members K74 are actuated, to be lowered or raised into and out of the path of nose portions K2 formed on the front ends of the rack bars K1. The supporting members K74 are operated by means of fore-and-aft rocker arms K75 which are pivotally mounted on a fixed shaft K76 and connected to ears $k$ formed on the upper edges of the said members. At their rear ends, the arms K75 are provided with anti-friction rollers K77 which track upon the rack bars K1, the roller of the first arm K75 at the right (Fig. 13) engaging the upper edge of the corresponding first rack bar K1 on the right and the others in similar order of succession, so that the forward movement of the first rack bar K1 may control through the member K75 the position of the toe K70 of the second rack bar B6. The members K74 are provided with pull springs $k1$ which tend to raise them and hold the rollers K77 down upon the rack bars K1. Each of the rack bars K1 is formed in its upper edge and at its rear end with a depression or recess K78 which is located at such distance rearwardly from the rollers K77 as to permit rocking of the arms K75 and the consequent lifting of the toes K70 to inactive position (shown in Fig. 47) whenever the rack bars K1 are allowed their full range of movement, i. e., ten spaces, and the corresponding rack bars B6 are restrained by the total bar F2 against any rearward movement.

In printing the true negative total "400" from the negative amount 9,999,600 registered in an accumulator A, B or C, the rack bars B6, during the total operation, will be allowed to move rearwardly different distances determined by the extent of rotation of the accumulator wheels B2, as they are turned counter-clockwise and brought to rest by the stop bar F2. Specifically, the first two rack bars B6 at the right will be held against any movement whatever in their normal or zero position, since the tits B8 of the corresponding accumulator wheels are already in contact with the bar F2; the next or third rack bar B6 will be allowed to move rearwardly six spaces, and the remaining rack bars at the left nine spaces, before they are arrested in similar fashion by the stop bar. As the type bars H7 are allowed to rise, the short rack bars K1 will be moved forwardly to meet the main bars B6, the first two bars K1 at the right being allowed to pass through the full ten spaces into direct contact with the corresponding bars B6, since the first bar B6 is devoid of a toe K70 and the toe of the next bar is raised, in the manner above described, by the rocker arm K75 associated with the first bar K1. The third bar K1 will pass through four spaces, the toe of the third bar B6 being raised by the rocker arm associated with the second bar K1. The remaining bars K1 at the left will be stopped or held against movement, since the toes of the rack bars B6 corresponding to these particular bars K1 remain in their lower or active position, (the third bar K1 which controls the position of the toe of the fourth bar B6, as well as the remaining bars K1 not having moved sufficiently far to actuate the associated rocker arms K75). The first three type carriers H8, through the gears H2, H3 and H5, will thus be arrested in their upward movement in position to bring the type members 4, 0, 0, into the printing position.

To further illustrate the exact function of the parts in recording a deficiency balance, reference is directed to Figs. 49 and 50. In this example the amount 71,680 is to be subtracted from 11,170, the accumulator registering the complement of the true balance which is 60,510; thus

```
  11170   in the accumulator before subtraction
 -71680
 ───────
99939490  in the accumulator after subtraction
  71680
  11170
 ───────
  60510   true balance
```

The first main rack bar B6 (Fig. 50) is held, as in the previous example, against any rearward movement by the total stop bar, the second bar B6 advances nine spaces, the third four spaces, the fourth nine spaces, the fifth three spaces and the three remaining bars also nine spaces respectively. In passing through the untraversed portion of the range of movement of the bars B6, the corresponding short bars K1 are adapted as before to control the adjustment of the type carriers so that the proper or true balance will be printed. Accordingly, the first bar K1 at the right advances ten spaces into direct contact with the corresponding bar B6 so as to bring the lowermost "0" type element into use; the second advances one space also into direct contact with the corresponding bar B6, (the toe K70 of this particular bar B6 being lifted out of action) so as to bring the "1" type element into use; the third advances five spaces instead of six (the complement of four) since the corresponding toe K70 is active, and one unit must be borrowed from this place in arriving at the correct result. The "5" type element is thus brought into use. For the same reasons the fourth rack bar K1 instead of moving one space (the complement of 9) is stopped by the toe K70 of the fourth bar B6 so that the uppermost "0" type element will be located in the printing position. The fifth bar K1 advances six spaces (one less than the complement of 3) to bring the "6" type element into printing position, and the three remaining bars K1, like the fourth, are blocked by the toes against any effective movement, the toes K70 being active in each case, and, as a matter of fact in every place of higher order next to and beyond the first digit from the right on the accumulator greater than "0", which in this instance happens to be a "9" in the second place.

It will now be clear that the negative total mechanism above described is intended to carry out mechanically what has heretofore been done by mental caculation in ordinary subtraction, the interponents or toes K70 being adapted to compensate for the units which must be borrowed from the places of next higher denomination in order to obtain the correct result.

For the purpose of recording the negative balances or totals in red instead of black, as is ordinarily required, the ribbon supported in the present machine is adjustable automatically upwardly and downwardly to locate a red or a black section of the ribbon between the type members of the printing rack H8 and the platen N2. As shown in Figs. 39 and 46, the ribbon support K63 is mounted and guided by means of pin and slot connections K64, K65, in the machine frame and is operable from a rock shaft K57 by a pair of arms K56, one positioned on the right and the other on the left, which are loosely connected at their free ends to corresponding studs K62 riveted to said support. The left side arm K56 (see Fig. 39) is in the form of a bell crank lever having an arm K58 which depends from the rock shaft K57 and terminates in the path of a stud K59 projecting from the fore-and-aft link K23, above referred to. Normally, the ribbon support occupies its lower position (shown in Fig. 39) with the black section of the ribbon in use, but when the machine operates to print a negative balance, the stud K59 is adapted, as the link K23 is moved rearwardly, to engage the arm K58 and swing it in the same direction. As a result, the arms K56 are swung upwardly and the support K63 is raised so as to locate the red section of the ribbon in the printing position (see Fig. 46). If desired, the movements of the link K23 may be utilized to operate a bell or other signal in order to inform the operator in time or before the printing operation takes place that a negative or deficiency balance has developed.

*Total transfer mechanism*

Another feature of the present machine which is important in balancing accounts of various forms is its capability of subtracting a total registered in one accumulator from an amount registered in another accumulator, and at the same time or during the same cycle of operation, of adding the said total to an amount registered in a third accumulator, the total thus transferred, whether it be positive or negative, being recorded by means of the printing mechanism before described. In other words, by merely operating the total lever F1 of one accumulator and depressing the subtract key D1 of a second accumulator and the add key D2 of a third accumulator a total or amount registered in the first will be subtracted from the amount in the second and added to that in the third, and the correct algebraic difference and sum in the respective accumulators obtained. To permit "carrying" in the second accumulator, wherein the total is subtracted, the rack bars B6 are allowed to partake of the one space additional movement in a rearward direction after the first accumulator is disengaged therefrom, and are thereafter restored the one space preparatory to the engagement of the third accumulator therewith and their return to normal position.

To bring about these results (see Figs. 11 and 12) the side members of the sliding frame B37 are formed on their upper edges with lugs L42, which are adapted when the frame attains its extreme forward position to engage corresponding rollers L29 carried by a pair of arms L27 which extend rearwardly from a rock shaft L7. The arms L27 are connected by a cross rod L26 which overlies a series of rocking levers L6 loosely mounted on the shaft L7. The levers L6 correspond in number to the actuator rack bars B6 and all except the first at the right (Fig. 38) are extended forwardly so as to cooperate with studs L9 located near the lower ends of the vertical slides C1 of the carrying mechanism. A pair of pull springs L30 (see Fig. 12) attached to the arms L27 hold the rollers L29 engaged with the frame B37 and, through the cross rod L26, maintain the levers L6 in normal position against the tension of springs L10, the latter being connected to the rear ends of said levers and anchored to a fixed cross bar L4. Each of the levers L6 is connected by a vertical link L5 to an overhead locking pawl L2 arranged to engage corresponding ratchet teeth L3 formed in the lower edges of the rack bars B6. The pawls L2 are pivotally mounted on a fixed cross rod L1 and normally occupy their inactive position (shown in Fig. 11). However, when the frame B37 is advanced and the lugs L42 are brought into engagement with the rollers L29 of the bail arms L27, the latter will be cammed upwardly so as to free the levers L6 and allow them by the action of the springs L10 to push the pawls into engagement with the teeth L3 (see Fig. 12). This operation takes place after the rack bars have moved rearwardly during a total operation, so that they will be locked against the tension of their springs L35 in their different longitudinal positions when the accumulator is raised or disengaged from the rack bars B6. The pawls L2 function in this manner at every cycle of operation and consequently serve likewise when merely printing a total, as before described. To prevent the pawls L2 from being pulled out of engagement with the teeth L3, as the lugs L42 are carried out of engagement with the roller L29 by the rearward movement of the frame B37, a pair of detents L31 are provided, which are rocked by springs L33 into position beneath shoulders L35 formed on the bail arms L27 when the latter are cammed upwardly. The detents are pivoted at their lower ends on studs L32 and controlled by pins L36 mounted in the side members of the frame B37, said pins in the normal or rearward position of said frame serving to hold the detents out of action against the tension of the springs L33 before the frame is advanced to free them for engagement with the shoulders L35.

After the first accumulator (the one being totaled) is disengaged from the rack bars B6 (this operation, as will be remembered taking place at an earlier stage of the cycle than an ordinary subtraction operation), it is proposed to effect the subtraction carry-over in the second accumulator, which is still engaged with the rack bars B6, by disengaging the pawls L2 from the teeth L3 of the said bars B6 so as to allow them to move rearwardly one space further, the pawls thus affected being only those which cooperate with the rack bars whose fore-and-aft links C9 have been actuated by the tits B9 of the accumulator wheels. To this end, a set of yielding stop fingers L12, one being provided for each of the rack bars B6, are arranged to cooperate with the auxiliary set of rack bars B23 in their different longitudinal positions. These fingers are pivotally mounted by means of slots L13 at their front ends on a fixed cross rod L14 so as to be capable of a limited endwise movement relatively to the pivot rod L14. At their rear ends the fingers L12 are each formed with a heel portion L25 and a tooth l, the heel portions being located directly beneath the cross rod L26, and the teeth l arranged to engage a row of corresponding teeth L11 formed on the lower edges of the auxiliary rack bars B23. Pull springs L16, connected to the fingers and anchored to a cross bar L17 presently to be described, tend to swing said fingers upwardly and maintain the heel portions L25 thereof engaged with the rod L26. The disengagement of the pawls L2 from the rack bars B6 is effected by the studs L9 of the carrying slides C1, as the latter are permitted to rise under the influence of their actuating springs C14, the studs at such time being adapted to engage and lift the front ends of the respective levers L6, which were moved downwardly into juxtaposition to the studs L9 by the previous raising of the bail rod L26 (see Fig. 12).

Let it be assumed that the machine is at rest (as shown in Fig. 11) and that it is desired to transfer an amount registered in the accumulator A by addition, to, say, accumulator B, and by subtraction to accumulator C. The total lever F1, associated with the accumulator A, is actuated and the subtraction key D1 of the accumulator C as well as the add key of accumulator B are depressed, these operations swinging the stop bar F2 of accumulator A into active position, and preparing the parts to lower the accumulators A and C into engagement with the rack bars B6 as soon as the cycle of operation is inaugurated. Upon commencement of the cycle, the horizontal sliding frame B37 is moved forwardly to stretch the springs B35 and thus advance the rack bars B6 until they are arrested by the accumulator A through the engagement of the tits B8 of the accumulator wheels with the stop bar F2. Incidentally, the supplementary bars B23, through the gears B20 and B21 are moved forwardly similar distances, and the tits B9 of the wheels in the accumulator C, which happen to be turned past zero, push the associated links C9 rearwardly to permit raising of the corresponding carrying slides C1 when their retaining bail C5 is displaced upwardly. The tits B8 of the wheels in the accumulator A, of course, are brought to rest by the total stop bar F2 and hence do not disturb the links C9. As the frame B37 completes its forward movement, the lugs L42 thereof engage the rollers L29 and raise the cross rod L26 out of contact with the levers L6. The pawls L2 are thus pushed upwardly into engagement with the teeth L3 of the rack bars B6 and the fingers L12 are rocked upwardly into engagement with the teeth L11 of the subsidiary bars B23. Now when the retaining bar or bail C5 is raised, the carrying slides C1 which were affected by the operation of the links C9 will be pulled upwardly and the locking pawls L2 corresponding thereto, rocked downwardly to release the corresponding rack bars B6. The long springs B35 now act and force the auxiliary bars B23 forwardly a slight distance, or until stopped by the fingers L12 as the rear wall of the slots L13 bank against the rod L14. This distance is sufficient to advance the rack bars B6 to effect the carry-over in the accumulator C.

The disengagement of this accumulator from the rack bars immediately follows, but before the third accumulator wherein the amount is to be added is lowered into engagement with the bars B6, those bars which moved the extra space to carry are moved back one space to their original position. The means provided to accomplish this operation include the cross bars L17 which as best shown in Fig. 11 is carried between upper ends of a pair of side arms L18 and arranged to engage shoulders L24 formed on the fingers L12. The arms L18 are fastened at their lower ends to a rock shaft L19 which is operated from the main shaft M1 through a crank arm L20, the intermediate link C43, and bell crank C45 hereinbefore referred to. The bar L17, at the proper moment or immediately after the subtraction carry-over has been accomplished and the accumulator C lifted out of engagement with bars B6, is adapted by the rocking of the shaft L19 to push the fingers L12 rearwardly and, through their engagement with the bars B23, to move the bars B6, which effected the carrying, forwardly one space. As the cycle continues, the accumulator B is lowered into engagement with the bars B6 and the latter during their return movement are adapted to add the amount totaled out of the first accumulator A into the third accumulator B, the carry-over in this instance being effected in precisely the same manner before described in that portion of the "carrying" mechanism devoted to ordinary addition.

From the foregoing, it is apparent that with the present improvements, an amount whether positive or negative registered in one accumulator may be transferred to another accumulator by addition and to a third accumulator by subtraction, and the correct algebraic sum and difference in the respective accumulators obtained. It is thought that nothing further need be said as far as transferring positive amounts is concerned, but for the sake of clarity, an example of what occurs when a negative amount is transferred by addition and subtraction may be helpful.

Assume that there is a negative amount 999860 registered in accumulator A, and that it is desired to transfer this amount by addition to accumulator B, wherein there is registered a positive amount 89, and by subtraction into accumulator C, wherein there is registered a negative amount 999926. If the total key of accumulator A and the add and subtract keys of accumulators B and C are respectively depressed and a machine cycle of operation inaugurated, as previously described, the complement of the amount in accumulator A will be printed, namely—140, which is the true negative total or deficiency balance. In the first half of the machine cycle, the negative amount registered in accumulator A will be subtracted from the negative amount registered in accumulator C (remembering that accumulator C has been conditioned for subtraction by depressing its subtract key) and the amount registered in the latter as a result of the subtraction operation, will be 000066, a positive amount; thus—

```
  −999926   Amount initially registered in accumulator C
−(−)999860  Amount initially registered in accumulator A
  +000066   Amount registered in accumulator C after transfer by
            subtraction
```

This is the true algebraic difference of the two numbers, as will be evident if the complements of the amounts initially registered in the accumulators are considered. Thus, the complement of the amount initially registered in accumulator C was —74, while the complement of the amount registered in accumulator A was —140. If the latter is subtracted from the former algebraically, that is, with due regard to signs, the result is a positive 66, thus—

```
   −74    Complement of amount initially registered in accumulator C
−(−)140   Complement of amount initially registered in accumulator A
   +66    Amount registered in accumulator C after transfer by
          addition
```

In the second half of the machine cycle, the negative amount registered in accumulator A will be added to the positive amount registered in accumulator B (remembering that the accumulator B has been conditioned by depressing the add key); thus—

```
  +000089   Amount initially registered in accumulator B
+(−)999860  Amount initially registered in accumulator A
  −999949   Amount registered in accumulator B after transfer by
            addition
```

The complement of the amount now registered in accumulator B as a result of the addition operation, is —51, which is the correct algebraic sum, as will be evident if the amount registered in accumulator B and the complement of the amount registered in accumulator A are added algebraically, again with due regard to signs, thus—

```
   +89    Amount initially registered in accumulator B
+(−)140   Complement of the amount initially registered in
          accumulator A
   −51    Complement of the amount registered in accumulator
          B after transfer by addition
```

The amounts in accumulators B and C may now be totaled and printed if desired, the complement of the amount registered in accumulator B being printed when the conditioning link K23 is in its rearward position and the amount registered in accumulator C printed when the conditioning link is in its forward position, all as previously described.

*Paper carriage mechanism*

The paper carriage (best shown in Figs. 52 and 53) consists of a base plate N3 which is slidably mounted for horizontal movement in opposite directions in suitable guideways formed in a supporting frame N1. At its opposite ends the base plate N3 is provided with forwardly extending flanges N4 and between these flanges the rubber covered roll or platen N2 is rotatably mounted on a shaft N5. Usually, the paper carriages in machines of the present class are advanced by springs and returned positively to starting position by the electric motor employed. Due, however, to the power of these springs (which is considerable in the larger machines, especially when equipped with automatic control mechanism) governing and shock absorbing devices must be employed to obtain the smoothness of operation desired during the advance movement of the carriage. Under the present invention the said springs and all complications resulting from the use thereof are dispensed with entirely, the paper carriage being operated in both directions by means controlled from the power shaft. Such means includes an elongated horizontally disposed screw or worm N8, which is adapted when turned clockwise, to move the carriage toward the right (Fig. 52) and when turned in the opposite direction or counter-clockwise to move the carriage toward the left. The screw N8 is journaled by means of trunnions N9 and N10 in the supporting frame N1 and arranged directly beneath the base plate N3 of the carriage to which it is operatively connected through the medium of a nut N6 secured to the base plate. Rotation of the screw N8 is effected from a motor driven shaft N13 also journaled in the frame N1 and arranged below the screw in parallel relation thereto. Near its opposite ends the shaft N13 is provided with gears N12 and N15, respectively, the gear N12 being arranged in mesh with a corresponding gear N11 pinned to the trunnion N9 of the screw N8, and the gear N15 (see Fig. 54) being arranged in mesh with an idler gear N16 which also meshes with a gear N14 pinned to the other trunnion N10 of the screw. The gears N12 and N15 are loosely mounted on the shaft N13 but may be connected thereto by means of clutch members N22 and N19 which are splined to said shaft and movable axially thereon into and out of locking engagement with the hubs of the said gears.

Normally, that is when the paper carriage is at rest, the clutch members N19 and N22 rotate freely with the shaft N13, but when one or the other of the said members is moved into engagement with the contiguous gear hub, motion of the shaft N13 is transmitted to the screw; thus when the clutch member N19 is engaged with the hub of the gear N15 the screw, through the medium of the idler N16, will be turned one way to feed the carriage from right to left, and when the clutch member N22 is engaged with the hub of the gear N12 the screw through the direct meshing of the gears N11 and N12 will be turned the other way to feed the carriage from left to right.

The movements of the clutch members N19 and N22 are effected by means of corresponding horizontally disposed levers N23 and N31 which are fixedly mounted on short vertical rock shafts N24 and N32 respectively. At their rear ends the levers N23 and N31 are connected by a link N38 and about midway of their length are formed with lateral arms N26 and N34, which are arranged to cooperate with corresponding rocker detents N29 and N36 in a manner presently to be pointed out. The link N38 is pivoted to the lever N23 and loosely connected to the lever N31 by a cross pin N39 and slot N40, so as to be capable of a limited movement relatively to the lever N31. The detents N29 and N36 are each formed with two recesses n1 and n2, and provided with pull springs N30 which hold them engaged with anti-friction rollers N27 and N35 carried at the free ends of the lateral arms N26 and N34. The engagement of the clutch member N19 with the gear N15 is effected automatically at a predetermined point during the machine cycle of operation, by rocking the shaft N24 and thus actuating the clutch lever N23; whereas, the engagement of the clutch member N22 with the gear N12 is effected by rocking the clutch lever N31 through a second link N41 which is controlled by the movement of the carriage when it is traveling from right to left. This second link N41 is pivoted to the lever N31 and rests upon the link N38 which serves to support and hold it against displacement through a pin and slot connection n3 (see Fig. 55). The arrangement of the parts is such that when the shaft N24 is rocked clockwise the lever N23 will be turned from the position shown in Fig. 52 to that shown in Fig. 68, the forked arm thereof forcing the clutch member N19 into engagement with the gear N15, where it is retained by the seating of the roller N27 in the recess n2 of the detent N29, the longer link N38 at this time moving idly toward the right as permitted by the slot N40, and without disturbing the clutch control lever N31. The paper carriage through the screw N8 is thus caused to move from right to left, and when it has traveled to the limit of its active or advance stroke, the shorter link N41, by means of a lug N43, is picked up by a stop plate N48 of the carriage and through the clutch lever N23 disengages the clutch member N19 from the gear N15, thereby stopping the movement of the carriage. However, as the detent rollers N27 and N35 by this operation are forced past the dead center line between the recesses n1 and n2 of the detents, both the clutch levers are overthrown by the action of the detent springs N30 so as to move the clutch member N19 to its normal inactive position shown in Fig. 52 and also to move the clutch member N22 into action. The movement of the carriage is thus reversed, the clutch member N22 remaining engaged with the hub of gear N12 until the carriage attains a certain position at the extreme right when it is automatically disengaged in a manner presently to be described.

The rocking of the shaft N24 to engage the clutch member N19 with the driving gear N15 is accomplished by a fore-and-aft pusher link N74, operable by a second rock shaft N53 (Fig. 53) which is controlled from the main shaft M1 by a cam plate N68 through intermediate connections about to be described. At its rear end (Fig. 58), the link N74 is connected to an arm N73 rising from the rock shaft N53, and at its front end it is loosely connected to a crank arm N75 pinned to the rock shaft N24.

The cam plate N68 is secured to one side face of a wheel or disc N69 and arranged to engage an anti-friction roller N67 carried by an angular lever N61. This lever (best shown in Figs. 57 and 58) is pivotally mounted on a fixed axis N60 and connected by a bell crank N58 and link N57 to a crank arm N56 of the rock shaft N53. The bell crank N58 is also pivoted on the axis N60 and one arm thereof is connected to the link N57. The other arm of the bell crank is connected to the lever N61 by means of a pin N64. For reasons later to be described, the lever N61 is capable of bodily movement into and out of operative relation with the cam plate N68 and to permit such movement relatively to the axis N60 and connecting pin N64, it is slotted (as shown) and held resiliently in operative position by a pull spring N65. Ordinarily, however, after each printing operation and just before the cycle is completed the cam plate N68 is adapted to engage the roller N67 and turn the lever N61 clockwise, thereby pulling the link N57 forwardly to rock the shaft N53, which in turn and by means of the pusher link N74, rocks the shaft N24 so as to move the advance clutch member N19 into engagement with the hub of gear N12.

To arrest the carriage during its course of travel from right to left at the different predetermined points required to align the columns of a sheet on the platen N2 with the type carriers, the mechanism also includes a rectangular horizontally disposed stop supporting bar N45 which is mounted to rock on trunnions journaled in flanges N44 extending rearwardly from the base plate N3 at the opposite ends of the paper carriage.

The bar N45 (shown in detail, Fig. 63,) is formed in its front and rear side faces with a series of grooves n5 and is arranged directly above the links N38 and N41 (see Figs. 56 and 58). The grooves n5 are spaced at small intervals and serve to locate small adjustable stop plates N46 as well as the stop plate N48, previously mentioned. These plates are inserted in the grooves n5 manually, the plates N46 at points corresponding to the vertical column lines of an accounting sheet, and the plate N48 at a point determined by the width of the sheet. The single stop N48 projects below the front face of the bar N45 (as shown in Fig. 56) so as to engage the lug N43 of the short link N41; whereas, the stops N46 project below the rear face of the bar so as to engage a corresponding lug N42 rising from the long link N38 (see Figs. 55 and 58). About midway of its length, the bar N45 is provided with a depending arm N49 by means of which it may be rocked from active to inactive position against the tension of a pull spring N79, to carry the stop plates N46 and N48 out of line with the lugs N42 and N43, respectively. The operation or rocking of the bar N45 is effected by a long horizontal rod N50, which engages the lower end of the depending arm N49. The rod N50 is supported between the side arms N51 of a rocking bail N52 and is adapted to control the movements of the stop bar N45 in any arrested position of the paper carriage. The bail N52 is hingedly mounted on the rock shaft N53 and is operable either by an arm N55 keyed to the rock shaft N53, or by a bell crank lever N77 which is controlled by the movements of the return clutch lever N31 through an arm N76 extending rearwardly from the short rock shaft N32 (see Figs. 55 and 56).

When the "advance" clutch lever N23 is actuated by the turning of the rock shaft N53 and the forward movement of link N74, the bail rod N50 will be rocked forwardly for a moment by the arm N55 so as to move the stop bar N45 to its inactive position shown in Fig. 58, and thus allow the carriage to move from one column to the next, the spring N79 at such times acting to return the stop bar to its original position as soon as the cam plate N68 passes the roller N67 of the angular lever N61. On the other hand, when the "return" clutch lever N31 is actuated by the engagement of the stop N48 with the short link N41, as above described, the ball rod N50 will be rocked forwardly again with the same results by the lever N71, but in this instance the said rod is caused to retain its forward position so as to hold the stops N46 and N48 clear of the lugs N42 and N43, during the full return movement of the carriage and until the lever N31 is actuated a second time to release the clutch N22.

In returning, the carriage is adapted to travel about an inch beyond its normal position of rest before the return clutch member N22 is disengaged from the hub of the driving gear N12, such disengagement being effected during a second or idle revolution of the cam shaft M1, which is brought about automatically as the carriage completes its return movement, and in a manner presently to be described, so as again to actuate the angular lever N61 and thus cause a rocking of the advance clutch lever N23. This operation moves the advance clutch member N19 into action, as before, and through the long connecting link N38 and return clutch lever N31 moves the return clutch member N22 out of action. At this moment (just before the carriage advances) a separate stop plate N80 is located at the extreme left end of the carriage and corresponding in form to the stop plates N46 is adapted to occupy a predetermined position beyond or at the right of the lug N42 of the long link N38 (see Fig. 60). Consequently as the carriage moves from right to left, the said stop plate N80 will engage the lug N42 and push the link in the same direction to disengage the advance clutch member N19 and stop the carriage in its normal position, with the first column of the sheel located in printing position. The stop N80 like the stops N46 may be set in different positions as permitted by the grooves n5 of the bar N45 in order to compensate for the differences in location of the first column of various accounting sheets and also to allow skipping of columns when desired.

The inauguration of the idle rotation of the cam shaft is an operation which, as herein illustrated, is incidental to the function of an automatic accumulator selecting mechanism later to be described, and the purpose of this cycle is primarily to effect the depression of the selecting keys D1 and D2 of the accumulators to be used for the first column of a sheet automatically.

*Motor control*

The machine is provided, as stated in the beginning of the specification, with two motor keys M33 and M34, the former being used for horizontal spacing and the latter for vertical spacing. Both of these keys when actuated, are adapted to cause the engagement of an angular pawl M17 with a ratchet wheel M16 which is driven constantly from the motor drive shaft M13 through a set of reducing gears M12, M13, M14, (see Figs. 57, 58 and 59). The pawl M17 is mounted on a disc M18 keyed to the main shaft M1, and normally is held disengaged from the ratchet wheel M16, against the tension of a pull spring M20, by the vertical arm M21 of a bell crank lever M23, whose upper end is disposed in the path of a pin M22 carried by the pawl M17. The lever M23 is mounted on a fixed bracket M25 and connected by a fore-and-aft link M27 to a crank arm M31 rising from a rock shaft M29, the latter being operable by either of the motor keys M33 or M34 through the medium of bail rod M32, which is connected to the said shaft by a pair of side arms M30. The bell crank lever M23 is held resiliently in its normal position by a pull spring M26 with its other or rearwardly projecting arm M24 banking against the bottom plate of the bracket M25, the parts being so arranged that when the motor key M33 or M34 is depressed the upwardly extending arm of the said lever will be rocked from its position beneath the pin M22, and thus allow the pawl M17 to engage the ratchet wheel M16 to start rotation of the cam shaft M1. As the cam shaft completes a revolution the pin M22 of the pawl M17 is adapted to reengage the arm M21 of the bell crank and thus disengage the pawl from the ratchet wheel to stop rotation of the shaft. A rocker detent M70 is provided to hold the shaft M1 against possible displacement from its normal position of rest. This detent (as clearly depicted in Fig. 61) is arranged to engage a corresponding notch M40 formed in the outer edge of the disc N69, before referred to, but is adapted to be displaced from the notch against the tension of a pull spring M39 when the cam shaft starts to revolve.

No mechanism has been shown for vertical line spacing, since any suitable form of common construction may be employed. However, since at such times the paper carriage must remain at rest, means controlled by the motor key M34 (marked "vertical", Figs. 1 and 59) are provided to prevent the engagement of either of the clutch members N19 and N22 during the normal rotation of the cam shaft M1. Such means (see Figs. 53, 57 and 59) include an irregularly shaped lever M46, pivoted at M49 to the main frame, and movable clockwise about its pivotal axis from the inactive position shown in Fig. 53 to the active position indicated by dotted lines in Fig. 57. The movements of the lever M46 are controlled from "vertical" key M34, the stem of this key (as shown in Fig. 59) being provided with an offset finger M41 which is connected to said lever through the medium of a bell crank M43, and a fore-and-aft link M45. The bell crank M43 is pivotally mounted on the rock shaft M29 between locating collars M44, and the link M45 is attached to the lower end of the lever M46 by a pin and slot connection M47, M48. At its upper end, the lever M46 is formed with a shoulder M51, arranged in operative relation to a spring actuated rocked detent M53 which is adapted when the lever is swung to its active position to engage the said shoulder and thus sustain the lever against the tension of a pull spring M63 independently of the motor key M34. From this position the lever M46 is capable of further movement in the same direction to actuate through the medium of a pin M60, a fore-and-aft pusher bar M61 which is slidably mounted on fixed studs M62 and arranged with its rear end in engaging relation to a stud N72 carried by the angular lever N61, the latter, as will be recalled, controlling the operation of the advance clutch lever N23 of the carriage mechanism. The further movement of the lever M46 is brought about automatically during the rotation of the cam shaft M1 by a roller M57 carried by the disc M18 to which the driving pawl M17 is attached. The roller M57 (see Fig. 57) is located about 45° in advance of the cam plate N68 and is arranged to engage a long curved arm M56, which extends rearwardly from the lever M46. It will now be seen that as the motor key M34 is depressed, the cycle of operation will be inaugurated by the release of the pawl M17 and the lever M46 will be rocked to active position against the stud M60 where it is temporarily maintained by the detent M53. As the cycle proceeds, the roller M57 is moved into engagement with the upper edge of the curved arm M56 of the lever M46 and cams it downwardly so as to force the pusher bar M61 to the rear, and thus moving the lever N61 to a neutral position with the roller N67 thereof out of the path of the cam plate N68. By a further rotation of the cam shaft and after the cam plate N68 passes the lever N61, the roller M57 is brought into contact with a depending arm M59 of the detent M53 to rock the latter out of engagement with the shoulder M51 so as to permit the spring M63 to restore the lever M46 to its normal or inactive position, the spring N63 at the same time restoring both the lever N61 and pusher bar M61 to their original positions, the roller M57, meanwhile, and due to the shape of the arm M56, having passed out of engagement therewith. The operation of the advance clutch is thus prevented during the cycle, and the carriage is retained at rest preparatory to the rotation of the platen for vertical "spacing". The printing or recording may thus be done in the same column during the next cycle. It will, of course, be understood that the different cams of the main shaft M1 are so designed as to effect the operation of the various organs of the machine in proper sequence, and for a clear conception of the order in which these different operations take place, reference may be had to the timing chart shown in Fig. 71.

*Special control for automatic distribution*

While the manual selection of the accumulators A, B and C, will be advantageous in handling certain classes of accounting work of a heterogeneous character, it is proposed in carrying out the invention to effect their selection automatically when desired, in order to adapt the machine to other classes of work wherein large numbers of accounting forms of like character are employed. To this end, the machine (as best shown in Figs. 52, 53, 59 to 66, inclusive) is equipped with a rotatable cylinder or drum P28 which is provided with a set of finger pieces P29 adapted by rotation of the cylinder P28 and through certain intermediate connections presently to be described, to actuate the selecting add and subtract keys D1 and D2 of the respective accumulators A, B and C. The cylinder P28 (see Figs. 65, 66, 67,) is formed on its periphery with a series of dove-tail grooves P31 extending longitudinally thereof, and wherein the finger pieces P29 are adjustably maintained. The grooves P31 are numbered from 1 to 8 and are selected in numerical order according to the number of columns in a sheet; that is to say, if a sheet has five columns, the finger pieces in the first five grooves P31 are adjusted into proper positions to control the selecting keys of the corresponding accumulators. As herein illustrated, each of the said grooves is provided with three of these finger pieces, each of which may be utilized for controlling the operation of the selecting key D1 or D2 of different selected accumulators or for preventing through separate connections the upward movement of the type racks H7 when "non-printing" is desired. At this point and in this connection it may be stated that while provision is made only for the control of the individual accumulators and type racks, the number of finger pieces P29 may be increased, if desired, to control through suitable connections any of the other functions of the machine as well.

It will be noted, (see Fig. 59) that the cylinder P28 is mounted independently of the paper carriage on a horizontal shaft P26, and arranged at the rear end of the machine where it is exposed to view and easily accessible for manipulation. The groove-indicating numerals (as may be observed, Fig. 67) are marked on the edge of a disc P30 located at one end of the cylinder, and suitable markings are stamped on the outer surface of the cylinder, i. e., "A", "B", "C", etc., to indicate the proper positions of the finger pieces in the grooves for effecting the selection of the different accumulators and the legend "NP" to indicate the position of the finger piece for controlling the non-print mechanism.

It may also be observed (Fig. 67) that the cylinder is divided longitudinally into three sections, the relatively narrow section at the extreme left being utilized as storage space for the finger pieces P29 and the two wider plus and minus sections, which are separated by a division line P32, being utilized for the finger pieces when they are moved to active positions of adjustment. The markings A, B and C, for each of the grooves P31 show in both the wider sections so that finger pieces for controlling the respective add and subtract keys of two different accumulators may be properly located in the same groove.

The shaft P26 is journaled at one end in a stand bracket P20 (Fig. 59) and at its opposite end in the side plate M10 of the machine frame. At a point adjacent the bracket P20, the said shaft is provided with a spur gear P25 which meshes with a corresponding gear P24, keyed to a lay shaft P23, the latter being driven from a Geneva wheel P18 (Fig. 61) through a vertical shaft P19 and a set of intermediate bevel gears P21. The gear P25 is loosely mounted on the cylinder shaft P26 but is connected thereto by means of a clutch member P27 splined to the shaft and held normally engaged with the gear by a compression spring P60. This arrangement permits the clutch member P27 to be disengaged manually from the gear P25 and the cylinder P28 to be rotated independently of its driving mechanism preparatory to the setting of the finger pieces P29. After this operation has been completed the cylinder is turned to "zero position," where it is retained by a detent P36, and the clutch member P27 is allowed to engage the gear P25. The detent P36 (see Fig. 53) is pivoted on the shaft N53 and provided with a roller P35, which is arranged to engage a corresponding recess P34 formed in the edge of a disc P33, the latter being fixedly mounted on the shaft P26.

The rotation of the Geneva wheel P18 is controlled by a series of actuating rollers P17 which are spaced apart and arranged to engage said wheel intermittently as the paper carriage is moved to and fro in the supporting frame N1. These rollers P17 (as best shown in Figs. 62 and 63) are mounted on studs P15 secured to U-shaped clamps P14 and disposed in line with the Geneva wheel P18. The clamps P14 are adjustably mounted on a horizontal bar P10 and provided with clamping screws P16 which hold them in their adjusted positions. The bar P10 is fastened at its opposite ends to the respective side flanges N44 of the paper carriage and formed in its upper edge with a longitudinal groove P12 wherein the lower ends of the screws are confined. Each of the clamps P14 is also provided with a serrated shoe arranged to engage corresponding serations formed on the lower edge of the bar P10 so as to prevent possible displacement of the clamps from their different adjusted positions. To adjust the clamp it is merely necessary to loosen the screws P16, shift them along the bar P10 to the positions desired, and then tighten the screws. The number of clamps employed will vary according to the number of columns in a sheet to be recorded and their positions will be determined by the positions of the actuating fingers N46 which control the driving clutches for the carriage screw N8. That is to say, the clamps P14 and actuating rollers P17 will be so located with reference to the fingers N46 as to impart a partial turn to the shaft P19 through the Geneva wheel immediately after the advance clutch N19 is moved into action to shift the carriage from one column to the next, as before described. By each partial turn of the shaft P19 (45 degrees) the cylinder P28 is turned in counter-clockwise direction through the same number of degrees and the active finger pieces P29 in one of the cylinder grooves P31 caused to depress the selecting keys D1 or D2 of the corresponding accumulators preparatory to the next cycle of operation. Each of the rollers P17 functions in the same way until the actuating finger N48 located at the extreme right of the carriage is brought into contact with the lug N43 of the short link N41 of the carriage clutch control mechanism to reverse the direction of travel of the carriage in the manner previously described. During the return movement of the carriage the rollers P17 are again caused to actuate the Geneva wheel in the reverse direction and through the intermediate gearing turn the cylinder P28, step by step, back to its starting position, shown in Fig. 53. As the carriage reaches its starting point an auxiliary roller P53 (Fig. 62) permanently attached to the bar P10 will be located in the position $x$ (Fig. 60) and as the carriage continues to move, the said roller is adapted to engage the Geneva wheel P18 and impart an extra turn to the lay shaft P23 and also to the cylinder P28. As a result of this extra turn, an arm P54 keyed to the lay shaft P23 is rocked downwardly (as shown in Fig. 61) and a stud P55 carried by the arm is caused to engage and actuate a lever P56, which is connected by means of a pin P58 to the other arm of the main drive control lever M21. The driving pawl M17 is thus released and the idle rotation of the cam shaft inaugurated to again (as the cycle nears completion) reverse the direction of travel of the paper carriage until it is stopped, as before described, by actuation of the long link N38 through the finger plate N80 and the lug N42. As the subsidiary roller P53 moves back from position Y, Fig. 60, to position $x$, the Geneva wheel is given a compensating turn to restore both the arm P54 and the cylinder P28 to their respective normal or initial positions. By this movement of the carriage the selecting keys D1, D2 of the accumulators used in the first column of the sheet are depressed through intermediate connections about to be described.

The connections between the cylinder P28 and the six accumulator selecting keys D1 and D2 include a corresponding number of fore-and-aft links P40 which are connected at their front ends to bell crank levers P38 and at their rear ends to the vertical arms of similar levers P41 (Figs. 53, 59, 65, 66). The levers P38 are disposed in pairs, each pair being pivotally mounted on the respective rock shafts F8 and arranged to engage studs F29 projecting from the stems of the respective selecting keys D1 and D2 of the individual accumulators A, B and C, (see Fig. 53). The levers P41 are pivotally mounted on the lay shaft P23 and arranged in operative relation to the cylinder P28, being provided with spring controlled dogs P43 disposed in the rotary path of the finger pieces P29. The selecting key springs D35 acting through the levers P38 and links P40 maintain the levers P41 in a normal position against a fixed cross rod P45 (Fig. 65). As the paper carriage moves from right to left and the cylinder P28 is rotated, the finger pieces P29 thereof are adapted to engage the dogs P43 from above and rock the vertical arms of the levers P41 rearwardly (Fig. 66) so as to depress the connected selecting key stems D14 or D17 and thus condition the parts for the engagement of the corresponding accumulator with the rack bars B6. During the return movement of the paper carriage the finger pieces of the cylinder P28 are adapted to engage the dogs P43 from below, but at this time the dogs are allowed to yield, as shown in Fig. 65, against the tension of their control springs P44 without disturbing the levers P41 and parts connected thereto. In this connection it may be stated that as the cylinder P28 is turned back from the position shown in Fig. 65 to its normal position shown in Fig. 66 by the compensating partial turn of the Geneva wheel, the finger pieces P29 of the first groove P31 are adapted to actuate the selecting key levers P41 of the accumulators, being used for the first column of the sheet; also that this operation takes place near the end of the idle cycle and subsequently to the operations of the selecting key releasing mechanism hereinbefore described.

It will be observed (Fig. 59) that the first three levers P41 from the right are connected by the links P40 and levers P38 to the stems of the "add" selecting keys D2 and that they are disposed in line with the "plus" section of the cylinder P28; whereas, the remaining three levers P41 are similarly connected to the stems of the "subtract" selecting keys D1 and are disposed in line with the "minus" section of the said cylinder. Consequently, the finger pieces P29 occupying the "plus" section will control the "add" keys and those occupying the "minus" section will control the subtract keys, the adjusted position of the individual finger pieces in both sections determining the particular add or subtract key to be actuated and the groove P31 the sequence of actuation, which is predetermined in accordance with the columnar position of the paper carriage.

It may also be observed (Fig. 59) that the lay shaft P23 serves as the pivotal axis for a seventh rocker lever P47 which is aligned with the "non-print" legend on the cylinder P28 and like the levers P41 is provided with a pivoted dog P43. This lever (see Fig. 53) is connected by a downwardly extending link P48 to a crank arm P49 of a rock shaft P50 which is journaled in the machine frame and held against rotation in a clockwise direction by a pull spring P52. Between its ends the rock shaft P50 is provided with a bail member P51 (Figs. 53, 59) extending forwardly therefrom and arranged in engaging relation to the printing rack lifting levers H26, the parts being so arranged that as the cylinder P28 is rotated, by the advance of the paper carriage, a finger piece P29 adjusted to the "non-print" position will rock the lever P47 and through the rock shaft P50 raise the bail member P51 into a position in front of the vertical arms H29 of the levers H26. The type carriers H8 will thus be restrained against upward movement when their actuating springs H30 are placed under tension and the amount registered in the selected accumulator will not be printed. Friction between the lower ends of the arms H29 of the bell crank levers H26, and the cross rod of the bail member P51 is depended upon to maintain the latter in active position until the tension of the springs H30 is relieved, at which time the spring P52 is allowed to restore the said member and the rocking lever P47 to their original positions.

Fig. 69 is an example of one form of accounting which may be handled by the present machine. Here it will be observed that in the relatively narrow space at the left of the first column, the number of the account is printed. The operations involved, however, are merely those of recording, no accumulators being used. In columns #2 credit items of a number of accounts are listed and totals of these items for the respective accounts are printed. In column #3 the debit items of the several accounts are listed and the totals of these items printed. In column #4 the individual balances of the different accounts and a grand total are printed.

In producing this particular form without the use of the automatic selector cylinder P28, the finger plates N46 of the carriage are first adjusted, five being employed and spaced apart to correspond to the vertical division lines of the sheet. The clamps P14 which carry the Geneva actuating rollers are then removed from the supporting bar P10 or shifted to a neutral position at the extreme right of the carriage. Assume now that accumulators A and B are chosen for the "credit" and "debit" columns and accumulator C for the balance column. After the number of the account is entered and printed during the first cycle of operation, the carriage is moved automatically toward the right and stopped with column #2 in the printing position. The first credit item is then entered by operation of the digit keys A1, the add keys D2 of both accumulators A and B and the lock key D3 are all depressed, and the motor key M34 actuated. During the second phase of the cycle of operation the amount 3261.72 will be printed automatically in column #2 and registered in both of the said accumulators. It is now merely necessary to operate the digit keys and the "vertical" motor key to record the remaining credit item in the first account, the accumulators A and B being selected automatically at each succeeding cycle and the total 10221.49 finally appearing both. The total lever of accumulator B is then operated in order that the total 10221.49 may be printed in column #2 and retained in accumulator A, and the accumulator B cleared to later register the debit items, the selecting keys D2 and lock key D3, incidentally, being automatically released. After the platen N2 is turned back to the first line of printing and the paper carriage shifted by operation of the "horizontal" motor key to locate column #3 in printing position, the selecting add key D2 for the accumulator B and the lock key D3 are again depressed preparatory to the successive entries of the debit amounts and the corresponding operations of the "vertical" motor key M34. Each of these items is printed as shown and the total 6575.70 finally appears in the accumulator B. This total is then printed in column #3 and subtracted from the amount registered in accumulator A during the next cycle of operation by depressing the subtract key of the accumulator A and operating the total lever of the accumulator B, the cycle at this time being inaugurated by the depression of the horizontal motor key M33, and the paper carriage being automatically advanced to bring the fourth or last column into the printing position. The amount now registered in the accumulator A is the balance of the debit and credit amounts recorded in columns #2 and #3. This balance, during the next cycle of operation which is inaugurated by the depression of the horizontal motor key, will be printed in column #4 and transferred into accumulator C by operating the total lever of accumulator A and depressing the "add" selecting key of accumulator C. At the same time the paper carriage is moved further toward the left until the positions of the clutch members N19 and N22 are reversed to return the carriage to its original position. The succeeding accounts are listed and balanced in similar fashion, but it may be mentioned in connection with the third account wherein the total of the debit items exceeds that of the credit items, that since the balance is negative the actual amount that will appear in accumulator A is 9996507.85. However, the amount printed in totaling will be 3492.15 which is the correct negative balance and will appear in red. It may also be mentioned that previous to the transfer of the amount in accumulator A to accumulator C, the latter would register 4880.35, which is the sum of the first two balances in column #4. However, when the amount in accumulator A is transferred by addition to that in accumulator C the total will be 0001388.20, thus:

```
4880. 35  in accumulator C
9996507. 85    "       "    B 0001388. 20  total in accumulator C after transfer
```

When the accumulator C is finally totaled out the three ciphers at the left will be automatically eliminated and the grand total 1388.20 will be recorded. If there should be a large number of forms such as that shown in Fig. 69 to be balanced, the automatic selecting cylinder P28 would be employed, the finger pieces P29 being shifted into their proper positions in the grooves of the cylinder to actuate the selecting keys D1 and D2, and the clamps P14 adjusted to their proper positions relative to the finger plates N46 so as to actuate the Geneva wheel in the manner required as the carriage is moved from one column to another.

By using six accumulators instead of the three shown, which would merely involve a duplication of certain parts and increasing the length of others in the present machine, forms of accounting, such as illustrated in Fig. 70, could be handled in much the same way as the more simple form above described. In this instance it may be observed that the accounting form is divided into nine columns. An accumulator will be necessary for each of the columns headed cash sales, credit sales, accounts paid, cash disbursements, total credits and cash balance. The remaining columns need no corresponding accumulators as in them are merely recorded the date and the identifying numbers of different accounts.

During the course of a day's business, there will be cash sales and credit sales, and in addition, payments will be made on various accounts. It may also happen that amounts are paid out during the course of the day. When a cash sale is made, the operator merely shifts the paper carriage to the proper column and enters the amount of the sale. In accordance with the invention, as heretofore described, this amount will be printed in the proper column and distributed automatically to the accumulator allotted to cash sales and added therein. If a credit sale is made the operator enters the identifying account number, and the amount of the credit sale in the proper columns. The shifting of the carriage to the proper column also prepares the machine for automatically adding the amount in the accumulator allotted to credit sales. Likewise if a payment is made on an account the identifying number is entered and the amount paid recorded, the position of the carriage automatically distributing this amount to the accumulator allotted to accounts paid in which it will be automatically added. If salaries or other disbursements are paid out, the amount is entered in the proper column, the positioning of the carriage as before, causing said amount automatically to be distributed to the accumulator allotted to disbursements wherein it will be added.

The condition of the business at the end of the day may be immediately determined by totaling out the accumulator allotted to cash sales, and at the same time printing the amount and transferring it by addition to the accumulator alloted to cash balance. The carriage is then shifted to the credit sales column and this amount totaled out and printed, at the same time transferring it by addition into the accumulator allotted to total credits as obviously a credit sale increases the total credits. The carriage is then shifted to the accounts paid column and the accumulator corresponding to this column totaled out and the amount printed. At the same time it may be transferred by subtraction to the accumulator allotted to total credits, and simultaneously by addition to the accumulator allotted to cash balance as obviously a payment on an account will decrease the total credits and increase the cash balance. Cash disbursements may likewise be printed and transferred by subtraction to the accumulator allotted to cash balance. The paper carriage is then shifted to the total credits column and the total credits printed by totaling the corresponding accumulator, and cash balance may similarly be printed in the proper column by totaling the accumulator allotted to cash balance. Of course, if the sheet is to be used from day to day sub-totals can be taken of the total credits and the cash balance so that these items will remain in the machine for use on a subsequent day.

From the foregoing description it will be understood that the present machine is not only capable of handling many different forms of accounting but is particularly adapted to automatic distribution. It might be stated further that the mechanism herein described is not necessarily limited to the particular type of machine described, but may be employed in such machines as cash registers, the ordinary so-called adding machines, and the like. For instance, in the case of a cash register, large registering indicators may be employed, suitably positioned so as to be visible to the customer, and controlled by the mechanisms herein described. In the following claims, therefore, the use of the expression "machine of the class described" is to be broadly construed so as to cover all types of machines to which the herein described mechanisms are adaptable.

Since certain changes may be made in the above construction, and different embodiments of the invention could be made without departing from the scope thereof, it is intended that all matter contained in the above description, or shown in the accompanying drawings, shall be interpreted as illustrative, and not in a limiting sense.

Having thus described the invention what is claimed is:

1. In a machine of the class described, the combination of an accumulator, actuating means therefor engageable with the accumulator during one phase of a machine cycle for addition and during another phase of a machine cycle for subtraction, and mechanism including a member movable during one machine cycle from its normal position of rest in one direction to effect the engagement of the accumulator for addition and in the opposite direction to effect the engagement of the accumulator for subtraction.

2. In a machine of the class described, the combination of an accumulator, actuating means therefor engageable with the accumulator during one phase of a machine cycle for addition and during another phase of a machine cycle for subtraction, independent means for conditioning the accumulator for engagement with the actuating means for addition and subtraction, and mechanism including a member movable from a position of rest in one direction to effect the engagement of the accumulator when conditioned for addition and in the opposite direction to effect the engagement of the accumulator when conditioned for subtraction.

3. In a machine of the class described, the combination of a plurality of accumulators, actuating means therefor engageable with the accumulators during one phase of a machine cycle for addition, and during another phase of a machine cycle for subtraction, means associated with the respective accumulators for conditioning them for an addition or a subtraction operation, and mechanism including a common member movable from a normal position of rest, in one direction to effect the engagement of the accumulators when conditioned for addition, and in the opposite direction to effect the engagement of the accumulators when conditioned for subtraction.

4. In a machine of the class described, the combination of an accumulator, actuating means engageable therewith during one phase of a machine cycle for addition and during another phase of a machine cycle for subtraction, independent devices normally inactive but adapted when actuated to effect the engagement of the accumulator with the actuating means during the different phases of the machine cycle, means for conditioning one or the other of the devices for actuation, and power driven mechanism for actuating the engagement device conditioned.

5. In a machine of the class described, the combination of an accumulator, actuating means engageable therewith during one phase of a machine cycle for addition and during another phase of a machine cycle for subtraction, two independently adjustable devices, one adjustable to condition the accumulator for operation in addition and the other for operation in subtraction, and means for operating said devices when adjusted to effect the engagement of the accumulator with actuating means for an operation in addition or subtraction as the case may be.

6. In a machine of the class described, the combination of an accumulator, actuating means engageable therewith during one phase of a machine cycle for addition and during another phase of a machine cycle for subtraction, two devices associated with the accumulator and adjustable independently to condition the accumulator for addition or subtraction, and means including a reciprocable member arranged to cooperate with one of said devices if in adjusted position during one phase of the machine cycle and with the other of said devices if in adjusted position during a different phase of the machine cycle to effect the engagement of the accumulator.

7. In a machine of the class described, the combination of a pair of accumulators, actuating means therefor engageable with the accumulators during one phase of a machine cycle for addition and during another phase of a machine cycle for subtraction, said accumulators being provided each with means adapted upon operation to effect the engagement of the accumulators with the actuating means for addition and independent means adapted upon operation to effect engagement for subtraction, the engagement means for subtraction of one accumulator and the engagement means for addition of the other accumulator operating through a common device, and means for determining the conditioning of either accumulator for operation in addition and the other accumulator for subtraction.

8. In a machine of the class described, the combination of an accumulator, actuating means therefor engageable with the accumulator, independently adjustable devices for conditioning the accumulator for an operation in addition or subtraction, and mechanism including means movable during a machine cycle in opposite directions from a normal position of rest and adapted through said adjustable devices to effect the engagement of the accumulator with the actuating means for an addition or a subtraction operation depending upon the adjustment of said devices.

9. In a machine of the class described, the combination of a plurality of accumulators, actuating means therefor engageable with the accumulators, independently adjustable devices for conditioning one accumulator for an operation in addition and a second accumulator for an operation in subtraction, and mechanism including means movable during a machine cycle in opposite directions from a normal position of rest and adapted through said adjustable devices to effect the engagement of one accumulator with the actuating means for an operation in addition and another accumulator with the actuating means for an operation in subtraction, depending upon the adjustment of said devices.

10. In a machine of the class described, the combination of a plurality of accumulators, common actuating means engageable with said accumulators, two independently adjustable devices associated with each accumulator, one adapted when operated to condition the associated accumulator for engagement with the actuating means for addition and the other adapted when operated to condition the associated accumulator for engagement with the actuating means for subtraction, means for selecting the different devices for operation, and means common to the accumulators and actuated from the main shaft of the machine and acting through the devices selected for engaging the accumulators for addition or subtraction as the case may be.

11. A machine in accordance with claim 10, wherein the accumulators are provided each with clearing mechanism acting through the common actuating means, said mechanism including a total key adapted upon operation to adjust the device that conditions the associated accumulator for subtraction.

12. In a machine of the class described, the combination of a pair of accumulators arranged in tandem relation, common actuating means for said accumulators, and mechanism for effecting the engagement of the accumulators with the actuating means, said mechanism including a rock shaft arranged between the accumulators in parallel relation therewith and adapted when rocked in one direction to effect the engagement of one accumulator with the actuating means and when rocked in the opposite direction to effect the engagement of the other accumulator with the actuating means.

13. In a machine of the class described, the combination of a pair of accumulators arranged in tandem relation, common actuating means engageable with the accumulators during one phase of a machine cycle for addition and during another phase of a machine cycle for subtraction, and mechanism for effecting the engagement of the accumulators with the actuating means, said mechanism including a rock shaft arranged between the accumulators in parallel relation therewith and adapted to be rocked in one direction during one phase of the cycle to effect the engagement of one accumulator and in another direction during a different phase of the cycle to effect the engagement of the other accumulator.

14. In a machine of the class described, the combination of a plurality of accumulators, actuating means therefor, an add key and a subtract key associated with each accumulator and adapted upon selection to condition the associated accumulator for engagement with the actuating means, means for maintaning the keys selected in active position, a member common to the accumulators and normally operable at the conclusion of a machine cycle automatically to release the active keys, manual means for operating the common release means, and a key operated device functioning when active to disable the release means whereby to effect a plurality of repeat operations, and being returnable to inactive position upon the operation of said manual release means.

15. In a machine of the class described, the combination of an accumulator, totaling mechanism including a series of main elements for clearing the accumulator, a series of type carriers adjustable to effective printing position in one direction only, a series of subsidiary elements controlled by the means elements for locating the type carriers in certain adjusted positions to print the amount registered in the accumulator if it be positive, and a second series of subsidiary elements also controlled by the main elements for locating the type carriers in different adjusted positions to print the complement of the amount registered in the accumulator if it be negative.

16. In a machine of the class described, the combination of an accumulator comprising a set of digit wheels rotatable in the same direction in clearing positive and negative totals, means for clearing the accumulator, including a set of bars, one for each of said digit wheels and movable different distances determined by the extent of rotation of the individual digit wheels in clearing, a corresponding set of type carriers adjustable to effective printing position in one direction only, and means effective during a single cycle of the machine and cooperating with said bars for adjusting the individual type carriers for printing the actual total whether the amount registered in the accumulator be positive or negative.

17. In a machine of the class described, the combination of an accumulator comprising a single set of rotatable digit wheels, a single set of actuator racks therefor, a series of type carriers, devices active upon totaling for adjusting the type carriers individually from the actuator racks either through a number of spaces corresponding to the respective digits of a positive amount registered in the accumulator or through a number of spaces corresponding to the respective digits of the complement of a negative amount registered in the accumulator, and means operating automatically according as the amount in the accumlator is positive or negative to control said adjusting devices to effect either of said adjustments of the type carriers in one cycle of operation of the machine.

18. In a machine of the class described, the combination of an accumulator comprising a set of rotatable digit wheels, a corresponding set of adjustable type carriers provided with eleven digit printing elements reading 0 to 0 inclusive, and automatic mechanism for adjusting the type carriers to positions for printing the complement of a negatitve total registered in the accumulator, said mechanism including a set of bars connected respectively to the individual type carriers and movable actively through ten spaces, means controlled by the digit wheels of the accumulator for determining the travel of said bars, and means functioning when a bar has moved through less than the ten active spaces to decrease by one space the travel as determined by its corresponding digit wheel of the adjacent bar located in the place of the next higher denomination.

19. In a machine of the class described, the combination of an accumulator comprising a set of rotatable digit wheels, a corresponding set of adjustable type carriers provided with eleven digit printing elements reading 0 to 0 inclusive, and automatic mechanism for adjusting the type carriers to different positions for printing the complement of a negative total registered in the accumulator, said mechanism including a set of bars movable actively through ten spaces and connected respectively to the individual type carriers, and a second set of bars opposed to those of the first set for determining the extent of movement of the latter set, said second set of bars being adjustable to different positions as determined by the extent of rotation of the digit wheels as they are turned back to zero position.

20. In a machine of the class described, the combination of an accumulator comprising a set of rotatable digit wheels, a corresponding set of spring actuated type carriers provided with eleven digit printing elements, a set of bars operatively connected to the type carriers and movable through ten spaces, means for arresting the individual bars in different positions as determined by the extent of rotation of the corresponding digit wheels as they are turned back to the zero position in clearing the accumulator, an interponent disposed between each of the bars (except one) and their respective arresting means, and means for displacing the interponent of a bar to permit it to move an extra space as the adjacent bar located in the place of the next lower denomination moves through the tenth space.

21. In a machine of the class described, the combination of an accumulator comprising a set of rotatable digit wheels, a series of members having a given range of movement and positionable by the digit wheels of the accumulator irrespective of whether the amount registered therein is negative or positive, digit carriers, and automatic means for adjusting the digit carriers during a single cycle of the machine in accordance with the traversed portion of the range of movement of the members or in accordance with the untraversed portion of the range of movement thereof, to cause said digit carriers to represent a positive amount or the complement of a negative amount registered in the accumulator.

22. In a machine of the class described, the combination of an accumulator comprising a set of rotatable digit wheels, a series of members having a given range of movement and positionable by the digit wheels of the accumulator irrespective of whether the amount registered therein is negative or positive, a set of adjustable type carriers, two series of elements controlled in their movement by the members, those of one series being movable through the traversed portion of the range of movement of the members, and those of the other series being movable through the untraversed portion of the range of movement of the members, and means for connecting said type carriers to either series of said elements so as to print in one case a positive amount registered in the accumulator and in the other case the complement of a negative amount registered in the accumulator.

23. In a machine of the class described, the combination of an accumulator comprising a set of rotatable digit wheels, a series of members having a given range of movement and positionable by the digit wheels of the accumulator irrespective of whether the amount registered therein is negative or positive, a set of adjustable type carriers, and automatic means acting during a single cycle of the machine to adjust the type carriers in accordance with the traversed portion of the range of movement of the members in printing a positive amount registered in the accumulator and for adjusting the type carriers in accordance with the untraversed portion of the range of movement of the members in printing the complement of a negative amount registered in the accumulator.

24. In a machine of the class described, the combination of an accumulator comprising a set of rotatable digit wheels, a series of members positionable by the digit wheels and having a range of movement of nine spaces, a set of adjustable type carriers having a range of movement of ten spaces, and automatic means for adjusting the type carriers through the same number of spaces as that traversed by the members in printing a positive amount registered in the accumulator and for adjusting the type carriers through a number of spaces represented by the untraversed portion of the range of movement of the members in printing the complement of a negative amount registered in the accumulator, said means including a series of borrowing elements functioning to impart to the type carriers a movement of one space less whenever borrowing becomes necessary.

25. In a machine of the class described, the combination of an accumulator comprising a set of rotatable digit wheels, a series of members positionable by the digit wheels and having a range of movement of nine spaces, a series of adjustable type carriers having a range of movement of ten spaces, two series of elements controlled in their movement by the members, those of one series being movable through the same number of spaces as that traversed by the members and those of the other series being movable through a number of spaces represented by the untraversed portion of the range of movement of the members, and means for connecting said type carriers to either series of said elements so as to print in one case a positive amount registered in the accumulator and in the other case the complement of a negative amount registered in the accumulator, the series of elements associated with the type carriers during the printing of the complement of a negative amount registered having a series of borrowing elements associated therewith functioning to impart to the type carriers a movement of one space less whenever borrowing becomes necessary.

26. In a machine of the class described, the combination of an accumulator comprising a set of digit wheels rotatable in the same direction when taking positive and negative totals, a series of members having a given range of movement and positionable by the digit wheels of the accumulator upon taking a total, a series of adjustable type carriers, a series of elements connected to the type carriers and movable through distances determined by the movement of said members, and means associated with the elements and operable in printing the complement of the negative amount registered in the accumulator to decrease the extent of movement of said elements when the element of next lower order has moved through less than its full range, the final position of said elements determining the adjustments of the type carriers.

27. In a machine of the class described, the combination of an accumulator comprising a set of rotatable digit wheels having a range of movement of nine spaces, a set of adjustable type carriers having a range of movement of ten spaces, and automatic means for adjusting the type carriers through the same number of spaces as that traversed by the digit wheels, and through a number of spaces represented by the untraversed portion of the full range of movement of the digit wheels to adjust the type carriers to print, in one case, a positive amount registered in the accumulator and in the other case the complement of a negative amount registered in the accumulator, said means including a series of elements connected with the type carriers and adjustable through a range of movement of ten spaces, said elements having borrowing means associated therewith and operable during the printing of the complement of a negative amount registered in the accumulator to decrease the extent of movement of said elements by one space whenever the element of next lower order has moved through less than its full ten spaces.

28. In a machine of the class described, the combination of an accumulator comprising a set of rotatable digit wheels, a corresponding set of members controlled thereby and having a range of movement of nine spaces, a set of adjustable type carriers having a range of movement of ten spaces, and automatic means for adjusting the type carriers through the same number of spaces as that traversed by the members, and through a number of spaces represented by the untraversed portion of the full range of movement of the members to adjust the type carriers to print, in one case, a positive amount registered in the accumulator and in the other case the complement of a negative amount registered in the accumulator, said means including a series of elements connected with the type carriers and adjustable through a range of movement of ten spaces, said elements having instrumentalities associated therewith functioning to position an interponent between the elements and their associated members to decrease the movement of the elements by one space whenever the element of next lower order has moved through less than its full ten spaces, the active interponents thus effecting a borrowing operation which results in adjusting the type carriers to print the before mentioned complement of a negative amount registered in the accumulator.

29. In a machine of the class described, the combination of an accumulator comprising a set of rotatable digit wheels, a series of members positionable by the digit wheels and having a range of movement of nine spaces, a set of adjustable type carriers having a range of movement of ten spaces, two series of elements controlled in their movement by the members, those of one series being movable through the same number of spaces as that traversed by the members and those of the other series being movable through a number of spaces represented by the untraversed portion of the range of movement of the members, and means for connecting said type carriers to either series of said elements so as to print in one case a positive amount registered in the accumulator and in the other case the complement of a negative amount registered in the accumulator, the series of elements associated with the type carriers during the printing of the complement of a negative amount registered likewise having a range of movement of ten spaces, said series of elements having instrumentalities associated therewith functioning to position an interponent between the elements and their associated members to decrease the movement of the elements by one space whenever the element of next lower order has moved through less than its full ten spaces, the active interponents thus effecting a borrowing operation which results in adjusting the type carriers to print the before mentioned complement of a negative amount registered in the accumulator.

30. In a machine of the class described, the combination of an accumulator comprising a set of rotatable digit wheels, a series of members having a given range of movement and positionable by the digit wheels of the accumulator irrespective of whether the amount registered therein is negative or positive, a set of adjustable type carriers, and automatic means for adjusting the type carriers in accordance with the traversed portion of the range of movement of the members and for adjusting the type carriers in accordance with the untraversed portion of the range of movement of the members to print, in one case, a positive amount registered in the accumulator and in the other case the complement of a negative amount registered in the accumulator, said means including a series of elements connected to the type carriers and having a given range of movement, and means for decreasing the extent of movement of said elements as determined by the members whenever the element of next lower order has moved through less than its full range, the decreased movement effecting a borrowing operation which results in adjusting the type carriers to print the before mentioned complement of a negative amount registered in the accumulator.

31. In a machine of the class described, the combination of an accumulator comprising a set of digit wheels having a range of rotation during totaling limited to the number of calculating spaces represented by the digits of highest value on said wheels and arranged to rotate during totaling through a number of calculating spaces corresponding to the digits registered in the respective wheels, a corresponding set of adjustable type carriers, means for adjusting the type carriers upon taking a positive total through the same number of spaces traversed by the digit wheels to print the amount registered in the accumulator and for adjusting the type carriers upon taking a negative total through a number of spaces represented by the untraversed portion of the full range of rotation of the digit wheels to print the complement of the amount registered in the accumulator, and means operable in printing a complement to decrease by one space the adjustment of the type carriers in all orders above the lowest order set to print above zero.

32. In a machine of the class described, the combination of a series of accumulators each comprising a set of rotatable digit wheels, members associated with the accumulators for selecting one or another of them when totaling, a set of type carriers, a control bar associated with said carriers and common to all the accumulators, and means functioning automatically for rendering said bar operable by any of said members when the digit wheels of its respective accumulator are turned to register a negative amount.

33. In a machine of the class described, the combination of a series of accumulators each comprising a set of rotatable digit wheels, means for selecting one or another of the accumulators when totaling, a set of adjustable type carriers, means common to all of said accumulators for controlling the adjustment of the type carriers, and means associated with each accumulator and conditioned as the digit wheels of an accumulator are turned to register a negative amount to automatically enable a connection between said selecting and said controlling means.

34. In a machine of the class described, the combination of a series of accumulators, each comprising a set of rotatable digit wheels, members associated with the accumulators for selecting one or another of them for totaling, recording mechanism, a control device associated with the recording mechanism and common to the accumulators, and means functioning automatically for rendering said device operable by any of said members when the digit wheels of the respective accumulators are turned to register a negative amount.

35. In a machine of the class described, the combination of an accumulator having a set of digit wheels rotatable in the same direction for clearing positive and negative totals, digit carriers, means including two independently movable sets of intermediate connections for setting the digit carriers, one to represent a positive amount and the other the complement of a negative amount registered in the accumulator, and means including a member locatable in one position or another to determine which of the sets of connections is to be effective.

36. In a machine of the class described, the combination of an accumulator having a set of rotatable digit wheels, a single set of rack bars for clearing the accumulator, digit carriers, means including two independent sets of intermediate connections positionable by the rack bars for setting the digit carriers, one set to represent a positive amount and the other the complement of a negative amount registered in the accumulator, and means including a member locatable in one position or another to determine which of the sets of connections is to be effective.

37. In a machine of the class described, the combination of an accumulator, digit carriers, means including two independently movable sets of intermediate connections for setting the digit carriers, one to represent a positive amount and the other the complement of a negative amount registered in the accumulator, and means for connecting the digit carriers with one set of intermediate connections or the other, and a member locatable in different positions to determine which of said sets of connections is to be connected with the digit carriers.

38. In a machine of the class described, the combination of an accumulator, digit carriers, means including two independently movable sets of intermediate connections for setting the digit carriers, one to represent an amount and the other the complement of an amount registered in the accumulator, means including a shiftable member locatable in one position or another to determine which of said sets of intermediate connections is to be effective, and automatic means operable on totaling to locate the shiftable member in position to effect the representation of the complement when the amount registered in the accumulator is negative.

39. In a machine of the class described, the combination of an accumulator, digit carriers, means including two independently movable sets of intermediate connections for setting the digit carriers, one to represent an amount and the other the complement of an amount registered in the accumulator, means including a shiftable member locatable in one position or another to determine which of said sets of intermediate connections is to be effective, and means controlled from the accumulator when the amount therein is negative and operable upon totaling to locate the shiftable member in position to effect the representation of the complement.

40. In a machine of the class described, the combination of an accumulator comprising a set of digit wheels rotatable in the same direction in clearing positive and negative totals, a corresponding set of type carriers adjustable to effective printing position in one direction only, and means including two sets of intermediate connections for adjusting the type carriers to one or another of predetermined printing positions in one cycle of operation of the machine according as the amount registered in the accumulator is positive or negative.

41. In a machine of the class described, the combination of an accumulator comprising a set of digit wheels rotatable in the same direction in clearing positive and negative totals, a corresponding set of type carriers adjustable to effective printing position in one direction only, means including two sets of intermediate connections for adjusting the type carriers to one or another of predetermined printing positions in one cycle of operation of the machine, and means controlled from the accumulator for determining the operation of one or the other of said sets of intermediate connections according as the amount registered in the accumulator is positive or negative.

42. In a machine of the class described, the combination of an accumulator operable to register amounts by addition and subtraction, a set of actuating rack bars settable by the accumulator in clearing, digit carriers, and means including two sets of intermediate connections for determining the setting of the digit carriers, said sets of connections being positionable, one according to the displacement of the actuating racks, and the other complementary to the displacement of said racks, one set acting in setting said digit carriers to represent a positive amount, and the other set a negative amount in said accumulator.

43. A combination according to claim 42, wherein there are provided means for automatically rendering one or the other of said sets of intermediate connections operative.

44. A combination according to claim 42, wherein there are provided means controlled from the accumulator for rendering one or the other of said sets of intermediate connections operative.

45. In a machine of the class described, the combination of a plurality of accumulators, individual total controlling means therefor, digit carriers, means including two sets of intermediate connections between said accumulators and said digit carriers, one operable in representing a positive amount registered in a selected accumulator and the other operable in representing the complement of a negative amount registered in a selected accumulator, means including a shiftable member common to the accumulators and locatable in one position or another to determine the operation of one or the other of said sets of intermediate connections, and means for effecting the shifting of said member by the total controlling means of the selected accumulator as required by the character of the amount registered therein.

46. A machine in accordance with claim 45, wherein there is further provided means operated by the shiftable member for indicating to the operator the character of the amount recorded.

47. In a machine of the class described, the combination of an accumulator operable in addition or subtraction, totaling devices therefor, manipulative control means for said totaling devices, digit carriers, means operable upon totaling for setting the digit carriers to represent the amount registered in the accumulator if positive or the complement of the amount registered if negative, and means adapted automatically to be brought under the control of the totaling devices when the amount registered in the accumulator is negative and acting when the manipulative control means is operated to signify that the amount to be represented by the digit carriers is negative.

48. In a machine of the class described, the combination of a plurality of accumulators, individual total controlling means therefor, digit carriers, means for setting said digit carriers from the accumulators and including two sets of intermediate connections between said accumulators and said digit carriers, one operable in setting said digit carriers to represent a positive amount appearing in a selected accumulator and the other operable in setting said digit carriers to represent the complement of a negative amount appearing in a selected accumulator, means including a shiftable member common to the accumulators and locatable in one position or another to determine the operation of one or the other of said sets of intermediate connections, and means for effecting the shifting of said member by the total controlling means of the selected accumulator when the amount registered therein is negative to condition for operation the set of intermediate connections that acts in setting the digit carriers to represent the complement of a negative amount.

49. In a machine of the class described, the combination of an accumulator comprising a set of digit wheels rotatable in the same direction in clearing positive and negative totals, a corresponding set of type carriers adjustable in one direction only to effective printing position, and intermediate mechanism for adjusting the type carriers to represent one numerical value or another for a given reading of the accumulator in one cycle of operation of the machine according as the amount registered in the accumulator is positive or negative.

50. In a machine of the class described, the combination of an accumulator comprising a set of digit wheels rotatable in the same direction in clearing positive and negative totals, a corresponding set of type carriers adjustable in one direction only to effective printing position, intermediate mechanism, and means settable according as the amount in the accumulator is positive or negative for conditioning said intermediate mechanism to adjust the type carriers to represent one numerical value or another for a given reading of the accumulator in one cycle of operation of the machine to print the amount registered in the accumulator or the complement of said amount.

51. In a machine of the class described, the combination of an accumulator comprising a single set of rotatable digit wheels operable in addition and subtraction, a single set of actuating racks therefor controlled from the accumulator in taking a total, digit carriers adjustable in one direction only to effective position, and means including two sets of intermediate connections alternatively operable in one machine cycle and cooperating with said actuating racks, one for adjusting the digit carriers to represent the amount in the accumulator if it be positive, and the other for adjusting the digit carriers to represent the complement of the amount in the accumulator if it be negative, in one cycle of operation of the machine.

52. In a machine of the class described, the combination of an accumulator comprising a single set of rotatable digit wheels operable in addition and subtraction, a single set of actuating racks therefor controlled from the accumulator in taking a total, digit carriers adjustable in one direction only to effective position for representing positive or negative totals, intermediate mechanism positionable by the actuating racks, and means controlled from the accumulator and operable upon totaling to condition the intermediate mechanism for adjusting the digit carriers in accordance with the amount in the accumulator if positive or the complement of the amount therein if negative, in one cycle of operation of the machine.

53. In a machine of the class described, the combination of an accumulator comprising a single set of rotatable digit wheels operable in addition and subtraction, a single set of actuating racks therefor controlled from the accumulator in taking a total, digit carriers adjustable in one direction only to effective position, and means including two sets of intermediate connections cooperating with said actuating racks, one for adjusting the digit carriers to represent the amount in the accumulator if it be positive, and the other for adjusting the digit carriers to represent the complement of the amount in the accumulator if it be negative, and mechanism controlled from the accumulator and operable upon totaling to condition one or the other of said means according as the amount in the accumulator is positive or negative.

54. In a machine of the class described, the combination of an accumulator comprising a set of rotatable digit wheels, a series of digit wheel clearing members having a given range of movement and traversable through said range or a portion thereof under the control of the digit wheels when performing their clearing function, type carrying members, and means for adjusting the type carrying members to different settings according to the extent of the untraversed portion of the range of movement of said digit wheel clearing members.

55. In a machine of the class described, the combination of an accumulator comprising a set of rotatable digit wheels, a series of digit wheel clearing members having a given range of movement and traversable through said range or a portion thereof under the control of the digit wheels when performing their clearing function, a set of elements movable through the untraversed range of movement of the members, and means including type carrying members settable in accordance with the movement of said elements.

56. In a machine of the class described, the combination of an accumulator adapted to register a negative amount and comprising a set of rotatable digit wheels, a series of digit wheel clearing members having a given range of movement and traversable through said range or a portion thereof under the control of the digit wheels when performing their clearing function, a set of elements movable through the untraversed range of movement of the members, and means including type carrying members settable by said elements for printing the complement of the amount appearing in the accumulator.

57. In a machine of the class described, the combination of an accumulator comprising a set of rotatable digit wheels, a series of members having a given range of movement and traversable through said range or a portion thereof under the control of the digit wheels when clearing the accumulator, two sets of subsidiary rack bars, one movable through the traversed portion of the range of movement of said members, and the other set movable through the untraversed portion of the range of movement of said members, digit carrying devices, and means including gear mechanism for connecting one set of subsidiary rack bars with the digit carrying devices or the other set according as the amount appearing in the accumulator is positive or negative.

58. In a machine in accordance with claim 57, wherein the gear mechanism is shiftable to engage one set of subsidiary rack bars or the other, and means for effecting the shifting of the gear mechanism according as the amount appearing in the accumulator is positive or negative.

59. In a machine of the class described, the combination of an accumulator comprising a set of rotatable digit wheels, a series of members having a given range of movement and traversable through said range or a portion thereof under the control of the digit wheels in clearing the accumulator, two sets of subsidiary elements, one set movable through the traversed portion of the range of movement of said members and the other set movable through the untraversed portion of the range of movement of said members, digit carrying devices, means for connecting one set of elements or the other with the digit carrying devices according as the amount appearing in the accumulator is positive or negative, and means for automatically locking one set of subsidiary elements against operation when the other set is operative.

60. In a machine of the class described, the combination of an accumulator comprising a set of digit wheels, each having a number of calculating spaces corresponding to the digit of highest value on the wheels and arranged to be rotated upon clearing the accumulator through the number of calculating spaces registered respectively by the digit wheels, type carrying devices, and means acting in one machine cycle of operation to adjust the type carrying devices, when the amount registered in the accumulator is positive, in accordance with the number of calculating spaces through which the digit wheels have rotated in clearing or, when the amount registered in the accumulator is negative, in accordance with the complement of the number of spaces through which said wheels have rotated in those orders including and below the first registering a digit above zero and one less than the complement of the number of spaces in all higher orders.

61. In a machine of the class described, the combination of an accumulator comprising a set of digit wheels, each having a number of calculating spaces corresponding to the digit of highest value on the wheels, and arranged to be rotated upon clearing the accumulator through the number of calculating spaces registered respectively by the digit wheels, type carrying devices, and means acting in one machine cycle of operation to adjust the type carrying devices, when the amount registered in the accumulator is positive, in accordance with the number of calculating spaces through which the digit wheels have rotated in clearing or, when the amount registered in the accumulator is negative, in accordance with the complement of the number of spaces through which said wheels have rotated in those orders including and below the first registering a digit above zero and one less than the complement of the number of spaces in all higher orders, said means including two sets of connections, one active when the amount registered is positive and the other when the amount registered is negative.

62. In a machine of the class described, the combination of an accumulator comprising a set of digit wheels rotatable in the same direction in clearing positive and negative totals, a series of main elements for clearing the accumulator, a corresponding set of type carriers adjustable to effective printing position in one direction only, and means including two sets of alternative intermediate connections settable from the clearing elements for adjusting the type carriers, each to a different value for a given reading of the accumulator in one cycle of operation of the machine, the set of intermediate connections operable in a given cycle being dependent upon whether the amount registered in the accumulator is positive or negative.

63. In a machine of the class described, the combination of an accumulator comprising a set of digit wheels rotatable in the same direction in clearing positive and negative totals, a series of main elements for clearing the accumulator, a corresponding set of type carriers adjustable to effective printing position in one direction only, means including two sets of alternative intermediate connections settable from the clearing elements for adjusting the type carriers, each to a different value for a given reading of the accumulator in one cycle of operation of the machine, and means controlled from the accumulator for determining the operation of one or the other of said sets of intermediate connections according as the amount registered in the accumulator is positive or negative.

64. In a machine of the class described, the combination of a plurality of accumulators operable each in addition and subtraction, devices common to the accumulators for totaling the same and including digit carriers, total control means associated with the respective accumulators, a conditioning member common to the accumulators, and means associated with each accumulator and acting when the amount therein is negative to bring the conditioning member under the control of the total control means associated with such accumulator whereby upon totaling such accumulator said conditioning member will cause the totaling devices to set the digit carriers to represent the complement of the amount in said accumulator.

65. In a machine of the class described, the combination of a plurality of accumulators operable each in addition and subtraction, devices common to the accumulators for totaling the same and including digit carriers, total control means associated with the respective accumulators, a conditioning member common to the accumulators, means associated with each accumulator and acting when the amount therein is negative to bring the conditioning member under the control of the total control means associated with such accumulator, and power means rendered active by the conditioning member upon totaling a selected accumulator and wherein there is a negative amount for causing the totaling devices to set the digit carriers to represent the complement of said amount.

66. In a machine of the class described, the combination of a plurality of accumulators operable each in addition and subtraction, devices common to the accumulators for totaling the same and including digit carriers, a series of members operable for setting the digit carriers to represent positive amounts appearing in the accumulators and a second series of members operable for setting the digit carriers to represent the complement of negative amounts appearing in the accumulators, total control means associated with each accumulator, a conditioning member common to the accumulators, means associated with each accumulator and acting when the amount therein is negative to bring the conditioning member under the control of the total control means of such accumulator, and power driven means rendered operative by the conditioning member upon totaling a selected accumulator wherein there is a negative amount for effecting the operation of the second series of members.

67. In a machine of the class described, the combination of a plurality of accumulators, means for transferring a total registered in one of said accumulators to two other accumulators in one cycle of operation of the machine, and a carrying mechanism common to all of the accumulators and arranged to effect the necessary carrying in both accumulators to which the transfer is made.

68. In a machine of the class described, the combination of a plurality of accumulators, means for transferring a total registered in one of said accumulators into two other accumulators, one by addition and the other by subtraction, in one cycle of operation of the machine, and a carrying mechanism common to all of the accumulators and functioning during the transfer operation both for addition and subtraction.

69. In a machine of the class described, the combination of a plurality of accumulators, common actuating means therefor, a common carrying mechanism, means for engaging two accumulators simultaneously with the actuating means to transfer an amount in one accumulator into the other accumulator, and means for disengaging one accumulator from the actuating means prior to disengagement of the other accumulator to permit carrying in the latter accumulator.

70. In a machine of the class described, the combination of three accumulators, common actuating devices therefor, means for selectively engaging said devices with one of said accumulators for addition, another for subtraction and a third for totaling, during one cycle of operation of the machine, a common carrying mechanism, and means for disengaging the accumulators from the common actuating devices at different stages of the machine cycle, to permit carrying in addition and subtraction by the common carrying mechanism.

71. In a machine of the class described, the combination of a plurality of accumulators, common actuating means therefor, means including said actuating means for transferring the amount registered in one accumulator to two other accumulators, to one by addition and to the other by subtraction in one cycle of operation of the machine, said actuating means during the transfer operation acting under the control of the accumulator from which the amount is transferred, a carrying mechanism common to all of said accumulators and functioning during the transfer operation through the actuating means both for addition and subtraction, and means for demeshing the accumulators at the proper time.

72. In a machine of the class described, the combination of a plurality of accumulators each comprising a set of rotatable digit wheels, a set of actuating rack bars common to all of said accumulators and engaging directly with the digit wheels thereof during addition and subtraction, common carrying mechanism acting through the rack bars, and means for effecting an operative engagement of the rack bars with different selected accumulators for carrying out a total transfer operation either by addition or subtraction, said means acting during a transfer operation by subtraction to disengage from the rack bars, the digit wheels of the accumulator containing the total being transferred before the disengagement of the rack bars from the digit wheels of an accumulator to which the total is being transferred so as to permit carrying.

73. In a machine of the class described, the combination of a plurality of accumulators each comprising a set of rotatable digit wheels, means for selecting the accumulators for use, a set of reciprocable fore-and-aft rack bars common to said accumulators for rotating the digit wheels thereof, means under the control of the selecting means for causing the engagement of two of said accumulators with said rack bars, a stop associated with one of said accumulators for arresting the digit wheels thereof at the zero positions as the rack bars are moved in one direction, means for disengaging the accumulator with which the stop is associated from said rack bars, means controlled by the rotation of the digit wheels of the other accumulator to permit additional movement of the rack bars through a distance of one space to effect carrying therein, means for disengaging the accumulator in which the carrying has been effected from the rack bars, and means for returning the rack bars to the positions in which they were before the carrying was effected, prior to their return to normal position.

74. In a machine of the class described, the combination of a series of accumulators, means for selecting the accumulators for use, a set of reciprocable actuating rack bars common to said accumulators, means under the control of the selecting means for causing the engagement of any one of said accumulators with said bars preparatory to their advancement in one direction, a stop associated with said accumulator for arresting the digit wheels thereof in the zero positions, means for holding the rack bars independently of said stop in their advanced positions, means for disengaging the accumulator from the rack bars, means under the control of the selecting means for engaging any other of the accumulators with the rack bars preparatory to their movement in the return direction, means controlled by the rotation of the digit wheels of the last engaged accumulator to permit movement of the rack bars through an additional distance of one space in the return direction to effect carrying in said accumulator, means for disengaging the accumulator from the rack bars, and means for restoring the bars to their normal positions of rest.

75. In a machine of the class described, the combination of a plurality of accumulators, recording mechanism, means associated with each accumulator to condition the same for operation in addition or subtraction, means operable during one machine cycle of operation for transferring an amount registered in one of said accumulators whether it be positive or negative into a second selected accumulator by addition and into a third selected accumulator by subtraction, means also operable during said machine cycle for effecting the recording of said amount if it be positive or the complement of said amount if it be negative, and automatic means for operating the conditioning means associated with the accumulators.

76. In a machine of the class described, the combination of a plurality of accumulators, including each a set of digit wheels rotatable in the same direction for taking positive and negative totals, means for recording an amount in an accumulator if it be positive or the complement of an amount in said accumulator if it be negative, and means for transferring the amount registered in said accumulator to another accumulator by addition or subtraction whether the amount be negative or positive.

77. In a machine of the class described, the combination of a plurality of accumulators, means for transferring an amount appearing in an accumulator whether positive or negative to another accumulator by addition or subtraction in one cycle of operation of the machine, and mechanism likewise acting in said machine cycle and controlled from the first mentioned accumulator for recording the amount in said accumulator if positive or the complement of said amount if negative.

78. In a machine of the class described, the combination of a plurality of accumulators, add and subtract selecting means associated with one of said accumulators, means controlled from a second accumulator for transferring a negative amount therein to the first accumulator to register in the latter the algebraic sum or difference of the amounts in the two accumulators, depending upon whether the add or subtract selecting means associated with the first accumulator is active respectively, and means likewise controlled from the second accumulator for recording the complement of the negative amount registered therein.

79. In a machine of the class described, the combination of a plurality of accumulators, add selecting means associated with one of said accumulators, means controlled from a second accumulator for transferring a negative amount therein to the first accumulator when the add selecting means associated therewith is active to register therein the algebraic sum of the amounts in the two accumulators, and means likewise controlled from the second accumulator for recording the complement of the negative amount registered therein.

80. In a machine of the class described, the combination of a plurality of accumulators, subtract selecting means associated with one of said accumulators, means controlled from a second accumulator for transferring a negative amount therein to the first accumulator when the subtract selecting means associated therewith is active to register therein the algebraic difference of the amounts in the two accumulators, and means likewise controlled from the second accumulator for recording the complement of the negative amount registered therein.

81. In a machine of the class described, the combination of a plurality of accumulators, add and subtract selecting means associated with one of said accumulators, means controlled from a second accumulator for transferring an amount therein whether positive or negative to the first accumulator to register therein the algebraic sum or difference of the amounts in the two accumulators depending upon whether the respective add or subtract selecting means associated with the first accumulator is active, and means likewise controlled from the second accumulator for recording the amount therein if positive or the complement of said amount if negative.

82. In a machine of the class described, the combination of a plurality of accumulators, add selecting means associated with one of said accumulators, means controlled from a second accumulator for transferring an amount therein whether positive or negative to the first accumulator when the add selecting means associated therewith is active to register therein the algebraic sum of the amounts in the two accumulators, and means likewise controlled from the second accumulator for recording the amount therein if positive or the complement of said amount if negative.

83. In a machine of the class described, the combination of a plurality of accumulators, subtract selecting means associated with one of said accumulators, means controlled from a second accumulator for transferring an amount therein whether positive or negative to the first accumulator when the subtract selecting means associated therewith is active to register therein the algebraic difference of the amounts in the two accumulators, and means likewise controlled from the second accumulator for recording the amount therein if positive or the complement of said amount if negative.

84. In a machine of the class described, the combination of a plurality of accumulators, each provided with add and subtract selecting means, means controlled from either of said accumulators for transferring an amount therein whether positive or negative to the other accumulator to register therein the algebraic sum or difference of the amounts in the two accumulators, depending upon whether the respective add or subtract selecting means associated with the second accumulator is active, and means also controlled from the accumulator from which the amount is transferred for recording said amount if positive or the complement of said amount if negative.

85. In a machine of the class described, the combination of a series of accumulators, add selecting means associated with one accumulator, subtract selecting means associated with a second accumulator, means controlled from a third accumulator for transferring a negative amount registered therein to the first accumulator when the add selecting means associated therewith is active to register therein the algebraic sum of the amounts in the first and third accumulators, and for transferring the amount in the third accumulator to the second accumulator when the subtract selecting means associated therewith is active to register therein the algebraic difference of the amounts in the second and third accumulators, and means also controlled from the third accumulator for recording the complement of the amount registered therein.

86. In a machine of the class described, the combination of a series of accumulators, add selecting means associated with one accumulator, subtract selecting means associated with a second accumulator, means controlled from a third accumulator for transferring an amount registered therein whether positive or negative to the first accumulator when the add selecting means associated therewith is active to register therein the algebraic sum of the amounts in the first and third accumulators and for transferring the amount in the third accumulator to the second accumulator when the subtract selecting means associated therewith is active to register therein the algebraic difference of the amounts in the second and third accumulators, and means also controlled from the accumulator from which the amount is transferred for recording said amount if positive or the complement of said amount if negative.

87. In a machine of the class described, the combination of a series of accumulators, add and subtract selecting means associated with each of said accumulators, means controlled from any of said accumulators for transferring an amount therein whether positive or negative to any other accumulator when the add selecting means associated therewith is active to register therein the algebraic sum of the amounts in the first and second accumulators and for transferring said amount to a third accumulator when the subtract selecting means associated therewith is active to register therein the algebraic difference of the amounts in the first and third accumulators, and means also controlled from the accumulator from which the amount is transferred for recording said amount if positive or the complement of said amount if negative.

88. In a machine of the class described, the combination of a plurality of devices controlling different functions of various elements of the machine, a paper carriage, means for tabulating said carriage, and means mounted independently of said carriage for operating predetermined function-controlling devices according to prearranged sequence, said means being advanced through uniform increments of movement under the control of the paper carriage upon tabulation thereof irrespective of the extent of columnar spacing in said tabulation.

89. A mechanism according to claim 88, wherein said independently mounted means comprises a device equipped with groups of elements, the groups being arranged at equally spaced intervals and the elements being adjustable to cooperate with one or more function-controlling devices.

90. A mechanism according to claim 88 wherein said independently mounted means comprises a drum having equally spaced grooves, and a plurality of adjustable tappets in said grooves, said tappets being adjustable from a normally inactive position to positions where they cooperate with one or more function-controlling devices.

91. In a machine of the class described, the combination of a plurality of devices controlling different functions of the machine, a paper carriage movable to different positions to effect columnar spacing of the work, and means for automatically actuating the function-controlling devices in the different positions of the paper carriage, said means including a rotatable cylinder arranged for permanent mounting in the machine and equipped with a plurality of equally spaced holders corresponding to the different adjustable positions of the paper carriage, a group of elements carried by each holder and adjustable to determine the selection of the function-controlling devices, and means for adjusting the cylinder to bring a different group of elements into action as the carriage is moved from one position to another.

92. In a machine of the class described, the combination of a plurality of devices controlling different functions of the machine, a paper carriage movable to different positions to effect columnar spacing of the work, and means for automatically actuating the function-controlling devices in the different positions of the paper carriage, said means including a device arranged for permanent mounting in the machine and provided with a series of equally spaced grooves, a group of elements permanently stored in each groove and settable to cooperate with the different control devices, and means for actuating the adjustable device to bring different groups of elements into action depending upon the position of the paper carriage.

93. In a machine of the class described, the combination of a plurality of devices controlling different functions of the machine, a paper carriage movable to different positions to effect columnar spacing of the work, and means for automatically actuating the function-controlling devices in the different positions of the paper carriage, said means including a rotatable cylinder arranged for permanent mounting in the machine and provided with a series of equally spaced grooves, a group of elements permanently stored in each groove and settable to cooperate with the different control devices, and means for rotating the cylinder to bring different groups of elements into action depending upon the position of the paper carriage.

94. In a machine of the class described, the combination of a plurality of accumulators, individual selecting means for the accumulators and adapted upon operation to condition said accumulators for operation, a paper carriage adjustable to different predetermined positions, a rotatable power driven cylinder adjustable into different positions depending upon the position of the carriage, and means carried by said cylinder and including separate sets of selecting elements adjustable longitudinally of the cylinder for effecting the selection of the respective accumulators for operation in the different positions of the carriages.

95. In a machine of the class described, the combination of a plurality of accumulators, printing mechanism operatively associated therewith, a paper carriage movable to different positions to effect columnar spacing of the printed work, and means for automatically selecting the accumulators for operation in the different positions of the paper carriage, said means including a rotatable cylinder adjustable in accordance with different positions of the carriage and formed with a series of grooves and a set of fingers adjustably mounted in each of said grooves for determining the selection of the accumulators for operation when the carriage is in a position corresponding to a given groove.

96. In a machine of the class described, the combination of a plurality of devices controlling different functions of the machine, means mounted independently of the paper carriage for operating different selected function-controlling devices according to a prearranged sequence, said means including a device equipped with groups of elements, permanently associated with said device, the groups being arranged at equally spaced intervals on the device and the elements of each group being settable to cooperate with one function-controlling device or simultaneously with a plurality of selected function-controlling devices, and means under the control of the operator for moving said device to bring the different groups of elements progressively into a position wherein the set element or elements will be active.

97. In a machine of the class described, the combination of a plurality of devices controlling different functions of the machine, means mounted independently of the paper carriage for operating different selected function-controlling devices according to a prearranged sequence, said means including a device provided at equally spaced intervals with grooves holding each a plurality of elements, the elements in each groove being settable to cooperate with one function-controlling device or simultaneously with a plurality of selected function-controlling devices, and means for moving said device to bring the different groups of elements progressively into a position wherein the set element or elements will be active.

98. In a machine of the class described, the combination of a plurality of devices controlling different functions of the machine, means mounted independently of the paper carriage for operating different selected function-controlling devices according to a prearranged sequence, said means including a rotatable cylinder provided at equally spaced intervals with grooves holding each a plurality of elements, the elements in each groove being settable to cooperate with one function-controlling device or simultaneously with a plurality of selected function-controlling devices, and means for rotating the cylinder to bring the different groups of elements progressively into a position wherein the set element or elements will be active.

99. In a machine of the class described, the combination of a plurality of accumulators, a plurality of devices for effecting the selection of the accumulators for operation as desired, means mounted independently of the paper carriage for operating the accumulator selecting devices according to a prearranged sequence, said means including a device equipped with groups of elements permanently associated with said device, the groups being arranged at equally spaced intervals on the device and the elements of each group being settable to cooperate with the different selection devices, and means under the control of the operator for moving said device to bring the different groups of elements progressively into a position wherein the set elements of the group will be active.

100. A combination according to claim 99, wherein the settable elements are mounted in grooves formed at equally spaced intervals in the device with which they are associated.

101. A combination according to claim 99, wherein the device that carries the settable elements is a rotatable cylinder.

102. A combination according to claim 99, wherein the device that carries the settable elements is a rotatable cylinder formed with grooves at equally spaced intervals wherein the settable elements are mounted.

103. In a machine of the class described, the combination of two series of elements associated with different organs of the machine, separate sets of springs pulling in different directions for operating the respective series of elements, a main shaft, and means operable from said shaft for placing each set of springs under tension during different phases of a machine cycle, said means consisting of a crank on the main shaft, and an element associated with each set of springs, each element when in co-operative relation with the crank forming a toggle device for gradually increasing the force exerted against the set of springs with which the respective elements are associated.

104. The combination as specified in claim 103, wherein the toggle devices include each a link and a common lever member keyed to the main shaft, said lever being arranged to cooperate with both of said links successively during each machine cycle of operation.

105. In a machine of the class described, the combination of a plurality of accumulators provided each with a total key movable to one active position or another to condition its respective accumulator for taking a total or a sub-total, actuating means, means for effecting the engagement of an accumulator selected for totaling with the actuating means, means common to the accumulators for disengaging the selected accumulator upon clearing, and a member common to the accumulators and conditioned by the selected total key for locking said key in either of its active positions and for locking all other total keys in inactive position, said member also functioning when an accumulator is conditioned for subtotaling to disable the common disengaging means, whereby the original amount in said accumulator is re-registered therein.

106. In a machine of the class described, the combination of a plurality of accumulators provided each with a total key movable to one active position or another to condition its respective accumulator for taking a total or a sub-total, and means including a member common to the accumulators and adjustable by the selected total key from its normal position in one direction when said key is operated for totaling and in the opposite direction when said key is operated for sub-totaling, said member in either of its adjusted positions acting to lock the selected total key in active position and all other total keys in inactive position.

107. In a machine of the class described, the combination of an accumulator provided with means adapted upon operation to condition the accumulator for operation in addition, means adapted upon operation to condition the accumulator for operation in subtraction, and means adapted upon operation and acting through the subtract conditioning means to condition the accumulator for taking a total, and mechanism functioning upon the operation of the total conditioning means automatically to render the addition conditioning means inactive in the event the accumulator has previously been conditioned for operation in addition.

ANSGAR F. STURM.